(12) United States Patent
Wilford et al.

(10) Patent No.: US 7,558,270 B1
(45) Date of Patent: *Jul. 7, 2009

(54) ARCHITECTURE FOR HIGH SPEED CLASS OF SERVICE ENABLED LINECARD

(75) Inventors: Bruce Wilford, Los Altos, CA (US); Yie-Fong Dan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 828 days.

This patent is subject to a terminal disclaimer.

(21) Appl. No.: 10/771,068

(22) Filed: Feb. 3, 2004

Related U.S. Application Data

(63) Continuation of application No. 09/428,870, filed on Oct. 27, 1999, now Pat. No. 6,687,247.

(51) Int. Cl.
*H04L 12/28* (2006.01)
(52) U.S. Cl. .................................................. 370/395.42
(58) Field of Classification Search ............ 370/395.42, 370/392, 412, 389, 393, 475, 397, 400, 471, 370/399, 349, 401, 402, 413; 709/238, 265
See application file for complete search history.

(56) References Cited

U.S. PATENT DOCUMENTS

| | | | | |
|---|---|---|---|---|
| 4,878,218 | A * | 10/1989 | Takada | 370/229 |
| 5,509,006 | A | 4/1996 | Wilford et al. | 370/60.1 |
| 5,574,910 | A | 11/1996 | Bialkowski et al. | 707/1 |
| 5,781,532 | A | 7/1998 | Watt | 370/236 |
| 5,802,287 | A | 9/1998 | Rostoker et al. | 30/395.5 |
| 5,852,655 | A | 12/1998 | McHale et al. | 379/93.14 |
| 5,872,783 | A | 2/1999 | Chin | 370/392 |
| 6,157,641 | A | 12/2000 | Wilford | 370/389 |
| 6,259,699 | B1 | 7/2001 | Opalka et al. | 370/389 |
| 6,449,271 | B1 | 9/2002 | Lenell et al. | 370/383 |
| 6,463,067 | B1 | 10/2002 | Hebb et al. | 370/413 |

* cited by examiner

*Primary Examiner*—Chi H Pham
*Assistant Examiner*—Alexander Boakye
(74) *Attorney, Agent, or Firm*—Campbell Stephenson LLP

(57) ABSTRACT

A linecard architecture for high speed routing of data in a communications device. This architecture provides low latency routing based on packet priority: packet routing and processing occurs at line rate (wire speed) for most operations. A packet data stream is input to the inbound receiver, which uses a small packet FIFO to rapidly accumulate packet bytes. Once the header portion of the packet is received, the header alone is used to perform a high speed routing lookup and packet header modification. The queue manager then uses the class of service information in the packet header to enqueue the packet according to the required priority. Enqueued packets are buffered in a large memory space holding multiple packets prior to transmission across the device's switch fabric to the outbound linecard. On arrival at the outbound linecard, the packet is enqueued in the outbound transmitter portion of the linecard architecture. Another large, multi-packet memory structure, as employed in the inbound queue manager, provides buffering prior to transmission onto the network.

26 Claims, 31 Drawing Sheets

| Read Cycle: | 0 | 0 | 0 | 0 | 0 | 0 | 0 | 1 | 1 | 1 | 1 | 1 | 1 | 1 | 1 | 2 | 2 | 2 | 2 | 3 |
|---|---|---|---|---|---|---|---|---|---|---|---|---|---|---|---|---|---|---|---|---|
| Channel Number: | 0 | 0 | 0 | 0 | 0 | 0 | 0 | 4 | 4 | 4 | 4 | 4 | 4 | 4 | 4 | 0 | 0 | 0 | 0 | 8 |
| Queue Number: | 14 | 14 | 14 | 14 | 14 | 14 | 14 | 307 | 307 | 307 | 307 | 307 | 307 | 307 | 307 | 14 | 14 | 14 | 14 | 514 |
| Data Cells: | Hdr | Data | Data | Data | Hdr | Data | Data | Data | Hdr | Data | Data | Data | Data | Hdr | Data | Data | Hdr | Data | Data | EoB |
| DRAM Bank: | 5 | 6 | 7 | 0 | 1 | 2 | 3 | 4 | 3 | 4 | 5 | 6 | 7 | 0 | 1 | 5 | 6 | 7 | 0 | 7 |

*FIG. 24*

ARCHITECTURE FOR HIGH SPEED CLASS OF SERVICE ENABLED LINECARD

CROSS-REFERENCE TO RELATED APPLICATIONS

This application is a continuation of U.S. patent application Ser. No. 09/428,870, entitled "Architecture for High Speed Class of Service Enabled Line Card," filed Oct. 27, 1999, now U.S. Pat. No. 6,687,247 and naming Bruce Wilford and Yie-Fong Dan as inventors, incorporated by reference herein in its entirety and for all purposes.

BACKGROUND OF THE INVENTION

1. Field of the Invention

The present invention relates to communications devices, specifically linecards for interfacing communications devices to networks.

2. Description of the Related Art

In a communications network, routing devices receive messages at one of a set of input interfaces and forward them on to one of a set of output interfaces. Users typically require that such routing devices operate as quickly as possible in order to keep up with the high rate of incoming messages. In a packet routing network, wherein information is transmitted in discrete chunks or "packets" of data, each packet includes a header. The header contains information used for routing the packet to an output interface and subsequent forwarding to a destination device. The packet may also be forwarded to another router for further processing and/or forwarding. Header information used for routing may include the destination address and source address for the packet. Additionally, header information such as the destination device port, source device port, protocol, and packet priority may be used. Header information used by routing devices for administrative tasks may include information about access control, accounting, quality of service (QoS), or class of service (CoS).

FIG. 1 is a generic routing system 100 that will be used to describe both the prior art and the invention. A well-known routing device or system 100 consists of a set of linecards 110 and a switching fabric 120. Each linecard 110 includes an input interface 111, an output interface 112, a fabric interface 170, and a control element 130. Linecards 110 connect to communications network 1, which may be any form of local, enterprise, metropolitan, or wide area network known in the art, through both input interface 111 and output interface 112.

Control element 130 is configured to receive inbound packets 113 (i.e., packets entering the system from network 1) from input interface 111, process the packet, and transmit it through fabric interface 170 to switching fabric 120 for further processing by the same or another control element 130. Outbound packets 114 are received from switching fabric 120 through fabric interface 170, processed in control element 130, and transmitted to network 1 on output interface 112.

Control element 130 consists of an inbound packet receiver 140, lookup circuit 145, inbound memory controller 150, first memory 160, fabric interface 170, outbound memory controller 150, second memory 160, and outbound transmitter 180. Control circuits 190 are also provided to perform statistics collection and accounting functions as well as to process certain exception packets.

In a manner well-known in the art, packets are received from the physical medium of the network at input interface 111. The inbound packet receiver 140 operates in conjunction with lookup circuit 145 to determine routing treatments for inbound packets 113. Lookup circuit 145 includes routing treatment information disposed in a memory data structure. Access and use of this information in response to data in the header portion of inbound packet 113 is accomplished with means well-known in the router art. These routing treatments can include one or more of the following:

a) selection of one or more output interfaces to which to forward inbound packets 113 responsive to the destination device, to the source and destination device, or to any other packet header information;

b) determination of class of service (CoS) treatment for inbound packets 113;

c) determination of one or more accounting records or treatments for inbound packets 113; and d) determination of other administrative treatment for inbound packets 113.

Examples of such systems may be found in U.S. Pat. Nos. 5,088,032, METHOD AND APPARATUS FOR ROUTING COMMUNICATIONS AMONG COMPUTER NETWORKS to Leonard Bosack; 5,509,006, APPARATUS AND METHOD FOR SWITCHING PACKETS USING TREE MEMORY to Bruce Wilford et al.; 5,852,655, COMMUNICATION SERVER APPARATUS HAVING DISTRIBUTED SWITCHING AND METHOD to John McHale et al.; and 5,872,783, ARRANGEMENT FOR RENDERING FORWARDING DECISIONS FOR PACKETS TRANSFERRED AMONG NETWORK SWITCHES to Hon Wah Chin, incorporated in their entireties herein by reference.

One shortcoming known in the prior art arises from the ever-increasing need for speed in network communications. Attempts to scale prior art routers and switches to gigabit speed have shown that architectures that require a deep packet buffering prior to determining routing treatment suffer from high packet latency. Distributed routing schemes, such as that described above wherein routing is performed immediately on packet receipt in each linecard, have had only limited success in providing the necessary increase in throughput speed.

A further drawback of prior art systems is their relative inability to rapidly provide a range of services based on packet priority, as represented by various fields in the packet header. Such systems are often described as providing type of service (TOS), quality of service (QoS), or class of service (CoS) routing. Prior art systems typically experience additional packet latency and throughput reduction when performing routing based on packet priority.

What is needed is a router/switch system, preferably distributed on a linecard, that provides low latency packet routing based at least in part on packet priority. In particular, low latency priority routing determined by individual packet class of service is desired. Such a linecard should operate as close to line rate as possible, i.e., at or near the maximum speed of transmission over the physical medium and without any appreciable buffering delay.

SUMMARY

The present invention is a linecard architecture for high speed routing of data in a communications device. This architecture provides low latency routing based on packet priority because packet routing and processing occurs at line rate (i.e., at wire speed) for most operations. Comprised of an inbound receiver (including lookup and packet modification functions), queue manager, and outbound transmitter portions with associated network physical interfaces and a common device switching fabric, the architecture provides a distributed routing function with minimal packet delay.

Packets arrive from the network via a physical medium interface, in one embodiment an OC192 fiber optic connection. Demodulation, deframing, and conditioning are performed by means well-known in the art to supply an OSI layer 3 packet data stream to the inbound receiver. The inbound receiver uses a small, single packet FIFO to accumulate packet bytes very rapidly, at line rate. Once the header portion of the packet, in one embodiment defined as the first 60 bytes, is received, it is used to rapidly perform a routing lookup. The lookup data returned is then used to modify the packet header, and rate limiting and buffer management rules are applied to the packet. All of the above steps occur essentially at line rate, without the buffering-induced delay seen in the prior art.

The queue manager uses the class of service information in the packet header to enqueue the packet according to its required priority, again at essentially line rate. Enqueued packets are buffered in a large memory space holding multiple packets prior to transmission across the device's switch fabric (interconnect) to the outbound linecard.

On arrival at the outbound linecard, the packet is (in one embodiment of the present invention) rate limited and enqueued in the outbound transmitter portion of the linecard architecture. A large, multi-packet memory structure, as employed in the inbound queue manager, provides buffering prior to transmission onto the network via an appropriate physical layer interface module.

BRIEF DESCRIPTION OF THE DRAWINGS

The present disclosure may be better understood, and its numerous objects, features, and advantages made apparent to those skilled in the art by referencing the accompanying drawings.

FIG. 24 is an example of the ordering of data cell processing of DRAM cells, according to one embodiment of the present invention.

The use of the same reference symbols in different drawings indicates similar or identical items.

DETAILED DESCRIPTION

Introduction

The present invention is a linecard architecture that provides packet routing with very low latency. Portions of the linecard operate at line rate, also referred to as "wire rate" in the art and denoting the speed at which bits actually transit the network's physical medium (e.g., copper wires, fiber optic, etc.) for maximum throughput.

In one embodiment of the present invention, the linecard architecture consists of three main sections: the network physical interface, the layer 3 packet switching system, and the fabric interface. The network physical interface consists of both the physical connection to the network and the layer 1 and layer 2 protocol translation circuits. For example, in one embodiment of the present invention, the linecard is connected to the network by an OC192 optical fiber interface. Alternatively, multiple optical connections at lower rates (e.g., 4×OC48) or other media (e.g., copper) can be used.

Although a SONET network interface is described, those skilled in the art will realize that physical medium interfaces and transport layer protocols other than SONET, such as SDH, can be used. Accordingly, the invention is not limited to any particular type of physical medium or transport layer protocol.

Figure 1:
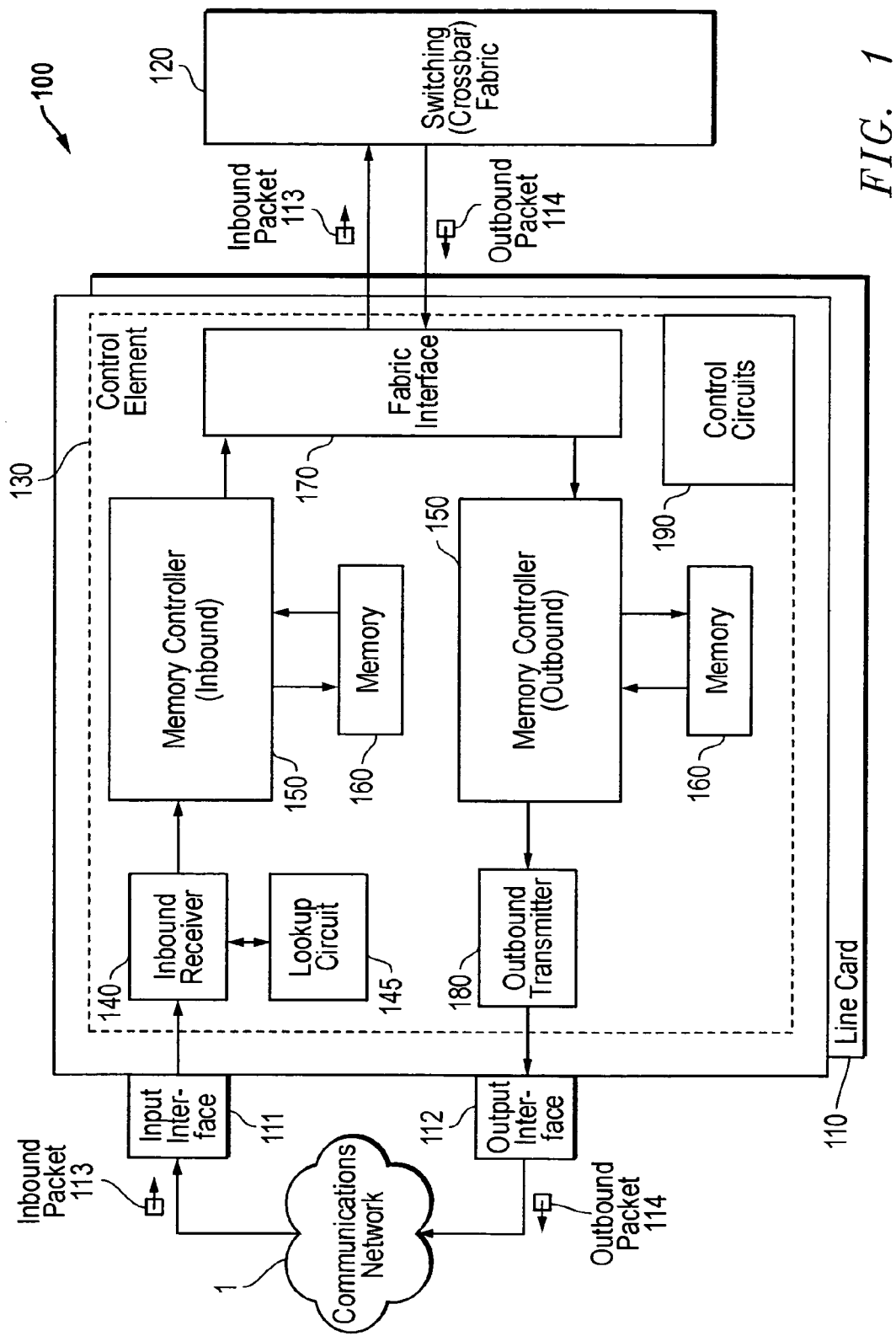
FIG. 1 is a high-level schematic representation of a router/switch system that contains prior art circuitry or the circuit/process of the present invention.

Referring to FIG. 1, packets entering the linecard from network 1 ("inbound packets") arrive on the physical medium at inbound interface 111. The encapsulated layer 3 data is extracted from the received bitstream by circuitry well-known in the art. In one embodiment, an OC192 optical-to-electrical converter is followed by a physical layer interface module (PLIM) that re-frames and channelizes the SONET data stream from the optical carrier. Together, the OC192 optical interface and PLIM form inbound interface 111. The output of the PLIM is a stream of inbound packets 113 which are then presented to the layer 3 (L3) switching system that forms control element 130 of linecard 110.

Figure 2:
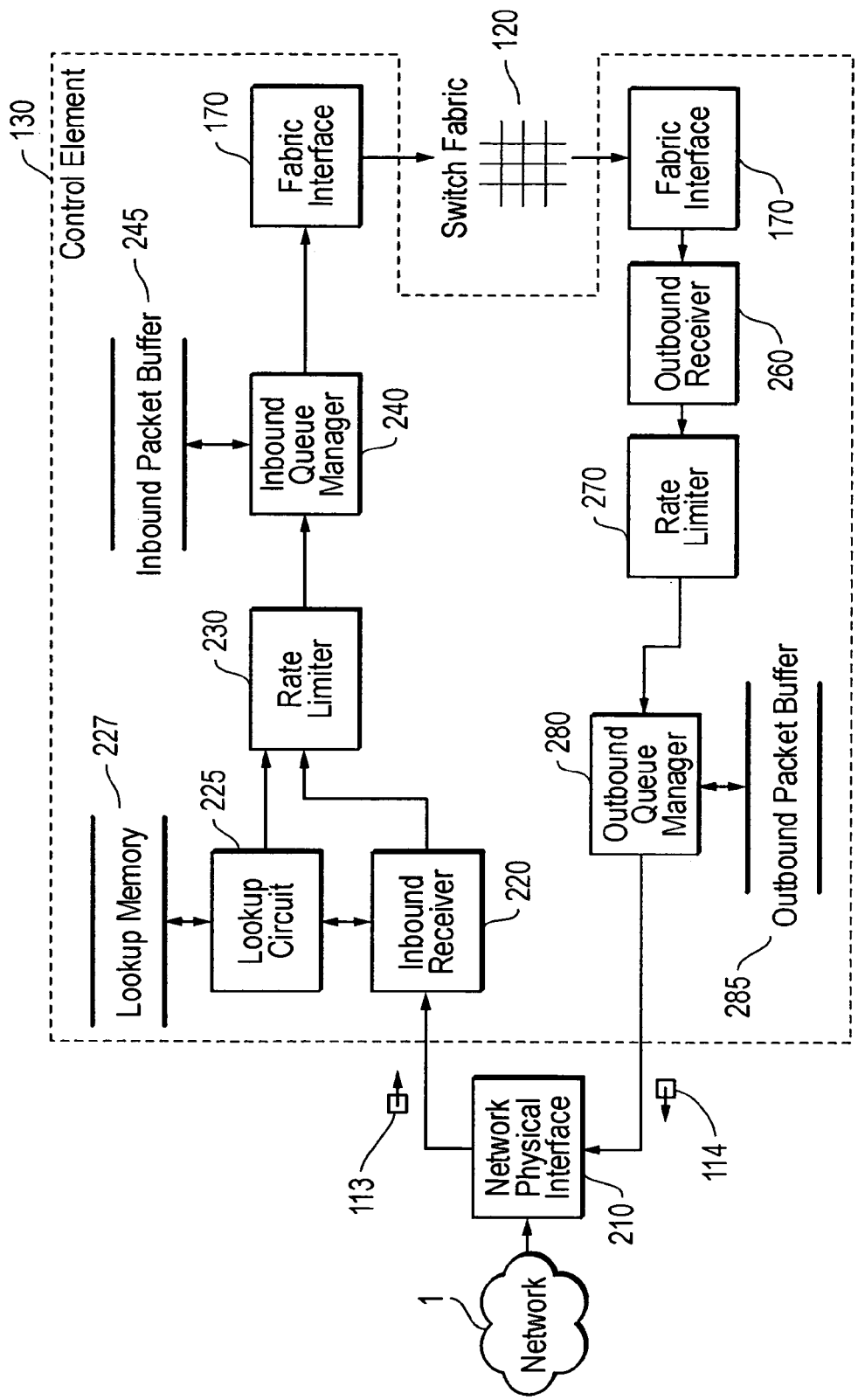
FIG. 2 is a high-level schematic of linecard control element 130 according to one embodiment of the present invention.
Figure 3:
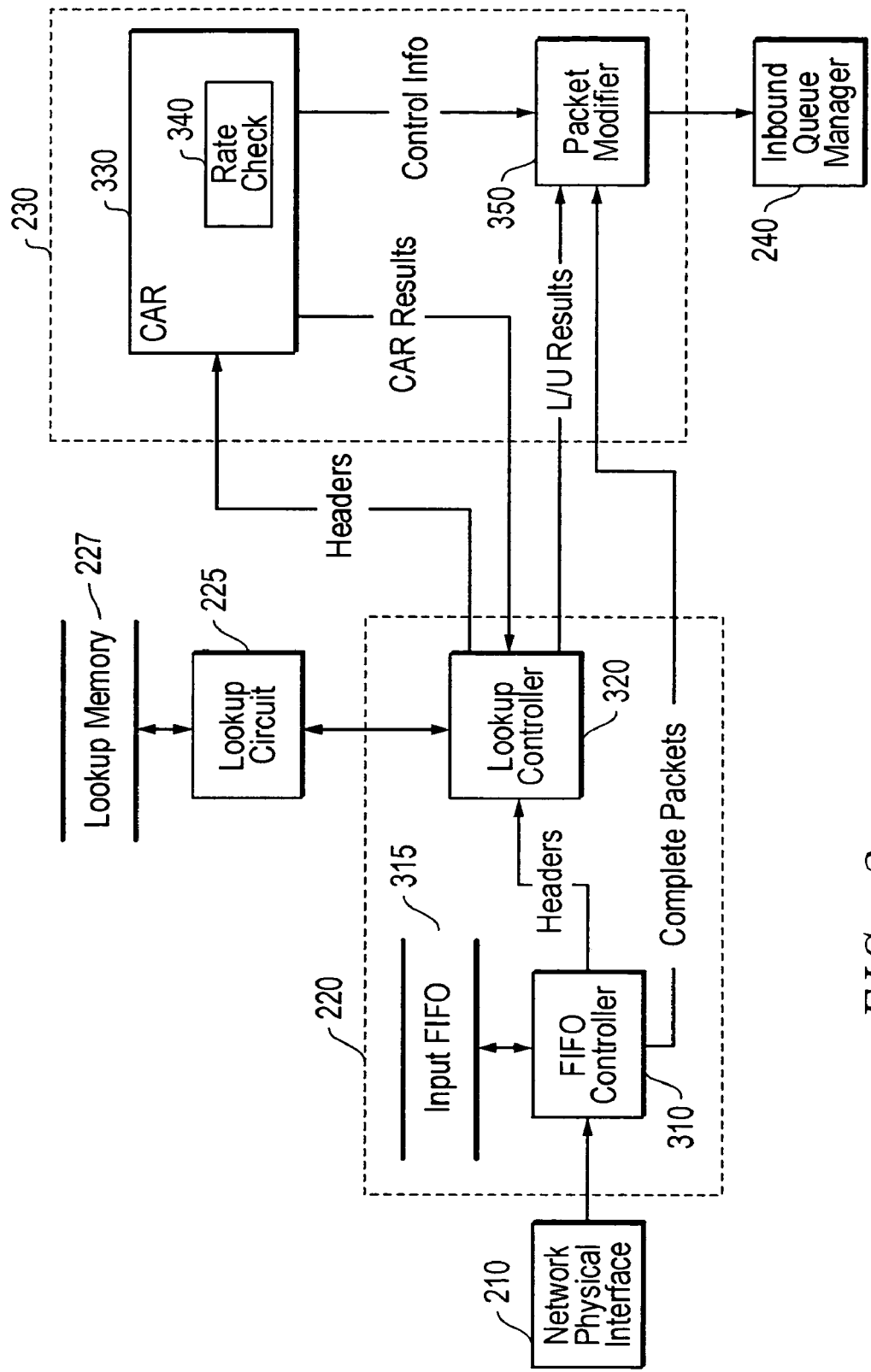
FIG. 3 is a high-level schematic of a portion of the inbound data path according to one embodiment of the present invention.

FIG. 2 shows a high level schematic of a linecard architecture according to one embodiment of the present invention. Inbound packets 113 enter control element 130 from network physical interface 210 at inbound receiver 220. Inbound receiver 220 buffers the packet into a small FIFO buffer 315 (discussed with respect to FIG. 3 below) sized to hold a single packet. As the packet is buffered, i.e., in real time at line rate, inbound receiver 220 enqueues the header portion of the packet to be sent to lookup circuit 225. The header portion of the packet is here defined as a fixed number of bytes to speed processing. The rest of the packet (the "tail") is not used in the lookup.

Lookup circuit 225, operating in conjunction with lookup memory 227, does a destination routing lookup and a source address lookup, in one embodiment by means well-known in the art. Policy and precedence mapping rules, themselves well-known in the art, are all executed against the packet at this time. Routing information is provided as a set of outputs from lookup circuit 225 to inbound receiver 220 and to rate limiter 230.

The foregoing lookup and routing functions may be performed by conventional means well-known in the art Alternate embodiments, using for instance faster lookup schemes, may also be used. These alternate embodiments are discussed below.

Inbound receiver 220 passes the header to rate limiter 230, which applies one or more rate limiting schemes known in the art to the packet. Rate limiter 230 provides a conform or exceed signal and can perform different actions based on the conform/exceed indicators. After rate checking, rate limiter 230 makes any necessary modifications to the packet header, such as TTL adjustment, ToS adjustment, and IP level checksum recomputation. Additional header bytes are prepended to the packet by a joining circuit to help navigate the packet through switch fabric 120.

The complete packet with its modified header is sent on to the inbound queue manager 240. Inbound queue manager 240 examines the (modified) packet header to find out where to enqueue the packet. The packet, consisting of the modified header and the tail, is buffered in inbound packet buffer 245. A queue management scheme, such as Random Early Detection (RED) may also be enabled to drop packets if there is little or no room in a given queue.

Figure 4:
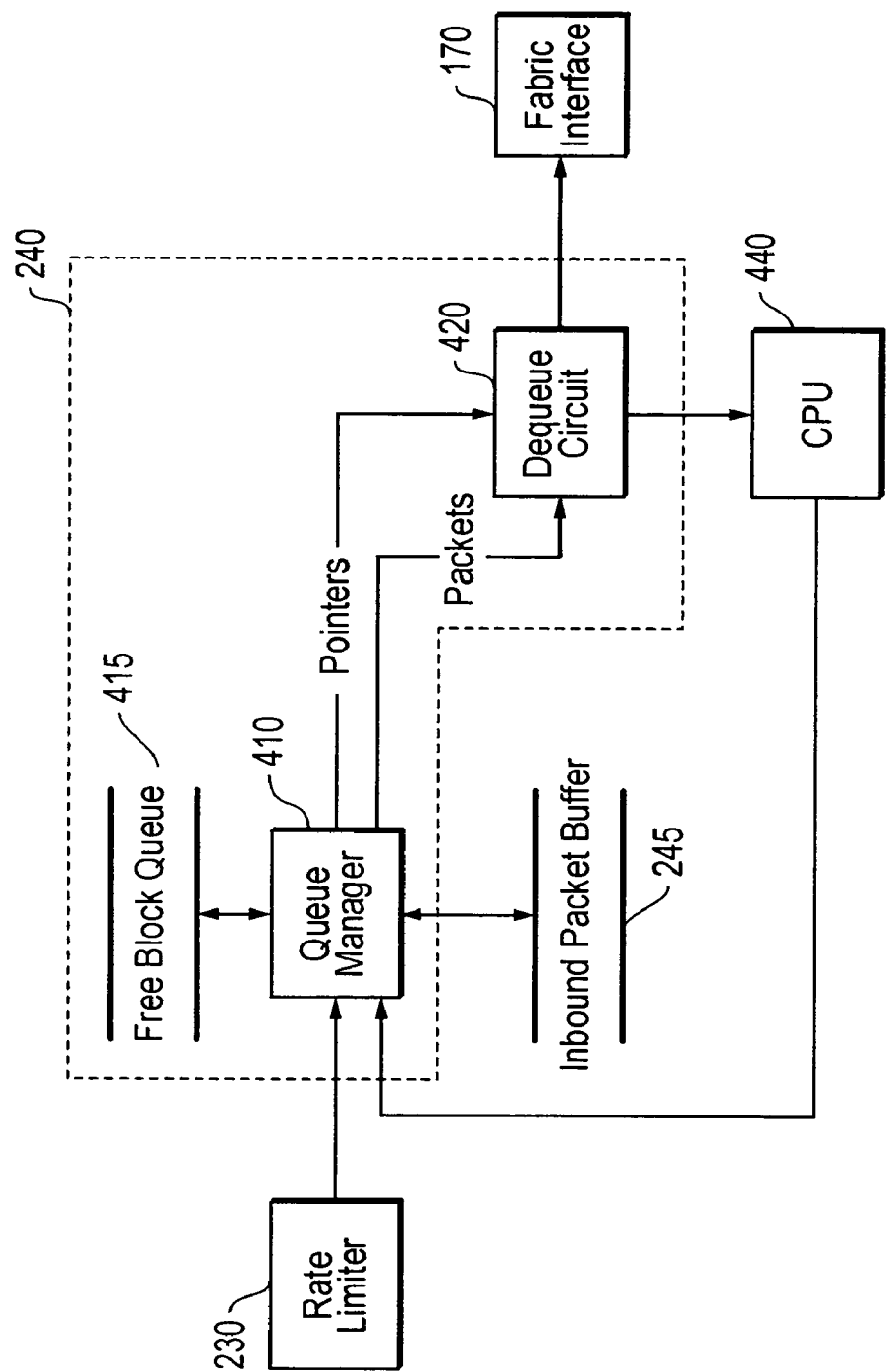
FIG. 4 is a high-level schematic of the inbound queue manager according to one embodiment of the present invention.

As queues are emptied, several are combined into a single queue of packets by means (in one embodiment) well-known in the art, and those packets are then sent either over switch fabric 120 (via fabric interface 170) or to the linecard's CPU 440, FIG. 4 (also generally referred to as control circuits 190, shown in FIG. 1).

Special packets, i.e., those with IP options, SRP control packets, ICMP packets addressed to this switch/router, some tag multicast packets and exception packets, are sent to the linecard's CPU 440 for processing. When the CPU needs to transmit a packet out of the router via another linecard 110, that packet (along with all the output port and queue information in the packet header) is written into the other linecard's inbound packet buffer 245 through its inbound queue manager 240. The packet is then enqueued normally in an output queue in the second linecard 110. Packets from the CPU that are to be sent via the same linecard are written back to the outbound queue manager 280 from CPU 440.

Regular packets (i.e., those other than the one sent to the CPU) are sent to (inbound) fabric interface 170. Once the packets have been sent over switch fabric 120 and (outbound) fabric interface 170, they arrive at outbound receiver 260 in the outbound linecard. The outbound linecard may be in the same or a different linecard 110 than that discussed above. The conventional MAC rewrite is done by outbound receiver 260. Output rate pacing is performed in rate limiter 270 using, in one embodiment, algorithms similar to that used in the inbound path discussed above; in some embodiments, rate limiter 270 is omitted and no rate pacing is performed. Outbound packets are then buffered and enqueued by outbound queue manager 280 using outbound packet buffer 285. Outbound queue manager 280 and outbound packet buffer 285 are configured and operate similarly to inbound queue manager 240 and its associated inbound packet buffer 245.

An important functionality of the present invention not found within the prior art memory controller 150 and outbound transmitter 180 of FIG. 1 is the performance of packet header rewrite and rate limiting prior to enqueuing. These functions, provided in outbound receiver 260 and rate limiter 270, occur before the packet is enqueued in the outbound packet buffer 285. Analogously to the inbound path, outbound packet modifications and rate limiting are thus performed at line rate, with minimal buffering. The "lookup first, enqueue later" architecture has the advantage of facilitating faster enqueue/dequeue operations by eliminating the need for additional packet manipulation as part of the queue management function. Minimal queue delay before lookup also helps control latency through the linecard for high-priority packets.

The following describes the major elements of the linecard architecture of the present invention in greater detail. While the disclosed apparatus and method of use may be embodied in a computer system apparatus (i.e., hardware), one of ordinary skill in the art will appreciate that other embodiments in the form of computer readable instructions such as software or firmware for carrying out the disclosed method are equally possible. Accordingly, the present invention is not limited to a particular hardware form of computer system or apparatus. Thus, in one alternate embodiment the present invention is realized in computer instructions for carrying out the disclosed method on a general purpose digital computer. In a further alternate embodiment of the present invention, a computer readable storage medium comprising the above-mentioned computer instructions is provided.

Inbound Receiver and Network Physical Interface

An inbound packet (or frame) of data is received by the network physical interface 210 from network 1. In one embodiment of the present invention, network physical interface 210 consists of a Packet-Over-SONET (PoS) module which converts optical carrier signals (e.g., one OC192 or four OC48 streams) on the physical layer (layer 1 of the OSI reference model) from the SONET protocol (layer 2) into a packetized bitstream (e.g., layer 3). Such conversion is accomplished by conventional means well-known in the art. The PoS CRC is checked as the packet is received and the packet is dropped if the CRC is not correct. Network physical interface 210 also prepends a small number of bytes of interface information, consisting of the total packet length, input interface number, and the input interface type, to the packet. The packet is then sent to inbound receiver 220.

Inbound receiver 220 (referring to FIG. 3) buffers the entire inbound packet at line rate into a comparatively small first in/first out (FIFO) buffer 315 using FIFO controller 310. FIFO buffer 315 may have only enough capacity for one packet. In one embodiment, FIFO 315 is provided in SRAM.

FIFO controller 310 separates the inbound packet into a first portion, called the header and consisting of the first n received bytes and a second portion, called the tail, consisting of the balance of the packet. The number of bytes n in this header is arbitrary number (60, in one embodiment) and includes both the prepended interface information from network physical interface 210 and the packet header (e.g., the well-known IP packet header).

Immediately on receipt of the first n bytes (i.e., in real time), FIFO controller 310 sends the packet header to lookup controller 320. This is effective in increasing throughput for large packets because almost all of the routing information can be determined by reference to the header information.

The lookup returns the output queue number, the MAC-rewrite index, and an offset into the packet. The offset denotes the beginning of the IP packet within the frame received from network physical interface 210. The offset is used by packet modifier 350 to access the IP packet header without the need to parse the packet a second time. Packet results are sent to packet modifier 350 in the same order that packet headers were sent from inbound receiver 220 to lookup circuit 225.

In the case of severe congestion, caused for example by a large number of 30-byte packets arriving back to back, FIFO controller 310 provides a back-pressure signal to network physical interface 210, and network physical interface 210 will stop sending packets. Network physical interface 210 has only a small amount of buffering; packets will be dropped if the congestion continues.

Lookup Circuit and Lookup Memory

Lookup circuit 225, in conjunction with lookup memory 227, (collectively referred to as the lookup unit or LU) does a destination routing lookup and a source address lookup. The destination lookup provides an index into an adjacency table, in one embodiment of the present invention, where load sharing is performed. Policy and precedence mapping rules are also executed against the packet in lookup circuit 225 by means well known in the art. Output queue and MAC rewrite indices are provided as outputs from the LU to lookup controller 320.

The LU performs various checks and lookups for each packet to determine, among other things, routing information for the packet. Such routing information includes, but is not limited to, the output interface identifier, and the next hop MAC address. The packet is first parsed to determine what type of packet is to be processed. The layer 3 datagram or upper-most Multi-Protocol Label Switching (MPLS) tag (as appropriate to the packet content) is extracted and checked. Some simple length sanity checking is done to check that there are sufficient bytes in the frame to actually have a valid IP address. For example, a 10 byte frame cannot be routed as there are too few bytes to represent a valid IP packet.

Although the routing/switching of IP packets is described, the present invention is equally able to process MPLS packets (also sometimes known as "tag" switching) and other protocols known in the art. Note also that the MPLS label is often referred to as the "tag" or "tag label".

Lookup circuit 225 applies the data structures of lookup memory 227 to police (in some embodiments of the present invention) the various types of traffic by applying to the packet any of a number of policy-based routing control systems known in the art, including for example access control list processing. This policing function serves to pass or deny packets additional processing and routing. Denied packets are dropped; all others continue to be processed and eventually switched by the device as required, subject to the possibility that later processing stages may decide to drop the packet anyway (e.g., due to rate limits, further discussed below).

In one embodiment of the present invention, an adjacency table is used for load sharing traffic between interfaces. Any routes that have a single adjacency (i.e. a single next hop destination) will return that destination information from the lookup table. Routes that have several possible adjacencies use the adjacency table to decide which route to employ for more efficient routing.

In an alternate embodiment of the present invention, the data structure of lookup memory 227 is organized as an M-way branching tree structure (known as an "M-trie") to improve the access speed of lookup memory 227. M-tries are known in the art of data structures, especially in the art of tree structures.

Inbound Rate Limiter

Effective packet throughput rate is adjusted by inbound rate limiter 230. First, a number of input CAR rules are applied in CAR circuit 330 to ensure that a particular, predefined rate is provided to certain packets identified by one or more header fields. Which CAR rules are to be applied is determined in the Lookup Unit (LU), which outputs a set of index values that identify particular rules. In one embodiment of the present invention, once the various input CAR rules are matched (executed), a number of token bucket based rate counters in rate check circuit 340 are updated and the packets are either passed with normal or "marked" priorities or dropped if they exceed the specified input rate. Rate check 340 is, in some embodiments, part of CAR module 330. The token bucket rate checkers provide a conform or exceed signal and can perform different actions based on packet rate conform/exceed status: packets may be dropped or have their priority changed in response to the rate checker.

Although rate limiting in the form of CAR followed by rate checking is described, those skilled in the art will realize that rate limiting systems other than CAR and/or token bucket rate checking can be used and that rate limiting may be omitted entirely. Accordingly, the present invention is not limited to any particular type of rate limiting or to embodiments incorporating rate limiting.

Packet modifier circuit 350 next makes any necessary modifications to the IP packet and its header, such as TTL and ToS adjustment, and adjusts the IP level checksum. Once the output interface is decided by the LU, MAC address checking is performed. In most cases, packet modifier 350 strips off the existing MAC header.

Some MPLS modifications are also completed at this stage of the packet flow. The tag ToS field may be adjusted and the TTL field may also be changed. Several tags could be added or removed from an existing tag stack or a tag value could be changed. In particular, for some MPLS tag packets it may be necessary to strip the tag header off the packet along with the MAC header before sending it on for further processing. MPLS tag switching is described in Merilee Ford, et al., *Internetworking Technologies Handbook* (New Riders Publishing 1997), Chapter 21, incorporated herein by reference in its entirety.

The complete packet with its modified header is sent to inbound queue manager 240.

Inbound Queue Manager

Inbound queue manager 240, referring now to FIG. 4, examines the modified packet header to find out which queue the packet should be added to, and the packet is added to that queue. This enqueuing is accomplished by means well-known in the art using, in one embodiment, free block queue 415 to hold a queuing structure of pointers to packets stored in inbound packet buffer 245. In one embodiment of the present invention, a queuing system for 2,064 queues is provided in SDRAM free block queue 415, arranged to provide eight distinct Class of Service (CoS) levels per interface. Though logically part of queue manager 240, free block queue 415 is not necessarily implemented as part of the physical queue manager device.

Inbound packet buffer 245 is a large random access memory (RAM). In one embodiment of the present invention, inbound packet buffer 245 is a synchronous dynamic RAM (SDRAM), sized to hold many packets simultaneously. In particular, inbound packet buffer 245 is many times larger than input FIFO 315, which is sized to hold only a single packet.

In a further alternate embodiment, the queue management scheme known as random early detection (RED) may be selectively enabled or disabled on a particular queue. If RED is enabled, a packet destined for a particular queue may be dropped if there is little or no room on that queue.

The RED algorithm is described in S. Floyd and V. Jacobson, "Random Early Detection Gateways for Congestion Avoidance," IEEE/ACM Transactions on Networking, Vol. 1, No. 4 (August 1993), which is incorporated herein in its entirety by reference.

The control of pointer queue 415 and inbound packet buffer 245 is provided by queue manager 410, as well as the logic implementing the RED scheme (where required). As queues are emptied by dequeue circuit 420, several queues are combined algorithmically, such as by using the well-known deficit round-robin (DRR) or modified deficit round robin (MDRR) algorithms, into a single queue of packets. Those packets are then sent either to fabric interface 170 or to CPU 440.

Packets with IP options, SRP control packets, ICMP packets addressed to this device, some tag multicast packets, and exception packets are sent to the linecard CPU 440 for processing. Two queues inside pointer queue 415 are assigned to allow received packets to be passed directly to the linecard CPU 440. These queues are limited by a packet count so that congested queues will not affect the linecard throughput to the fabric by using up a disproportionate amount of memory. There should be few IP packets with options and few SRP control messages. There could be many ICMP messages, but if the input queue becomes congested, RED will discard packets, so that the CPU does not become overwhelmed. In the case of some multicast packets, where the tag stack depth is different for differing paths, the CPU must be involved to replicate these packets.

All other packets are sent to fabric interface 170 to be passed to the outbound line card and thence back out onto network 1, referring to FIG. 2.

Although RED queue management and DRR and MDRR dequeuing algorithms are described, those skilled in the art will realize that queue management and dequeuing methods other than RED, DRR and/or MDRR can be used and that additional queue management schemes may be omitted entirely. Accordingly, the present invention is not limited to any particular type of queue management scheme or dequeuing algorithm or to embodiments incorporating an additional queue management scheme.

Fabric Interface

The interface between the inbound layer 3 switching functions (embodied in the inbound receiver 220, lookup circuit 225, rate limiter 230, and inbound queue manager 240) and switch fabric 120 is provided by fabric interface 170, which uses conventional circuits well known in the art. Likewise, the interface between switch fabric 120 and the outbound path in control element 130 (further discussed below) is provided by a similar fabric interface 170.

Outbound Receiver

Figure 5:
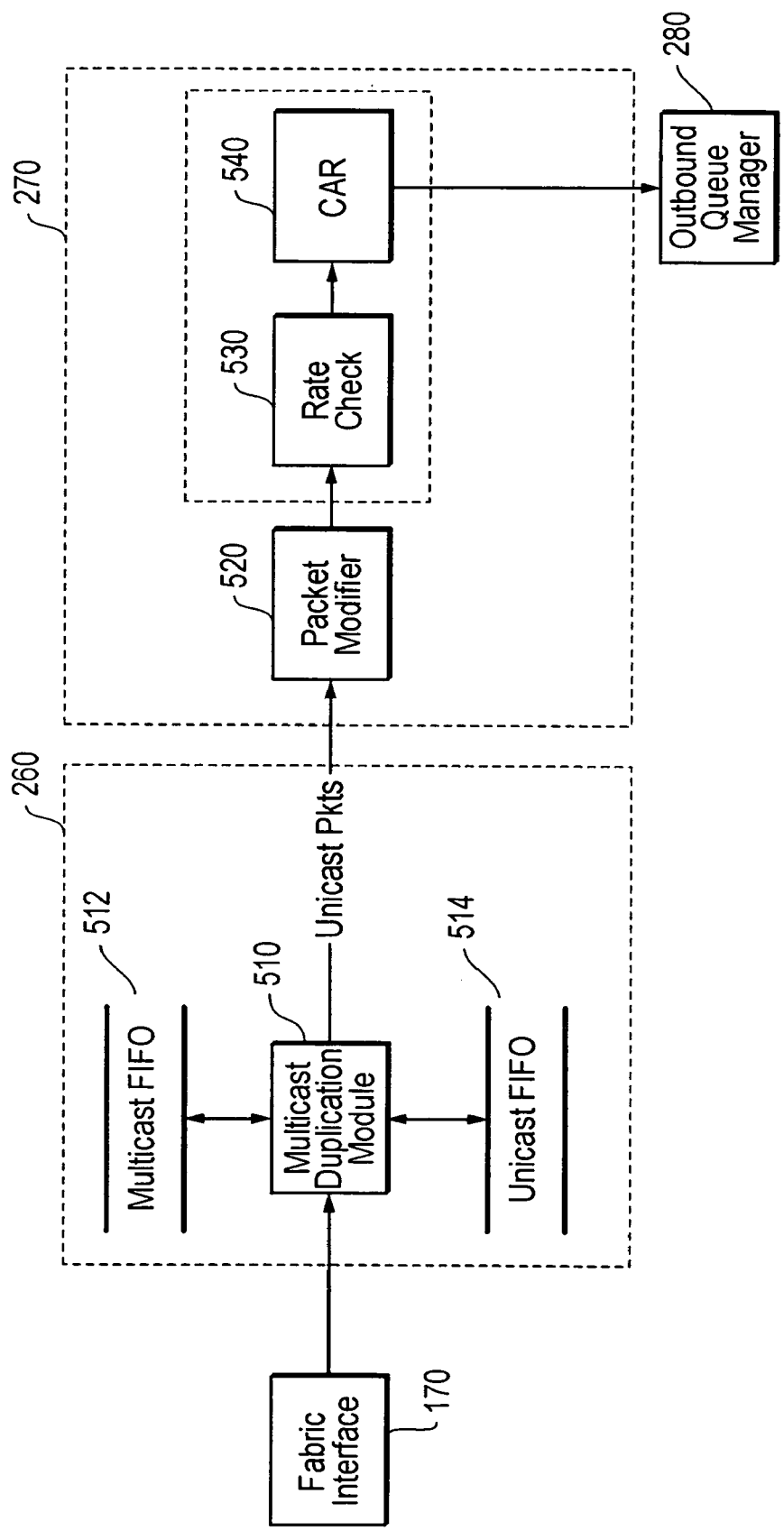
FIG. 5 is a high-level schematic of a portion of the outbound data path according to one embodiment of the present invention.

Once the packets have been sent over switch fabric 120, they arrive at outbound receiver 260 on the outbound linecard. See FIG. 5. Note that the outbound linecard may be the same linecard that the inbound packet arrived on, or it may be a different linecard. The destination address of the packet determines the interface to network 1, and thus the linecard connected thereto, that is to be used for the outbound transmission.

Outbound receiver 260 supports two channels of data from fabric interface 170, one for multicast packets and one for unicast packets. When outbound receiver 260 receives a packet from fabric interface 170, the packet is processed by multicast duplication module 510 which collects multicast and unicast packets into separate FIFOs. These FIFOs are logically referred to as multicast FIFO 512 and unicast FIFO 514, but they may be implemented in a single memory buffer structure or in multiple buffers. Accordingly, the present invention is not limited to any particular multicast duplication module memory structure.

At this point multicast packets are duplicated as required, turning them into unicast packets. Unicast and duplicated multicast packets are then sent to outbound rate limiter 270.

Outbound Rate Limiter

Outbound rate limiter 270 consists of packet modifier 520 and, in some embodiments, rate check circuit 530 and CAR circuit 540. The MAC re-write is done by packet modifier 520, which appends an appropriate MAC to the packet. The MAC rewrite may include a long re-write to add a MAC header and a tag in the case of tag imposition.

In some embodiments, output rate pacing (i.e., rate limiting) is performed on the packets by outbound rate check 530. Rate pacing allows the traffic rate transmitted to network physical interface 210 to be controlled on a per output queue basis. Rate check circuit 530 utilizes, in one embodiment of the present invention, the RED algorithm (discussed above) to control average queue depth in outbound packet buffer 285 (when enabled) and may drop packets.

Any packets not dropped are forwarded to the outbound CAR circuit 540, which polices the packet rate based on a set of user-configurable rules. The only outbound CAR actions are to transmit or drop. The outbound CAR circuit operates in conjunction with a token bucket algorithm similar to that used in the inbound rate check 340. Any packets not dropped are forwarded to outbound queue manager 280 (FIG. 6) which queues the packet on an outbound (pointer) queue 615 and writes it to outbound packet buffer 285.

Rate check 530 and outbound CAR 540, while logically distinct, may, in some embodiments, be implemented in a single circuit.

Although rate limiting in the form of RED queue management followed by CAR is described, those skilled in the art will realize that rate limiting systems other than RED, CAR, and/or token bucket or rate checking can be used and that rate limiting may be omitted entirely. Accordingly, the present invention is not limited to any particular type of rate limiting or to embodiments incorporating rate limiting.

Outbound Queue Manager and Network Physical Interface

Figure 6:
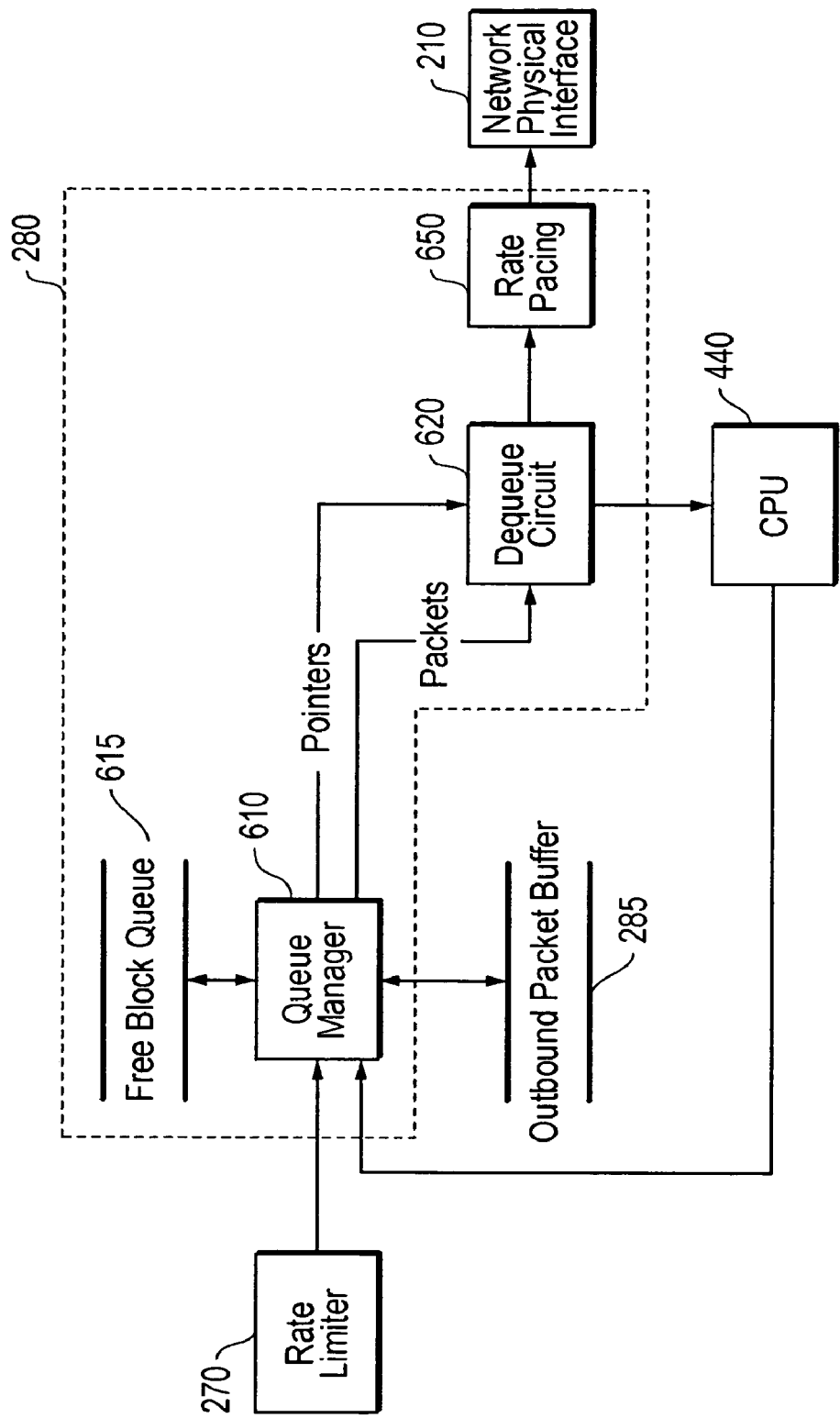
FIG. 6 is a high-level schematic of the outbound queue manager according to one embodiment of the present invention.

FIG. 6 depicts outbound queue manager 280, which is completely analogous to inbound queue manager 240. Packets are received from rate limiter 270 by queue manager 610 and enqueued in outbound packet buffer 285 with the aid of free block queue 615. In one embodiment, enqueuing and buffer memory management is accomplished by conventional means and packets are stored in outbound packet buffer 285 using conventional means.

Packets are dequeued by dequeue circuit 620 and sent to the network physical interface 210 using MDRR (as in the inbound queue manager 240). In some embodiments, rate pacing circuit 650 is also employed.

REPRESENTATIVE EMBODIMENT

Figure 7:
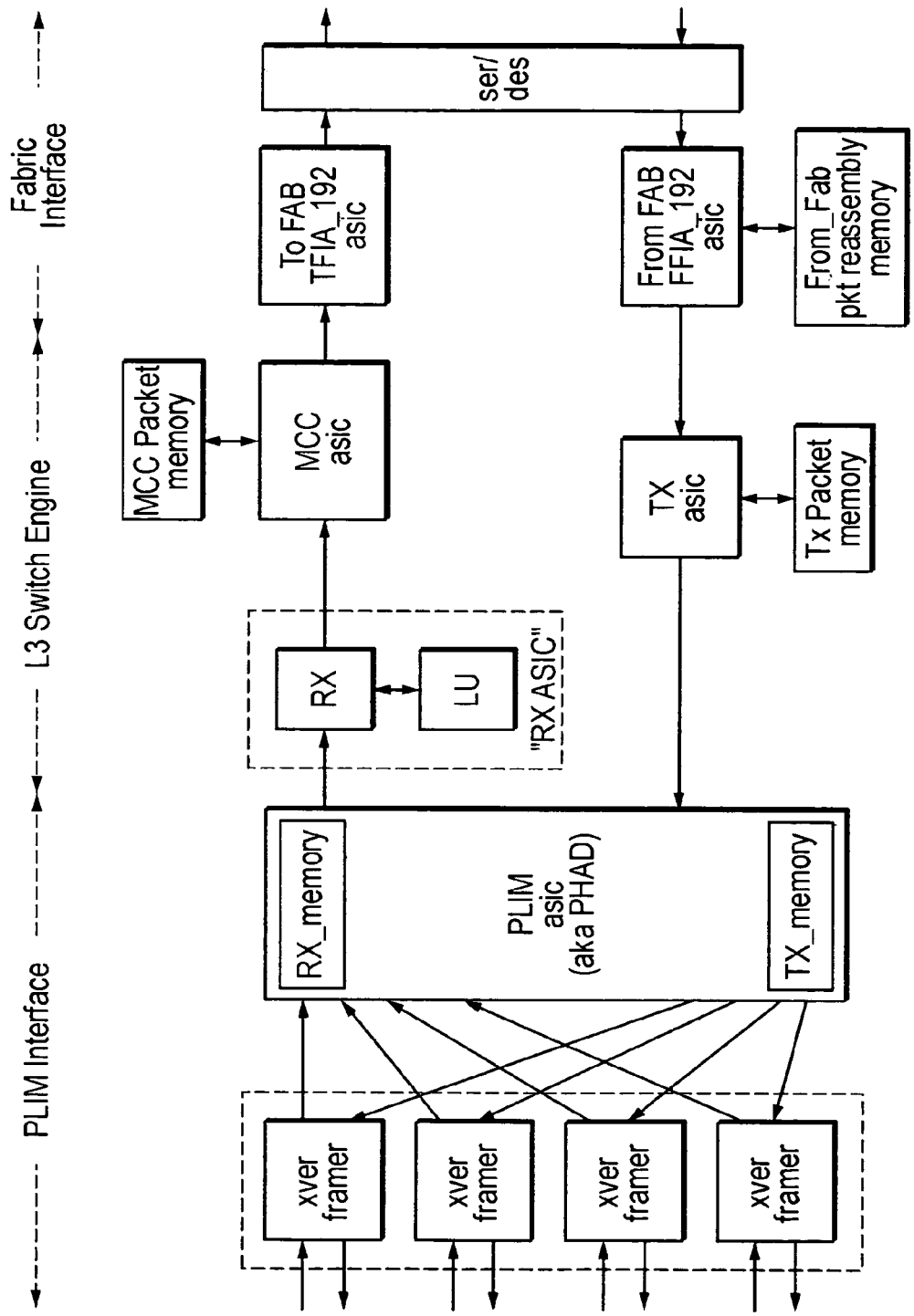
FIG. 7 is a high-level block diagram of a linecard according to one embodiment of the present invention.

In one embodiment of the present invention, shown in FIG. 7, the layer 3 (L3) switching function of control element 130 is distributed over three ASICs which perform the various functions described above, namely the RX, MCC, and TX ASICs.

The RX ASIC is used for four main functions: packet buffering control while the lookup is being performed (inbound receiver 220); IP routing lookups and IP checksum verification (lookup circuit 225); rate limiting, including CAR (rate limiter 230); and IP and tag level modifications.

The MCC ASIC function as the inbound queue manager 240 (also referred to as the "memory controller"). It is used to buffer packets waiting to go to the fabric.

The TX ASIC include outbound receiver 260, rate limiter 270, and outbound queue manager 280. The TX ASIC also adds the output encapsulation bytes and provides IP multicast features. The TX ASIC uses the queue management portion of the MCC ASIC to provide outbound queue manager 280 functionality.

Physical Layer Interface Module

This section defines the hardware interface between the PLIM and the OC192 switch engine, i.e., the core layer 3 switch functions, also referred to as control element 130 above. The PLIM provides the physical layer interface on a linecard such as a OC192c Packet-over-SONET interface (POS) or a 4× (quad) OC48c POS linecard.

FIG. 7 is a high level block diagram of a Quad OC48c POS linecard. Both the TX and RX PLIM buffer memories are embedded in the PLIM ASIC.

On the RX side, each received packet is reassembled in one of the four input FIFOs in the RX_memory. The PLIM ASIC moves data from the RX_memory to the RX ASIC based on a packet round-robin scheme among the four input queues. The RX ASIC asserts the Xoff signal when it can't accept any more packet from the PLIM. This may be caused by a packet stall in the MCC, RX or LU ASIC. There is no queue backpressure on this interface. Each packet from the PLIM will start and end on the 128-bit word boundary. This is less efficient in bandwidth utilization, but eliminates the need of complex 64-bit to 128-bit conversion between all 100 MHz and 200 MHz interfaces.

To support packet sizes larger than the 9k-byte MTU, the PLIM is able to chop large size packets into MTU size data chunks and send them directly to the local CPU as individual packets. The local CPU will reassemble the packets from the chunks and fragment each into MTU sized packets. The chopped packet chunks are identified by a unique 4-bit status in the 32-bit PLIM packet header.

On the TX side, packets are interleaved among the I/O ports. However, packets for the same I/O port are not interleaved. Due to the latency of the TX ASIC, the PLIM should be able to buffer at least 1536 bytes (see MCC ASIC description below.) for each output FIFO after it asserts the queue backpressure. The TX ASIC guarantees that a packet to the PLIM will never underrun once its transfer starts. There is no Xoff backpressure from the PLIM ASIC to TX ASIC, so the PLIM ASIC needs to accept data from the TX ASIC at 2× line rate (128-bit @ 200 MHz) once a transfer starts.

In general, the PLIM is responsible for collecting the byte and packet counts of all outgoing (TX) traffic per interface. On the RX side, it counts the bad packets received per error category per interface. Based on software configuration, it can drop the bad packets received or forwarded them to the local CPU.

In case of ATM interface, per VC queuing is done by the TX SAR and PLIM ASIC. The Xoff backpressure from the PLIM ASIC to TX ASIC is asserted only when all the buffers in the TX_memory are consumed. Applying per VC backpressure from the destination linecard to the source linecards across the fabric does not scale since each source linecard sees only 128 queues on each destination linecard (i.e., only 128 queue status signals are recognizable from each destination linecard). Without per VC backpressure to the source linecard, the size of the TX_memory needs to be very large (64 MByte or more) and the PLIM ASIC should be able to drop packets from the TX ASIC based on WRED on a per VC basis.

RX ASIC

The RX ASIC, in one embodiment of the present invention, has two main sections, the lookup unit (also referred to as the LU CORE) and the RX packet buffer and header modification unit (generally referred to as the RX ASIC in the following description).

The RX ASIC provides internal packet buffering for the packets arriving from the PLIM interface and provides Input Committed Access Rate (CAR) functionality. The RX ASIC interfaces between the PLIM and the Memory Controller (MCC) ASIC and the Lookup portion of the ASIC (LU). The RX ASIC receives packets from the PLIM, and stores the packets in the RX Packet Buffer internal SRAM. The RX ASIC then sends the packet headers as soon as the RX ASIC receives them, to the LU CORE section where the route lookup is performed. The RX ASIC stores a FIFO of packet headers that are waiting until they can be sent to the LU section. The lookup operation in the LU section is deterministic, so that results from the lookup return from the LU section in the order that they were presented to the LU section. The LU section sends the output port and the rewrite number to the RX ASIC. The CAR Control section determines if the rate on the interface for that type of packet is conforming or non-conforming and what type of action should be taken on that packet. The RX ASIC then sends the packet to the MCC ASIC.

The RX ASIC has the following features:
a) Sends Packet Headers to the LU CORE
b) Provides 8 KB Internal Packet Buffering
c) Provides for 10 Gbps ingress and 10 Gbps egress bandwidth
d) Performs Input Committed Access Rate (CAR) on IP TOS and Tag COS.
e) Provides CAR statistics
f) Sends packets to the Memory Controller at 10 Gbps
g) Receives results from the LU section in the order that the headers are sent.
h) XOFF flow control input from Memory Controller.
i) Synchronous source clocked interfaces between the other ASICs
j) Supports one of the following: 8 GE, 16 OC12, 4 OC48 or 1 OC192 input ports.
k) Supports 8 levels of Quality of Service.
l) Performs IP TTL Decrement and Checksum Update
m) Performs Multiple TAG popping and Multiple Tag Pushing
n) Even Parity on all External Interfaces The RX ASIC runs internally on a 100 MHz system clock. The ASIC interfaces are source clocked at 200 MHz, using two 100 MHz clocks that are 180 degrees out of phase. These two 100 MHz clocks are generated from an internal 200 MHz clock.

Figure 8:
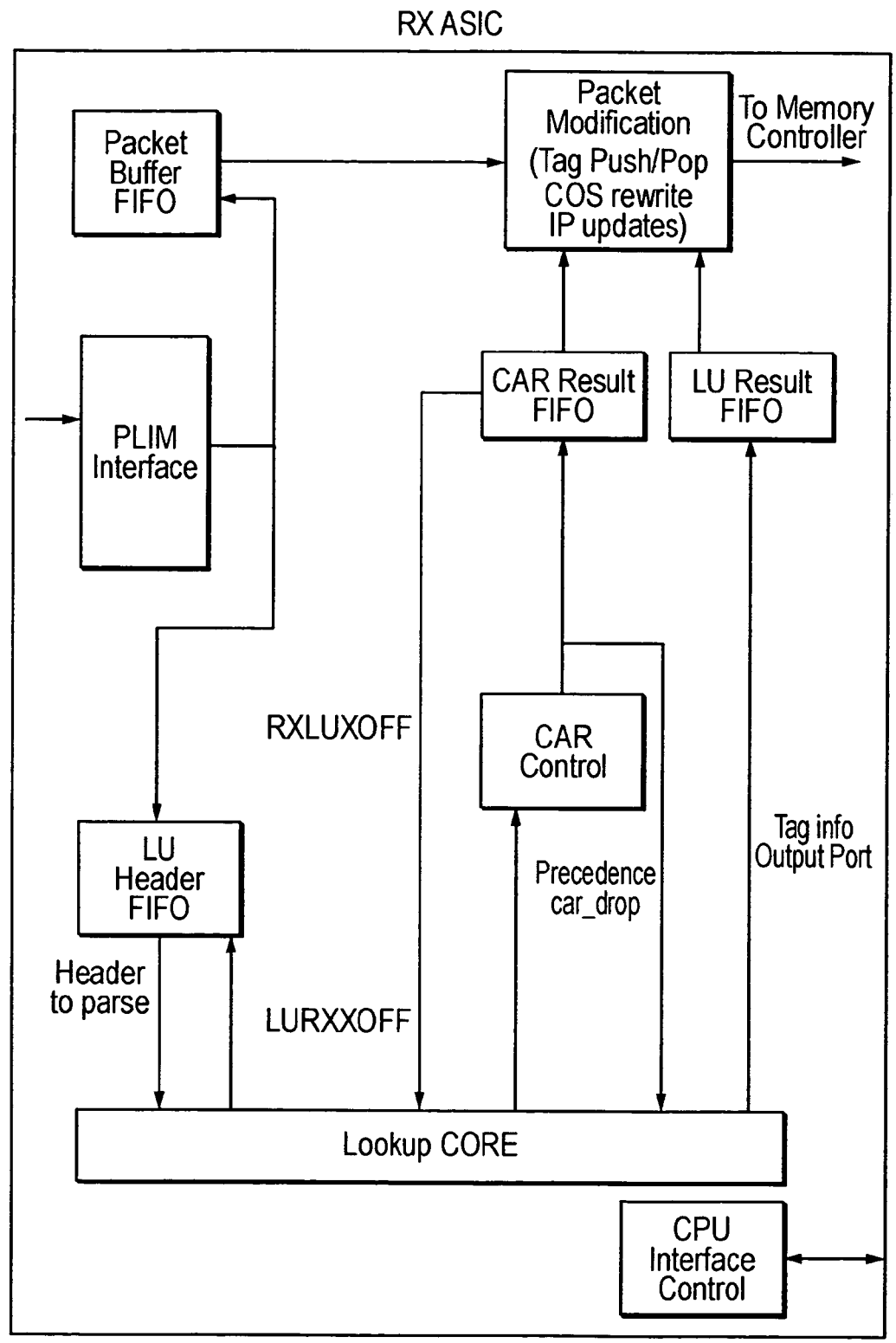
FIG. 8 is a block diagram of the internal data paths of the RX ASIC.

FIG. 8 is a internal block diagram of the data paths of the RX ASIC:

The RX ASIC receives packets from the PLIM interface and stores them in the internal RX Packet Buffer SRAM. The packets in the internal RX Packet Buffer are organized as a FIFO. The RX ASIC sends the packet headers along with the Input Port, the packet length and the Input Port Type for the packet to the L3 Lookup (LU) section once a complete header has been received. When the LU section returns the indices into the packet for the beginning of the IP section and the MAC section, the RX ASIC checks the CAR Action SRAM to determine which action should be taken with the packet. The CAR action indicates if the packet is sent to the Memory Controller (MC) or dropped. At this point the RX ASIC also performs IP TTL Decrement and Checksum update as well as Pushing up to four Tags and Popping up to three Tags for Tag Switching.

Using the information returned from the LU section, the RX checks the CAR access lists for that input Port to determine which match rule to select. The CAR match rules compare the rate on that input port to the conforming rate level. The rate is counted using a Token Bucket algorithm. There are two actions per CAR Rule: one if the current rate is less than the conforming rate and the other if the current rate is exceeding the conforming rate. The possible CAR actions are:

a) Transmit b) Drop c) Set In/Out bit in the IP TOS Field and Transmit d) Unset In/Out bit in the IP TOS Field and Transmit e) Replace IP TOS Field or Tag COS Field and Transmit The LU results return in the order of the incoming packets. The LU section returns to the RX ASIC the following information for a packet: Output Port and Rewrite # pointer, Packet Info, Index to IP address, and Tag info.

The Output Port indicates to which Output Port the packet should be sent. The Rewrite Number indicates which rewrite function and data should be performed on the packet. The Packet Info indicates if the packet is a Unicast or Multicast packet, what type of packet format is needed for the RX→MCC interface or if the packet needs to be dropped. The Index to the IP address indicates at what offset from the beginning of the packet that the start of the IP packet is, for CAR purposes. The Tag info is used for indicating which Tag operation to perform, i.e. Tag Pushing or Popping as well as providing the Tags to be pushed.

The RX ASIC has a FIFO of incoming packet headers that need to be sent to the LU section. Once a LU result is returned for a packet, it is processed through the CAR circuitry, and then stored in the LU Result FIFO. The results at the top of the LU Result FIFO are sent to the MCC when the previous packet has finished being sent to the MCC. The packet is read from the Packet Buffer FIFO and then has Tags added, replaced or removed or has the IP Checksum and TTL and TOS fields updated by the Packet Modification module.

Then the packet is transmitted to the Memory Controller. The XOFF signal from the Memory Controller indicates to the RX ASIC that no more packets should be sent. Packet transmission to the MCC ASIC is stopped in mid-transmission when the XOFF signal is asserted.

Packets can get dropped in one of the following three places:

a) CAR could drop them due to rate overflow.

b) CAR could drop them due to LU result drop indication.

c) PLIM header's protocol type could indicate that packet should be dropped.

When the LU result indicates that a packet needs to be dropped, the packet needs to be transmitted from the Packet Buffer but the MCC interface is not notified that the data is valid and hence the packet does not get transmitted. The same approach is used to transmit packets that CAR drops.

Packet Buffer FIFO

The function of the Packet Buffer FIFO is to buffer packets coming from the PLIM until LU module returns the lookup result, then the packet is sent along with the MCC header to the MCC ASIC. It is a cut-through operation which does not require the whole packet to be buffered before the sending to the MCC. The Packet Buffer FIFO module takes in the 128-bit data and 3-bit command from the PLIM interface module and stores them into a FIFO. When the command is valid, the data along with the command are written into the FIFO.

LU Header FIFO

The function of the LU Header FIFO is to buffer packet headers and send them to the LU module in a fixed format. Similar to the Packet Buffer FIFO module, the LU Header FIFO module also takes in the same 128-bit data and 3-bit command from the PLIM Interface module and stores them into a FIFO. Packets from the PLIM are preceded with a 4-byte PLIM header. The PLIM header (4B) along with the first 44 bytes (for short packet) or 60 bytes of the payload are passed to the LU module. The maximum number of 128-bit word stored per packet is four. Since the packet coming from the PLIM must be 128-bit aligned, the header stored may be one, two, or three 128-bit word for short packet.

A FIFO input state machine is used to figure out the number of words to be stored into the LU Header FIFO and to append END command to the last 128-bit word of the header. It also signals a complete header received before sending the header to LU module since the LU module interface doesn't allow IDLE cycles within the header. A FIFO output state machine is used for reading header out of the LU Header FIFO, and generate control signals for 0's padding. The need for padding is because the LU module expects the packet header to be either 48 bytes or 64 bytes. The packet header is sent to the LU module through a 128-bit data and 3-bit command interface.

CAR Header FIFO

The CAR Header FIFO is used for temporary storage of packet headers going to the LU module while the CAR module waits for the LU results. When CAR module gets the lookup results from LU module, it will access header information from this FIFO for CAR processing.

The input to this FIFO comes from the LU header FIFO output processing stage which sends out header to LU in either 48 bytes or 64 bytes, i.e., it stores the exact packet header that is transferred across the LU interface, including any padded bytes.

LU CORE Interface

The RX<->LU consists of two interfaces: RX→LU, which sends packet header and LU→RX, which sends packet indices, labels, output port and rewrite # and AS #for CAR.

CAR Functionality

The packet headers are sent to the LU section for three purposes, 1) to determine if the packet should be received or dropped, and 2) to provide an IP index into the packet for the CAR function, 3) to provide routing information. If the packet is dropped then that is indicated by the LU section. In the case of a dropped packet the packet is still transmitted from the Packet Buffer memory, but the Memory Controller interface is not notified that a packet is being sent.

If the packet is to be transmitted, then the CAR Control block uses the IP index provided by the LU section to parse the packet and use the IP TOS or Tag COS to select a CAR Token Bucket. The CAR Token Buckets determine if the conform or exceed action is selected.

The following CAR actions are described below: Transmit, Set IP TOS or Tag COS and Transmit, Drop, Set In/Out bit to ONE in TOS field and Transmit, Unset In/Out bit to ZERO in TOS field and Transmit.

If the action is Transmit, then the packet is transmitted as normal. If the action is Set IP TOS, then the CAR circuitry provides a new field for the 8 bits of the IP TOS field in the IP header (or 3 bits of the Tag COS field in the Tag Label). If the Action is Drop, then the packet is dropped. If the action is Set the In/Out bit the In/Out bit in he TOS field is set, whose location is selected by the In/Out pointer register. If the action is Unset the In/Out bit the In/Out bit in the TOS field is unset, whose location is selected by the In/Out pointer register.

To determine if a rate is conforming or exceeding its allowed rate the actual rate is compared to a Token Bucket counter. The Token Bucket method operates by using a Token Bucket that collects tokens at the prescribed rate. The Token Bucket has a prescribed capacity, so that when the bucket overflows, tokens are discarded. When a packet arrives, the number of tokens equal to the length of the packet are removed from the bucket. The Token Bucket can never contain a negative number of tokens. If the number of tokens in the bucket are less than the length of the packet then the rate is exceeded i.e. is non-conforming, else it is conforming.

The TOS field (or for Tagged packets the Tag COS field) is used to select the Token Bucket whose rate is to be checked to see if it conforms or exceeds.

CAR Token Bucket Counters

An SRAM table look up results in a 6-bit value called CAR_rule (1-bit for indicating the default rule, and 5-bit for the 32 CAR rules). This 6-bit CAR rule value along with a 4-bit port number are used to access a particular CAR rule within the Token Bucket SRAMs, which consists of 528 addressable locations (512 CAR rules+16 default rules). Locations 0-511 are for CAR rules and 512-527 are for default rule. Bit-5 of the CAR_rule is used to select between CAR rule and default rule. If CAR_rule[5]=0, the port number and CAR_rule[4:0] are used to select 1 of the 512 CAR rules, and if CAR_rule[5]=1, only the port number is used to select one of the 16 default rules.

CAR token bucket counters are the same for both inbound (RX) and outbound (TX) rate checking.

Tag Switching

The RX ASIC performs MPLS tag pushing and MPLS tag popping for Tag (MPLS) Switching of Unicast packets. Multicast packets have their MPLS tags handled by the TX side of the Fabric.

The LU CORE indicates to the RX ASIC if Tag pushing (and the tag to be pushed) or popping is required. There are a number of different packet types for which Tag Push/popping must be performed, such as Tag over Ethernet and Tag over POS. Tags are not added to Multicast packets in the RX ASIC.

The LU CORE provides the Tag COS when the LU CORE indicates that a Tag PUSH operation is required. This LU Tag COS is used to provide the Tag COS when Input CAR is not used to determine the Tag COS. When an additional label is pushed onto the stack of a packet that is, already labeled, then the value of the COS field in the new top stack entry should be equal to the value of the COS field in the old top stack entry, unless the new COS field is determined by Input CAR policy.

The TTL field has to be decremented for Tagged packets. If the TTL field will be zero after being decremented, the LU CORE will have indicated that the packet is to be sent to the CPU. The TTL field of the outgoing packet is a function of the incoming TTL value independent of whether any labels are pushed or popped before forwarding. When an IP packet is first tagged, the TTL field of the Tag is set equal to the TTL field in the IP packet, unless the LU indicates that a constant value from the RX Constant TTL Register supplied by the router should be placed in the Tag TTL field. When the last Tag on the stack is popped, then the IP TTL field is set equal to the TTL value from the last Tag if the Tag TTL value is less than the IP TTL value, else the IP TTL value remains. If the IP TTL value is set equal to the Tag TTL value, then the IP checksum needs to be modified.

Leaving the TTL field untouched as it goes through the router allows the tag network to be invisible to traceroute if the network operator desires.

The maximum number of tags that can be pushed per tagged packet is four (one of which is a replace if the packet is a tagged packet). The maximum number of tags that can be popped per packet is three.

Forwarding for tagged packets based upon the IP header will only be provided for tagged packets with a tag stack of depth one where that tag is the null tag. The number of tags on the stack does not matter, as only the boundary conditions matter in pushing and popping tags Thus there are the following Tag Operations Functions:

| Tag Operations | Update of Tag TTL Field | Update of Tag COS Field |
|---|---|---|
| 0 tags -> N tags | TTL = IP TTL or constant (255) | CAR COS or LU COS |
| N tags -> N + M tags | Tag TTL from Tag TTL | CAR COS or LU COS |
| N tags -> N − 1 tags | Tag TTL from Tag TTL | CAR COS or LU COS |
| 1 tag -> 0 tag | IP TTL or Tag TTL | |

In case 4 above, when the last Tag is removed, the TTL field in the IP packet is replaced with the Tag TTL in the packet that was Popped if the Tag TTL was less than the IP TTL field. Else the IP TTL field that was there remains. If the IP TTL field needs to be updated with the Tag TTL, then the IP Checksum needs to be recomputed. In this case the last tag is removed in the L2 Header removal module and then the packet is sent to the IP Checksum update module.

IP TTL Decrement, TOS replacement and Checksum Update

Using the IP_index from the LU CORE, the RX can determine where the MAC address ends and the IP address begins. The LU indicates if the packet is a tagged packet or not so that then the RX ASIC can locate the TTL field and decrement it. The IP Checksum is updated using the calculation in Internet Request for Comments (RFC) 1624, incorporated herein by reference in its entirety.

The L2 Header Removal module removes the L2 header so that only an IP packet remains to perform the above calculations on. In the case of popping the last Tag, the IP TTL and hence IP Checksum need to be updated. In this case the L2 Header Removal module removes the last Tag and then the packet is sent to the IP Checksum update module.

Packets bound for the CPU

Packets that need to be sent to the CPU are sent to the MCC first. Packets that are sent to the CPU retain their L2 headers and thus bypass the IP Checksum/Tag Push Pop logic in the Packet Modification Module.

If the PLIM interface Port Type indicates that the packet is destined for the CPU, the PLIM Status field and the PLIM Protocol Type are sent to the CPU in the Input Info field as part of the RX→MCC header. If the LU indicates that the packet is for the CPU, the LU CORE provides the Input Info field.

Packets bound for the CPU use the default Token Bucket for that input port.

Lookup Unit (part of RX ASIC)

The LookUp Engine (LU) performs forwarding table lookups on packet headers that it receives from the RX ASIC. LU switches all IPv4 packets that have a standard header and directs all other IP packets to the Linecard processor (LCPU). The LU also switches MPLS tag packets.

The LU receives packet headers from the RX ASIC, verifies the L2 framing and extracts the L3 datagram or uppermost MPLS tag, then performs a forwarding lookup. The forwarding lookup returns an index into the adjacency table. The lookup results are passed back to the RX ASIC in the same order they were received from the RX. LU counts packets and bytes switched for each forwarding table lookup leaf.

The LU can be programmed to recognize the L2 encapsulations for Packet-over-SONET, SRP/Merlin, Ethernet, and ATM frames. The LU forwarding table supports 250,000 entries, and the adjacency table supports 64K next hops with up to 8 load shared links. LU also supports source address lookups for IP multicast RPF check, source AS-based CAR, and source spoofing checks.

Figure 9:
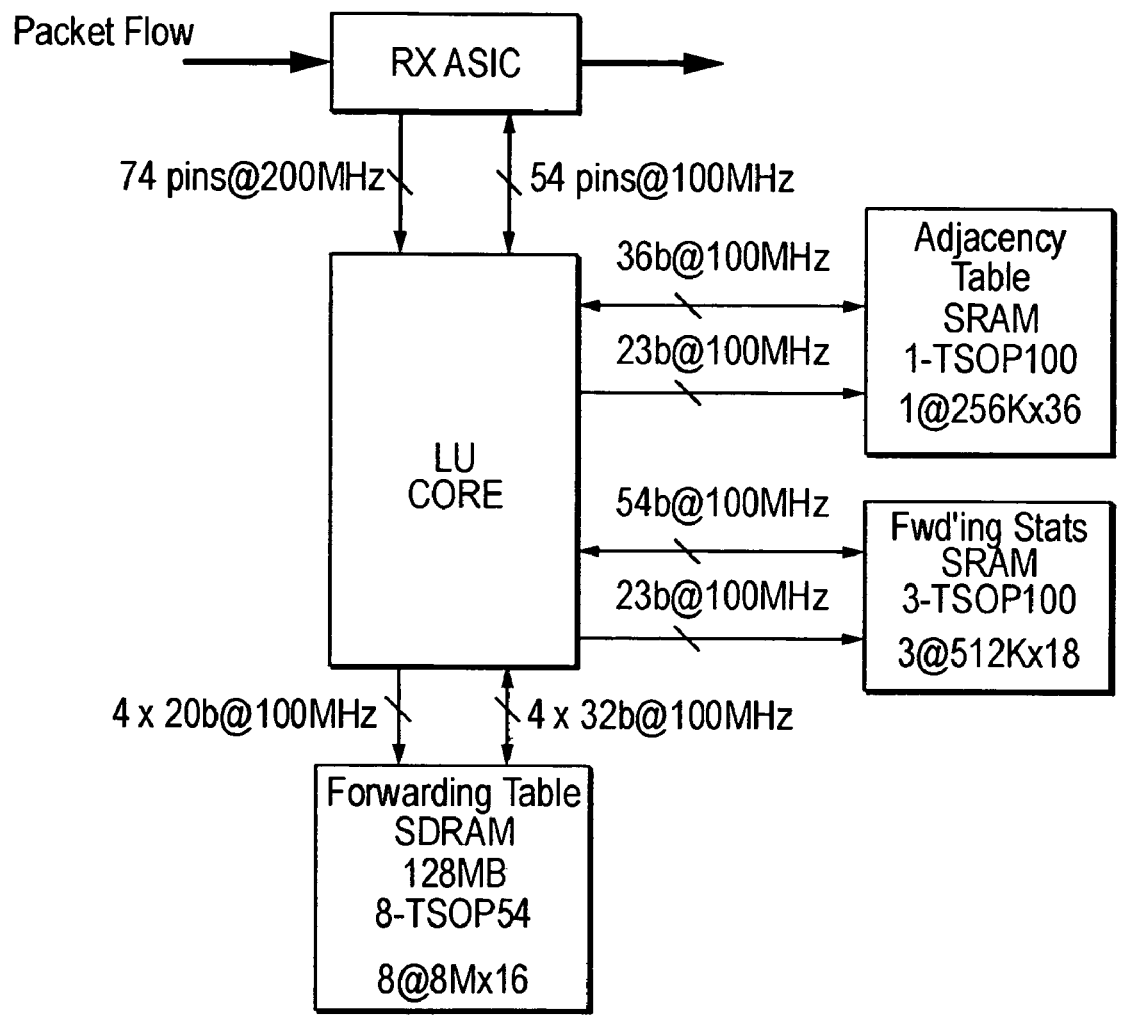
FIG. 9 is a high-level block diagram of LU interfaces.

The LU interfaces to the RX ASIC and has external memories for forwarding table storage, adjacency storage, and statistics accumulation. FIG. 9 shows the LU environment.

Figure 10:
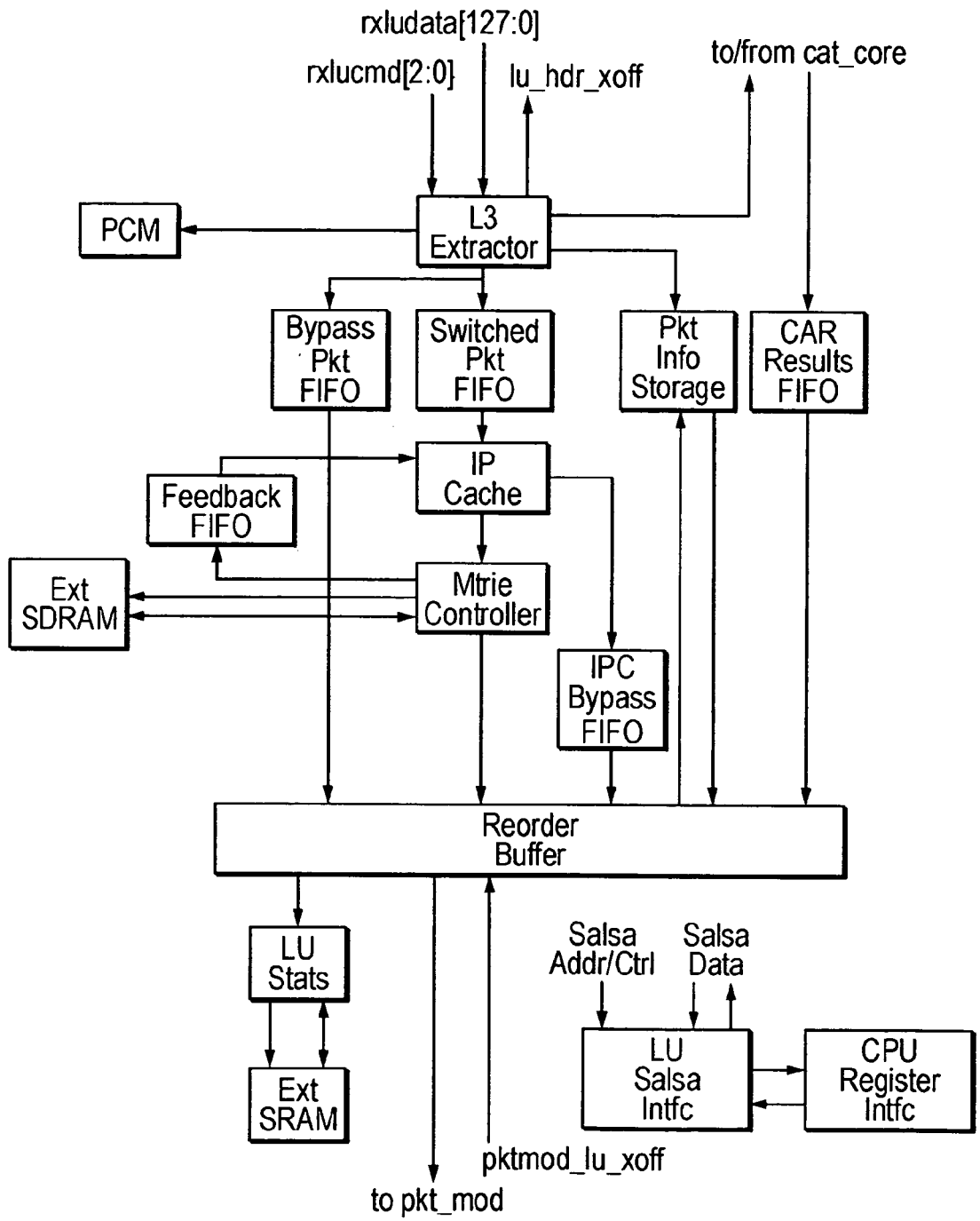
FIG. 10 is a functional block diagram of the LU.

The LU is composed of an RX ASIC interface and packet header buffer, L3 datagram extractor, IP header validity checker, lookup controller, adjacency lookup controller, packet reorder buffer, and statistics accumulators for forwarding lookups. The top level chip functional block diagram is in FIG. 10.

Description of Operation

The LU interfaces with the RX ASIC to perform forwarding decisions on the L3 datagram contents. LU starts by determining the frame (or packet) encapsulation and passes that information, in the form of an offset to the start of the L3 datagram or MPLS tag stack, back to the RX ASIC. After the IP header is extracted from the frame, the IP checksum is verified, the TTL field is verified, the IP header is length and consistency checked (i.e. no options), and the L3 datagram length is checked against the L2 frame length. LU then passes the header to the forwarding lookup engine. If the packet is MPLS tagged, the Tag TTL is checked and it is then sent to the forwarding lookup engine. This logic block can take a variable number of cycles to make a forwarding decision for the packet. Either the forwarding table has an entry for the packet destination, in which case an adjacency list index, AS label and prefix/tag labels are returned, or the packet is unroutable, in which case the packet is flagged for redirection to the linecard processor queue or is dropped depending on the setting of a global mode bit.

LU keeps statistics on the number of packets and bytes that are switched for each route prefix and MPLS tag label in off-chip SRAM. The forwarding table is stored in external SDRAM. The SDRAM is tightly coupled to the lookup state machine. The design cannot use industry-standard form factor DIMMs because each pair of memory devices has a separate address/command bus, but the memories themselves are standard devices in the personal computer marketplace. The forwarding table provides an index into the adjacency table which determines the output slot and port as well as a label used to select the output encapsulation.

RX ASIC Input Receiver and Packet Header Buffer/Demux

The RX ASIC sends the first 60 bytes of the received packet to the LU along with a 2 byte packet length, a 1 byte interface number and a 1 byte interface type/status for a total of 512 data bits. The data is transferred in 6 or 8 cycles at 200 MHz over 64 signals. The LU will use the standard OC192 Linecard dual-source clocked receive module for this block.

The LU controls the rate of packet headers from the RX ASIC by asserting the XOFF signal from the LU to the RX ASIC. This signal is in the 100 MHz clock domain of the LU so it is asynchronous to the packet header data signals from the RX ASIC. Since a packet header data transfer is indivisible, and asynchronous, there is at least a three transfer latency to signal the RX ASIC to stop transferring packet headers. The actual flow-control signal is generated from the Lookup Input FIFO since all the intermediate blocks (L3 datagram extractor and L3 datagram checker) have a fixed latency. The Lookup Input FIFO is oversized to allow for the latency of the loop from detection of "fullness" of the Lookup Input FIFO to the end of packet header transfers from the RX ASIC.

The output of this block is a 128b wide bus synchronous with the ASIC clock. The data on the bus is in either 3 or 4 beat bursts. The start of burst is signaled by a START signal and the duration of the burst is signaled by the VALID signal. The START signal is active only on the first beat of the burst, and the VALID signal is active for each beat, including the first, of the burst. The burst is not divisible; once START is active the rest of the burst must occur on the next 2 or 3 clocks depending on burst size.

L3 Datagram Extractor

The L3 Datagram Extractor finds the L3 datagram, or the MPLS Tag header if present, within the L2 frame. The extractor is a very wide multiplexer. The select signals for the multiplexer are determined by the settings stored in the Framing Parameter Store and the matching conditions in the L2 header. The Framing Parameter Store is indexed by the protocol_type field in the byte 4 of the packet header from the RX. The least-significant 4b of the protocol_type field are used to select one of 16 possible port types. These are enumerated in the PLIM specification (duplicated here):

L3 Packet Checker

The L3 packet checker receives the 20B L3 header. This logic performs checks on the L3 datagram header to verify that it can be processed by the LU forwarding engine. If the packet fails these checks it may still be forwardable, but cannot be switched by LU. The packet checker performs consistency checks on the extracted IP header or Tag.

Note that the To-LCPU outcome of the IP switching rules can be individually set to Drop with a control register. The default setting is Send-to-LCPU.

The TTL To-LCPU outcome of the MPLS switching rules can be set to Drop. The default setting is Send-to-LCPU.

The output of the packet checker is:
a) A valid signal that indicates that the IP addresses or Tag label has been extracted,
b) A IP/Tag signal indicates that the packet is IP (=0) or Tag (=1),
c) Unicast/Multicast signal indicates that the packet is Unicast (=0), or Multicast (=1), d) A 2b mode signal that indicates how the packet should be handled by the LU engine (00: Drop, 01: HW-switch, 10: Send to LCPU, 11: Reserved),
e) The 1B source port number from the PLIM header,
f) The 1B Protocotype/Port_Status from the PLIM header,
g) A 8B bus that holds the Tag label in the lower 20b for Tag packets, and the IP source and destination address in the upper and lower 4B, respectively, if the packet is IP. Null Tag packets are resolved to IP packets in the packet checker with the proper modification of the other module outputs,
h) The 8b IP TOS field, or the 3b MPLS CoS field,
i) A 1B serial ID that comes from a counter that increments every time that a packet is output from the packet checker. It is used to establish the input order of the packets so that they can be reassembled in that order by the re-order buffer at the end of the lookup stage.

There is a one cycle delay in crossing the packet checker.

Work and Bypass Queues

There are two queues that receive the packets from the packet parser. The lookup work queue receives the packet if the mode signal indicates that the packet is to be switched. All other packets go into the bypass queue. The LU work queue is emptied by the lookup controller. The bypass queue is drained by the reorder buffer. There is an 8b packet processing counter. It keeps a count of the number of packets that have been received from the RX but have not completed lookup and had forwarding information returned to the RX. This counter has a limit register associated with it that can cause a flow control signal to be asserted to the RX. The value of this limit is programmable so that it can be "tuned" during operation.

Forwarding Table Lookup

The lookup controller receives the packets from the LU work queue. The packets have a 2b tag with them that indicates whether they are IP or Tag, and if they are Unicast or Multicast. The packets also have a 8b serial ID.

The forwarding table is an M-Trie structure contained in an external SDRAM memory array. The lookup uses the IP destination address, IP source address and interface number to determine the forwarding information and the autonomous system (AS) label associated with the route. The packet ID, "Send to LCPU" and "Drop Packet" flag, and AS label are sent to Adjacency Table controller.

The forwarding table is normally accessed twice per packet. This occurs when any of three conditions occur: if the packet is multi-cast and requires an RPF check to determine if the packet should be dropped or replicated, if AS labels are used in packet classification, or if source route verification is enabled to detect source address spoofing (i.e. smurf attacks, etc.). The performance of the LU forwarding table lookup logic is high enough to allow all packets to have both a source and destination address lookup while still maintaining 25 Mpps with a typical Internet mix of traffic.

The lookup controller can be programmed to operate in either single or dual lookup mode. In single lookup mode the controller only looks up the destination IP address. There is no source RPF check and the Null AS label (ASL=00) is returned for the source AS label. In dual lookup mode the controller looks up both the source and destination address.

Search Algorithm Performance Requirements

The L3 forwarding path is determined by searching the forwarding table for a route prefix that is the longest match for the IP destination address from the IP datagram. The Internet routing table is currently around 50,000 routes and is increasing. LU supports over 250,000 routes to allow for future expansion and to allow other forwarding information to be included in the table. Because the chosen route must be the one that is the longest match to the destination address the search must be more sophisticated than just a simple match.

The lookup resolves forwarding decisions at a rate that allows wire-speed throughput of the packets. LU is designed for an OC192 aggregate line rate, 9.95 Gbps. The Internet average frame size has been increasing and is now estimated to be above 300B. The expected increase in real-time flows may lower this somewhat.

Search Algorithm Choices

Three methods were considered for LU forwarding lookups: Ternary CAM, Hashing and M-Trie. A CAM solution was rejected because a ternary CAM capable of storing 250,000 routes is not feasible for on-ASIC integration. An external CAM is not a solution because there is no device of the size needed.

Hashing was rejected because the search time can be very non-deterministic, there is a need to do multiple searches due to longest match prefix aggregation, and the storage requirements are high due to the need to store the match value and mask in each entry.

The M-Trie search technique which was chosen is an optimization of a bit-by-bit tree search. A bit-by-bit search has the minimum storage requirement, but would require up to 32 tests for IPv4 unicast, and more for multicast. The M-Trie search technique allows an M-way branch from a base address in a storage array. To use this method the IP destination address is broken into N fields. The fields are searched in order until a match is found or there is no more depth to the tree. Because the IP addresses are formed with the net address in the upper portion of the address and the host address in the lower portion, the search begins with the uppermost field of the address. This field is added to the base address to compute an entry address for the storage array. The contents of that entry can be either a node or a leaf. A leaf is an entry that resolves a route prefix. It completes the search and has as its value the forwarding index and other destination information. A node is an intermediate point in the M-trie that indicates that at least one more field needs to be checked before the route is determined. As with the hash-based method, the aggregation into N groups of address bits means that storage entries must be replicated for prefix lengths that do not fall on address bit field boundaries. For unicast route storage the memory required for the M-Trie and hash-based methods are approximately the same. The M-Trie method has two advantages in other cases. Because the depth of the tree is well bounded and known, the route search completes in a small number of memory accesses. The search for multicast (S, G) addresses is not a problem for M-Trie because the tree walk is stateful so only those entries that need the extra tree levels for additional data consume more storage, in the form of added branches and accesses.

SDRAM Organization

The forwarding table is constructed in an SDRAM memory array. The memory array is composed of four independent memory subsystems or heads'. Each head has a completely independent command and data path interface. The SDRAMs in each head are 100 MHz devices with 4 internal banks per device. There are two 8M×16 bit devices in parallel for a 32 bit data path width. The SDRAMs are operated with a burst length of two to produce a 64b result per lookup access. This produces a maximum lookup access rate of 1 every 20 ns per head. Since the heads are independent and may operate simultaneously, the maximum lookup rate is 200 Maccess/sec. This assumes ideal distribution of memory accesses among the heads and banks. The worst case lookup rate is 12.5M access/sec. A route lookup can take from 1 to 3 accesses. The design of the lookup controller and the construction of the forwarding table attempt to preserve parallelism in the memory system and, therefore, allow a high packet forwarding rate.

There are 16M total entries in the SDRAM M-Trie. The address of an entry is formed by merging a base address from one of the four initial lookup registers with the address bits from the selected portion of the concatenated source/destination IP address, or the MPLS tag label. The smallest portion of the addresses or label that can be selected is four bits and the largest is 24 bits (i.e. all of SDRAM). The maximum base address field in the initial lookup registers and the node entries is 20 bits which allows for a 24 bit memory address since the least significant 4 bits are implied and are always zero. Each entry is 64 bits wide and can be invalid, or a node, IP leaf, or MPLS Tag leaf. MPLS leafs are constructed of two consecutive entries starting with the lower numbered address.

Common Format Fields

Each of the memory entries has a flag field, an ECC check field, and a forwarding statistics index field. There are 4 bits allocated for flags, though only three are used. The format is:

vntx.eeee.eee-
e.xxxx.xxxx.xxxx.xxxx.xxxx.xxxx.xxxx.xxxx.xxxx.
xxxx.xxxx.xxxx.xxxx where
v=Valid flag—indicates that the entry is active when 1,
n=Node flag—indicates that the entry is a node when 1,
t=Tag flag—Indicates that the entry is an MPLS tag leaf when 1,
eeee.eeee is the ECC field that will correct all single bit errors, and detect all double bit errors,
x=A variable field The ECC check field is an 8 bit SEC/DED error check code for the 64b entry. This allows the correction of single bit errors, and the detection of two bit and multiple odd bit errors.

Node Format (64b)
110z.eeee.eeee.ssss-
.llll.zzzz.zzzz.zzzz.zzzz.zzzz.zzzz.bbbb.bbbb.bbbb.
bbbb.bbbb where:
z is an unused bit,
eeee.eeee is the ECC field that will correct all single bit errors, and detect all double bit errors,
ssss is the offset into the lookup address,
llll is the length of lookup address that is to be merged into the bbbb . . . bbbb base address (shifted up by 4 bits before use),
zzzz is a reserved (must be 0) field.
bbbb . . . bbbb is the 20b value representing the base address of the next level in the
M-trie. The actual base address is this value*16 (i.e. there are 4 implied zero LSB bits).

The destination IP address is located in the offset range 31 to 0, and the source IP address is located in the offset range 60 to 32. MPLS Tag labels are located in offset range 16 to 0. The LSBs of the address or label are always in the lower numbered offset positions. For MPLS labels the upper positions are undefined. The following figure shows this pictorially.

The destination IP address is located in the offset range 31 to 0, and the source IP address is located in the offset range 60 to 32. MPLS Tag labels are located in offset range 16 to 0. The LSBs of the address or label are always in the lower numbered offset positions. For MPLS labels the upper positions are undefined. While it is legal, it would be unusual for an M-trie access to be constructed from a range that spans the two IP addresses.

IP Leaf Format (64b)
100c.eeee.eeee.pppp.aaaa.aaaa.ii-
ii.iiii.iiii.iiii.mlll.rrrr.rrrr.rrrr.rrrr.rrrr where:
c is the enable for source port/address checking (i.e. RPF),
eeee.eeee is the ECC field that will correct all single bit errors, and detect all double bit errors,
pppp is the expected source port,
aaaa.aaaa is the AS label associated with the address,
iiii . . . iiii is the adjacency table index,
mlll is the load sharing mode field; the load sharing modes are:

| mlll | Operation |
|------|-----------|
| 0000 | No load sharing, single adjacency entry for this link |
| 0001 | 2 equal cost links in iiii . . . iiii to iiii . . . iiii + 1 |
| 0010 | 3 equal cost links in iiii . . . iiii to iiii . . . iiii + 2 |
| 0011 | 4 equal cost links in iiii . . . iiii to iiii . . . iiii + 3 |
| 0100 | 5 equal cost links in iiii . . . iiii to iiii . . . iiii + 4 |
| 0101 | 6 equal cost links in iiii . . . iiii to iiii . . . iiii + 5 |
| 0110 | 7 equal cost links in iiii . . . iiii to iiii . . . iiii + 6 |
| 0111 | 8 equal cost links in iiii . . . iiii to iiii . . . iiii + 7 |
| 1000 | unequal cost table in iiii . . . iiii to iiii . . . iiii + 15 |
| 1001 | |
| 1010 | |
| 1011 | |
| 1100 | Port-mapped Policy-based Routing |
| 1101 | CoS-mapped Policy-based Routing |
| 1110 | Source AS-mapped Policy-based Routing |
| 1111 | Destination AS-mapped Policy-based Routing | rrrr . . . rrrr is an index into the prefix statistics counter array to allow node accesses to be counted as well as leaf accesses, Tag Leaf Format (128b)
101z.eeee.eeee.gfff.t1t1.t1t1.t1t1.t1t1.t1t1.t2t2t2t2.t2t2.
t2t2.t2t2,t3t3.t3t3
101z.eeee.eeee.t3t3.t3t3.t3t3.t4.t4.t4.t4.t4.t4.t4.t4.t4.
qccc.

where:
z is an unused bit,
eeee.eeee is the ECC field that will correct all single bit errors, and detect all double bit errors,
g indicates if the new Tag TTLs should be cloned or set to a constant stored in the RX,
fff is the operation to be performed to construct the outbound Tag packet,
The encoding for the tag operation field (fff) is:

| Value | Tag Pkt Operation | IP Pkt Operation |
|-------|-------------------|------------------|
| 000 - | No Operation | No Operation |
| 001 - | Pop1 | — |
| 010 - | Pop2 | — |
| 011 - | Pop3 | — |
| 100 - | Replace1 | Add1 |
| 101 - | Replace1 + Add1 | Add2 |
| 110 - | Replace1 + Add2 | Add3 |
| 111 - | Replace1 + Add3 | Add4 | t1 . . . t1, t2 . . . t2, t3 . . . t3, t4 . . . t4 are the four Tag labels that can be added to the outbound Tag packet.
q is the enable for CoS overwrite,
ccc is the new CoS field for the new Tag labels,
iiii . . . iiii is the adjacency table index.

Because the MPLS tag entries are a double entry structure the lookup controller generates two sequential accesses.

Figure 11:
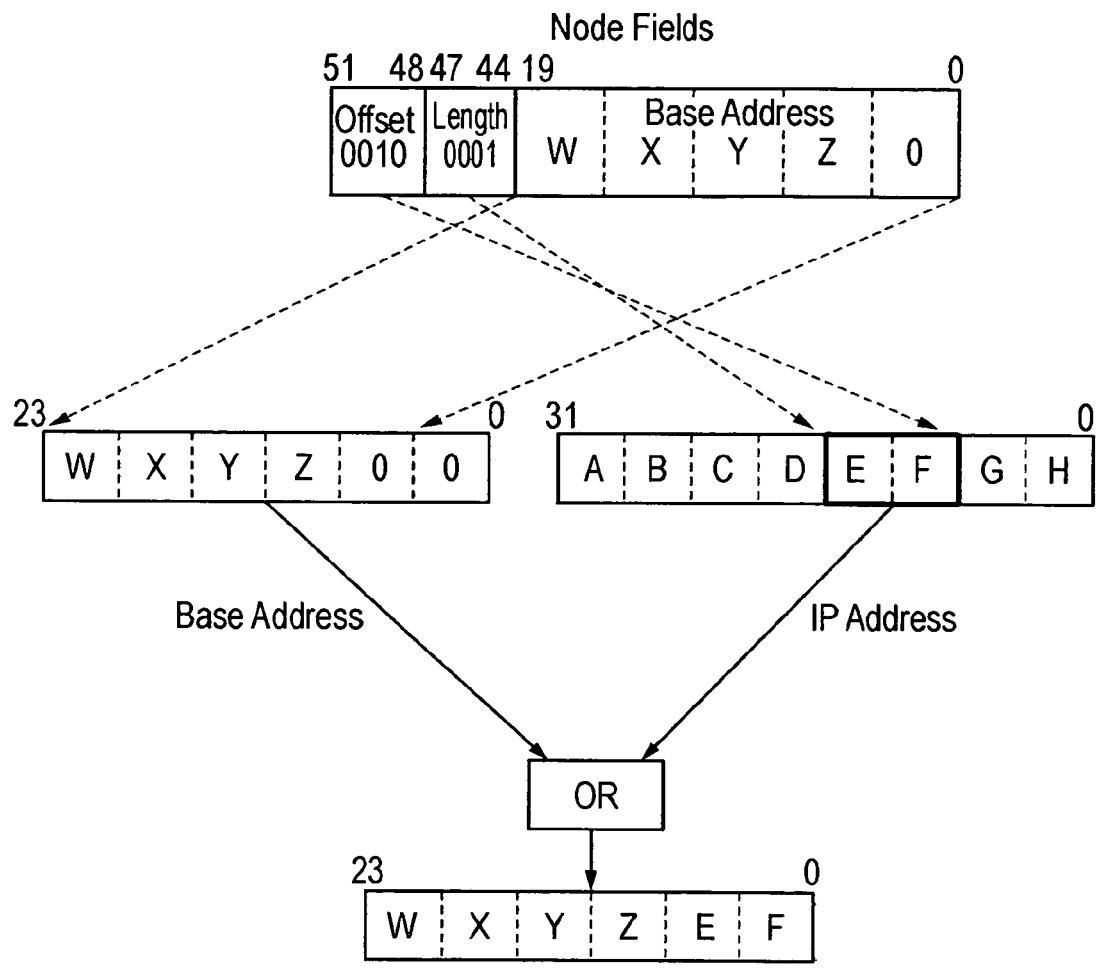
FIG. 11 is a schematic example of one method of forming a next M-trie entry address.

FIG. 11 shows how the next M-trie entry address is formed from the base address in the node entry and the portion of the IP addresses selected by the offset and length fields. For simplicity of the drawing only the lower 32b of the IP addresses is shown in the following figure.

Memory Refresh and Error Detection

The SDRAM memory arrays must be refreshed while the memory system contains valid data. The LU must provide this function at a rate that satisfies the SDRAM device requirements. This requirement is for 4,096 refresh operations, one per row, to be performed every 64 ms, or one operation every 15.6 microseconds. The simplest way to perform this function is to use the CBR refresh command. This command uses a row counter that is in the SDRAM device to sequence through the rows. The CBR command requires that all banks be in the precharged (non-active) state, so all lookup access cycles must be stopped to perform this command. For this reason the following alternative method of SDRAM refresh will be used.

The other way to perform refresh is to guarantee that there is a read to each row of each bank every 64 ms. This can be scheduled into the lookup control logic so as to cause less overhead than the CBR refresh command because these reads can 'steal' cycles for which there is no active lookup read operation queued. This read operation can be part of an error checking function that verifies the ECC check field of the entry and 'scrubs' any single bit errors that are found as well as reporting them to the LCPU. A complete sweep of all of SDRAM will occur every 16.4 sec. It is highly unlikely that a multiple bit soft error will occur within that time, so the error detection logic should be able to scrub any soft errors from the SDRAMs. All multibit error cases result in the entry being marked invalid by clearing the Valid bit in the Flags field of the entry so that no lookup uses the entry.

Another function of the Refresh/ECC will be to initialize the SDRAM and clear it to an all-invalid/correct-parity state.

Initial Packet Lookup Selector The Initial Packet Lookup Selector uses the interface type field from the packet header data to determine the initial base address. There is a base address for each lookup type. There are four lookup types:

a) IPv4 unicast, standard M-trie
b) IPv4 multicast M-trie
c) MPLS unicast table
d) MPLS multicast tables (up to 16, one per port)

The Initial Packet Lookup Selector uses a small register file to associate an initial offset, length and base address with the lookup type. The lookup type is determined from the 2 bits passed from the packet checker module. The Initial Packet Lookup Selector also saves the source and destination address, and the other information passed from the packet checker module, in the address holding memory indexed by the packet identifier. This memory is used by the recirculation controller to form the subsequent M-trie memory addresses, and its other contents are passed on to the adjacency controller via the reorder buffer.

Strange Burst Cache

The Strange Burst Cache is a 256 line, 4-way set associative cache of the last IP address lookups. The purpose of this cache is to prevent a stream of packets with a very small range of IP addresses from causing the lookup forwarding rate to drop below line rate due to insufficient parallelism in the SDRAM memory arrays. In normal operation the IP addresses will have a wide range because of the degree of aggregation that will occur in building up to an OC192 (9.95 Gbps) stream. The conditions where this cache will contribute significantly should only occur during testing and benchmarks. The cache is loaded with the completed lookups from the M-trie for IP traffic. The replacement algorithm is true LRU. The cache is indexed by the XOR of all four bytes of the IP address. All 4B of the IP address are compared to the cache tag to determine if the cache has a match for the address. If both source and destination addresses hit the cache the packet will bypass the lookup engine and is passed directly to the reorder buffer. The cache has a 1b control register which enables the cache and allows new entries to be loaded into the cache. When the enable bit is zero all cache entries are invalidated. The cache uses a total of 81,000 bits of memory. The entries store only 52b of the IP leaf data, dropping the flag and ECC check fields. The cache tag and data RAM entries are each protected with one bit of parity.

M-Trie Lookup

The M-Trie lookup is an iterative process starting with the initial access determined by the Initial Packet Lookup Selector. The access to SDRAM takes on the order of 10 cycles. Since the memory cannot be idle for this length of time and still sustain the OC192 line rate forwarding, multiple packet lookups occur in an overlapped manner. An individual lookup can take multiple accesses into SDRAM to reach a leaf. This means that the order that the packets enter and exit the lookup engine may not be the same, but lookups that are based on the same search criteria will never occur in an order different from their entry sequence.

The key to achieving high forwarding rates with this memory architecture is to maximize the degree that all four heads of the memory system are operating simultaneously. The reason that SDRAM devices are banked internally is to allow memory operations to be pipelined so that memory data bandwidth is maximized. The SDRAM banks are really four separate memory structures that shared a common command and data path. By selecting an ideal arrangement of command and data the SDRAMs can be operated without any unused cycles.

Memory Controllers

The Memory Controllers are the logic that controls the four memory heads. Each memory controller has four queues of memory requests that it can use to fill the SDRAM command bus for that memory head. There is a queue for each memory bank. The controller sequentially accesses each queue and if it is not empty the controller pops the entry from the queue and drives the command bus with the memory request. The controller stages the packet identifier through an 10 stage delay buffer while the SDRAM access occurs. This is variable to allow for buffered control memory devices. The result of the SDRAM read operation is rejoined with the delay staged packet identifier and the result logic portion of the controller determines if the entry read was a node or leaf. If the entry was a node the result is sent to the recirculation controller for further processing. If the entry was a leaf the result is sent to the completion controller for queuing to the reorder buffer.

Recirculation Controller

The recirculation controller receives all the node results from the four heads. It calculates the next memory operation for the lookup from the offset, length and base address portion of the entry. Note that at this point all four types of lookup can be handled identically. The next memory access address is formed by fetching the source/destination address, or tag label, from the address holding memory based on the packet index, shifting it over based, on the offset, masking that according to the length and ORing that with the base address from the just completed access. This memory request and packet ID are then pushed into queue in the memory controller for the head and bank that is associated with that memory address. The recirculation controller also pops entries from the new work queue. This queue is emptied as space frees in the memory controller bank queues. If the entries in the work queue build too deep the recirculation controller deasserts the Data Enable (a.k.a. XOFF) signal to the RX ASIC. The RX ASIC can only send new packet headers to LU when this signal is asserted. There is a fixed maximum number of packets that can be processed by the lookup engine. This is required to set the sizes of the queues between the logic blocks since flow control is not possible once a lookup is started.

Completion Controller

The completion controller receives the completed lookups from each of the four heads. Because multiple lookups can complete at the same time, the completion controller is designed to combine these into a single flow that is sent to the reorder buffer. This flow includes the packet ID assigned by the packet checker module, the L3 datagram offset, and the AS label. The reorder buffer also receives the status flags from LU that indicate that the packet has completed processing due to a drop or the need for processor handling. The output of this block is a queue for output to reorder buffer since the rate that the lookup engine can complete lookups may be instantaneously faster than the reorder buffer can accept them. The output of this block also feeds back to the strange burst cache.

Reorder Buffer

The reorder buffer receives the completed packet forwarding lookups from the lookup engine, lookups that hit in the cache, as well as dropped packets and packets destined for the linecard CPU from the bypass queue. The order of packets from the forwarding engine can be different from the initial packet order because of the different route prefix lengths which result in differing numbers of M-trie accesses. Packets that bypass the lookup will arrive early to the reorder buffer by the average latency of the lookup engine. Packets are entered into the reorder buffer based on the packet serial number assigned in the packet checker stage. The output of the reorder buffer is stalled until the packet at the head of the buffer becomes available.

Load-Sharing

The LU supports two forms of IP load sharing: equal cost and unequal cost. Equal cost load-sharing assumes that the links are to equally share the traffic to the next-hop. The number of those links can vary from 2 to 8. Unequal cost load sharing assumes that the links to the next-hop are to share the traffic to the next hop based on the 16 entries in a table. The links that are to get a higher shared of the traffic are replicated in more of the table entries. A feature of both forms of load-sharing is that all the packets in a flow are sent through the same link to prevent reordering of the packets by using a hash of the IP source and destination addresses to select the next hop.

Both forms begin by hashing the source and destination IP addresses using this hash function to generate an 8b value:

hash=dst ^(dst<<5) ^(dst>>16) ^(dst<<13) ^(src<<3) ^(src<<11);

hash=(hash & 0xff) ^(hash>>8) & 0xff) ^((hash>>16) & 0xff) ^((hash>>24) & 0xff);

For equal cost load sharing this 8b hash result is gated into an array of hardware-based MOD n calculators, where n is selected by the value of the load-sharing mode field in the SDRAM forwarding table entry. The 3b MOD n result is ORed with adjacency index from the SDRAM forwarding table entry to generate the actual adjacency table address.

For unequal cost load sharing the 8b result is converted to a 4b value by XORing the upper and lower halves of the 8b value. This 4b result is ORed with the adjacency index from the SDRAM forwarding table entry to generate the actual adjacency table address.

Adjacency Table Memory Controller

The Adjacency Table Lookup logic determines the next-hop path to be used for the packet. The adjacency table is stored in an external SRAM. The external SRAM is a 128K× 36 (~4 Mb) ZBT SRAM device. Two memory accesses are needed to complete an adjacency table lookup. The contents of the adjacency table are:

A 16b output slot mask field
A 32b output info field,
A 16b maximum transfer unit (MTU) field
Three unused bits
Four parity bits
One valid bit The first four fields are used to supply the data that the RX needs to place in the packet BHDR before sending it to the MCC. The last two are used for error checking. The layout of the adjacency SRAM words is shown in the following lines:

pzziiiiiiiiiiiiiiipiiiiiiiiiiiiiiii
pvmmmmmmmmmmmmmmmmmmpzssssssssssssssss where:
p—indicates the parity bits,
v—indicates the valid bit,
i—indicates the output info field,
m—indicates the MTU field,
s—indicates the output slot mask field,
z—indicates an unused bit.

Parity and Valid bits

The parity bits cover 16b groups in the SRAM word and are even parity. The valid bit is normally a 1 for active adjacency table entries. If the adjacency table controller detects a bad parity when accessing the SRAM it will clear the valid bit, deactivating the entry. The packet will be redirected to the LCPU with an input info encoding that indicates that the adjacency table had a fault. The LCPU is expected to correct the error in the SRAM and reset the valid bit so that normal switching can be resumed for that entry.

Output Info Field

The output info field is passed to the RX and inserted into the packet buffer header (BHDR). This field is used in all the buffer header formats, except format A. The value 0x00000001 is a special case flag that indicates that the buffer header format is A. Otherwise format B will be selected for all switched packets.

MTU Field

The output info field is used by the adjacency controller to determine whether the packet can be switched directly to the output queue or must be fragmented by the output linecard processor. The adjacency controller compares the size of the packet payload (PLIM length–L2 header) with the value of the MTU field. If the packet payload size is greater than the MTU value the packet is sent to the output linecard CPU, otherwise it is sent to the destination specified in the output slot mask field. For multicast the MTU value should be set to the minimum value required for any of the possible output links.

Output Slot Mask

The output slot mask field has three different encoding formats. If the adjacency is associated with a normal unicast forwarding table entry the 16b slot mask field has the form:

0000 0000 ssss pppp where ssss is the slot number and pppp is the port number to receive the packet from the fabric.

If the adjacency is associated with a multicast forwarding table entry the 16b slot mask field has the form:

ssss ssss ssss ssss where ssss is a bit vector that selects the set of slots to which the fabric will send the packet.

If the adjacency is the LCPU, the 16b slot mask field has the form:

1000 0000 000q qqqq where qqqqq is the local queue number to receive the packet.

MCC Functional Description

The MCC ASIC is one of the set of ASICs that provides the L3 functionality for the OC192 linecard. The MCC manages a high bandwidth, high density, shared memory subsystem for all level 3 activities in the card. Packets arrived at the PLIM interface are first received and buffered at the RX ASIC, at the same time the packet header information is passed to the LU for, packet filtering and/or determining the destination. The lookup results are sent back to the RX ASIC which then uses it to compose a packet header and sends the whole packet to MCC ASIC for buffering and queuing in the SDRAM. The MCC manages and queues the packets per port and per CoS basis. Followings are features supported in the MCC ASIC:

a) Provide 10 Gb/s memory bandwidth for OC192 rate
b) Sustaining line rate for typical packet size
c) Packet buffering from 128 MBytes to 1 GBytes
d) Support up to 2064 CoS output queues
e) CoS up to 8 levels per output port
f) MDRR for output port scheduling
g) RED and WRED supported on all output queues
h) Output Rate Pacing for TX ASIC queues
i) Support the 100 MHz Dual Data Rate SDRAM (DDR SDRAM)
j) Provide RED packet and byte count statistics
k) Processor interface for slow path packet routing, chip configuration, monitoring, and control
l) Fully synchronous design with 100 MHz system clock.
m) Support JTAG & Boundary scan
n) Support ATPG with internal full scan
o) Support BIST for internal RAM test
p) Interfaces: LVTTL, SSTL_2

Number of ports supported

The MCC supports up to 16 ports per destination slot. This allows support for quad OC48 linecard and a possible 16×OC12 port card in the future. In all, the MCC supports a total of 256 ports for the 16 slot box. The TX version of the Memory Controller supports 16 ports total.

Separate Class of Service (CoS) Queues

The MCC will support 8 different queues for each output port, and a total of 16 different ports per output card. It brings up a total of 128 queues per linecard maximum. Each of the queues per port can be used for a different CoS. They don't all need to be used if so desired. CoS is achieved using a bandwidth sharing scheme called Deficit Round Robin (DRR) and/or a Weighted RED (WRED) scheme. Strict priority is also supported for just one of the each set of 8 CoS queues.

The MCC has 'virtual output queues' corresponding to the physical output queues on every linecard currently installed in the system. Each MCC supports one queue for every output queue in every other linecard in the system—for a total of 16 slots×128 queues=2048 queues. The occupancy of these queues—combined to a per-slot request basis—is communicated to the central switch fabric scheduler which allows it to make the most efficient scheduling decision for each linecard and avoid head-of-line blocking issues.

In addition to the above-mentioned unicast queues, there are an additional 8 queues (per COS) used for transmission of multicast data to the switch fabric and 8 queues for transmitting packets to the local CPU.

High Level Block Diagram

Figure 12:
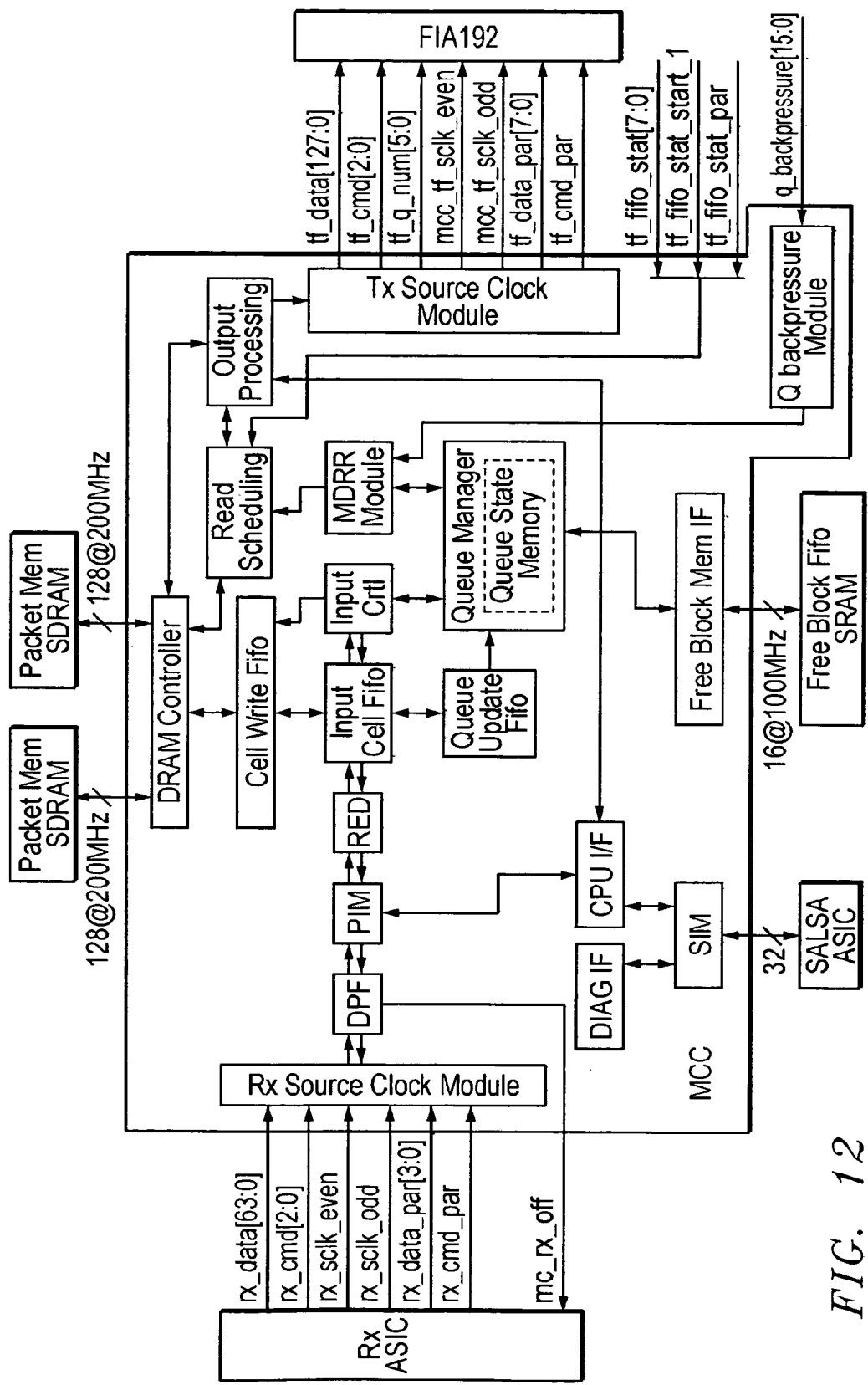
FIG. 12 is a high-level block diagram of the MCC ASIC.
Figure 13:
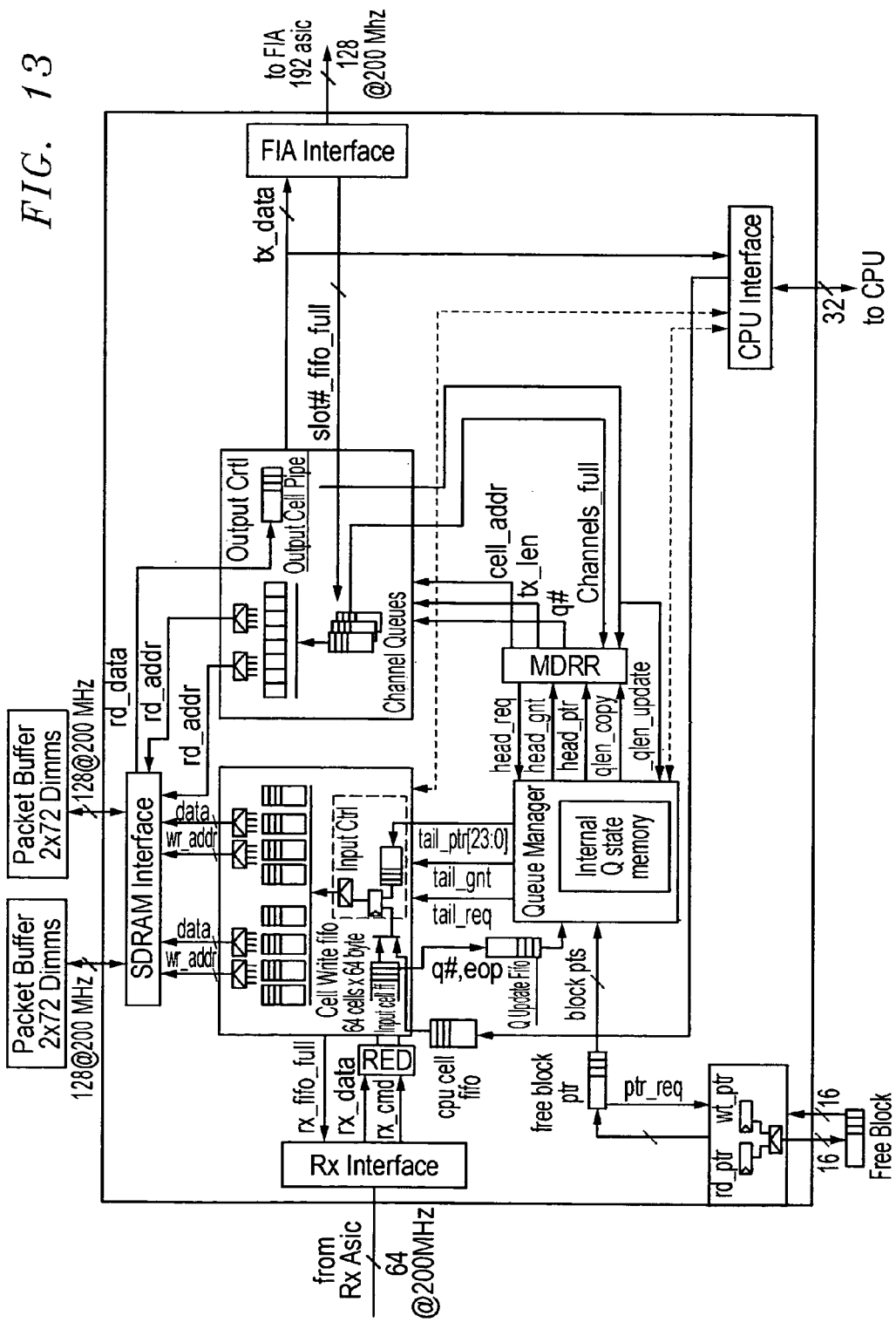
FIG. 13 is an interface schematic of the MCC ASIC.

The MCC ASIC interfaces to the RX ASIC, FIA192 ASIC, the Received Packet Memory SDRAM and external SRAM memory for queue statistics accumulation. FIGS. 12 and 13 show the MCC interfaces Received Packet Buffering Memory The buffer memory is utilized in a way that it is broken into multiple fixed-sized 16 KB blocks. Each memory allocation results in allocating the whole block for a queue. Every block can be on one and only one queue at a time.

The ideal amount of buffering needed, per interface, for optimal TCP performance is equal to the product of BW×RTT for the data flowing through the router. Since the RTT is an indeterminate figure, it depends on the particular customer situation. The amount of received packet buffering available will be configurable via the density of SDRAM devices installed in the memory DIMMs.

As an example, for a RTT of 200 ms, the ideal amount of buffering needed for a full OC192 interface is 200 ms×9.6 Gbps=240 MBytes.

The Received Packet Buffer Memory is composed of 2 memory modules where each has separate address and data paths. Each module is made up of two x72 DDR-SDRAM DIMMs. These DIMMs can be populated in various dram configurations so as to provide a total buffering anywhere from 128 MBytes to 1 GBytes. All four DIMMs must be populated at all times, and with the same type/size of DIMM. The memory interface is run at 100 MHz system clock for address and controls and the data path is 256 bits wide at 200 MHz. This provides a raw bandwidth of 51.2 Gbps intended to cover worst case bandwidth scenarios and various header overheads.

The SDRAM DIMM has 64 bits of data and 8 bits ECC used for memory error protection.

Free Block FIFO SRAM

The MCC supports fixed size of 16 KBytes for each queue block. Each enqueue operation implies allocating a 16 KBytes buffer to a queue and each dequeue operation implies freeing a 16 KBytes buffer from that queue.

Each queue block is represented with a 16-bit pointer which points to the beginning of each 16K block buffer in the Packet Memory Unused blocks are stored in the Free Block FIFO. This FIFO will be implemented as a simple circular FIFO managed with a pair of read and write pointers. A free block taken from the FIFO pointed to by read pointer and returned to the FIFO pointed to by the write pointer.

Queue Manager Overview

In order to organize the blocks into queues, the MCC hardware includes a Queue Manager Queue Organization There are a total of 2064 output queues supported in the MCC. Each queue is logically a linked list of queue blocks. Every queue block can be on one and only one queue at a time. Unused blocks are kept in the external Free Block FIFO. Queue blocks are added to the tail of the queue (enqueued), and removed from the head of the queue (dequeued).

Queue Blocks

When a 16 KBytes block has been allocated for an output queue, cells of a packet for this queue are sequentially written within the queue block.

The queue tail pointer indicates the DRAM physical memory address where the cell will be written to. The tail is incremented by one for every cell written to the DRAM.

When the tail reaches the end of the current block the enqueue request takes place and a new block is allocated to the queue. In the read operation cells from a queue are also sequentially read within a block.

The queue head pointer indicates the DRAM physical address from where a cell is read and it is incremented by one for every cell read fro the DRAM. When the head reaches the end of the block and if there are still more cells to be read, the last cell containing the link pointer at the end of the block is fetched to form the new head pointer for reading the remaining cells. The current block is then returned to the Free Block FIFO.

When an output queue becomes empty after a read, the last block of the queue will not be returned to the Free Block FIFO so that the queuing operation will continue from whatever is the head & tail pointer for the that output queue.

Internal Queue State Memory

The Queue State Memory is the place to store the data structures maintained by the Queue Manager for each of the 2064 queues. They are as follows:
  a) Q HEAD (24 bits): One entry for each queue. Each entry indicates the physical SDRAM address of the head of this queue where the next cell is going to be read from. The address is on 64-byte boundary
  b) Q TAIL (24 bits): One entry for each queue. Each entry indicates the physical SDRAM address of the tail of this queue where the next cell is going to be written into. The address is on 64-byte boundary
  c) LENGTH (24 bits): One entry for each queue. Each entry indicates the current instantaneous length (in cells) for this queue. This field is used by the RED module for determining the average queue depth.

Note that the CPU has full access to both the internal and external SRAMs for diagnostic purposes, although with restrictions on when these accesses can be made.

Block Allocation and Cell Layout in Packet Memory

When a queue needs more buffers the Queue Manager signals the Block Allocation logic for a 16 KByte block allocation. The new block will be added to the tail of the queue. The allocation starts with first fetching a next available block pointer from the prefetched Free Block FIFO and then assigning the Link and the tail to the new pointer value.

Figure 14:
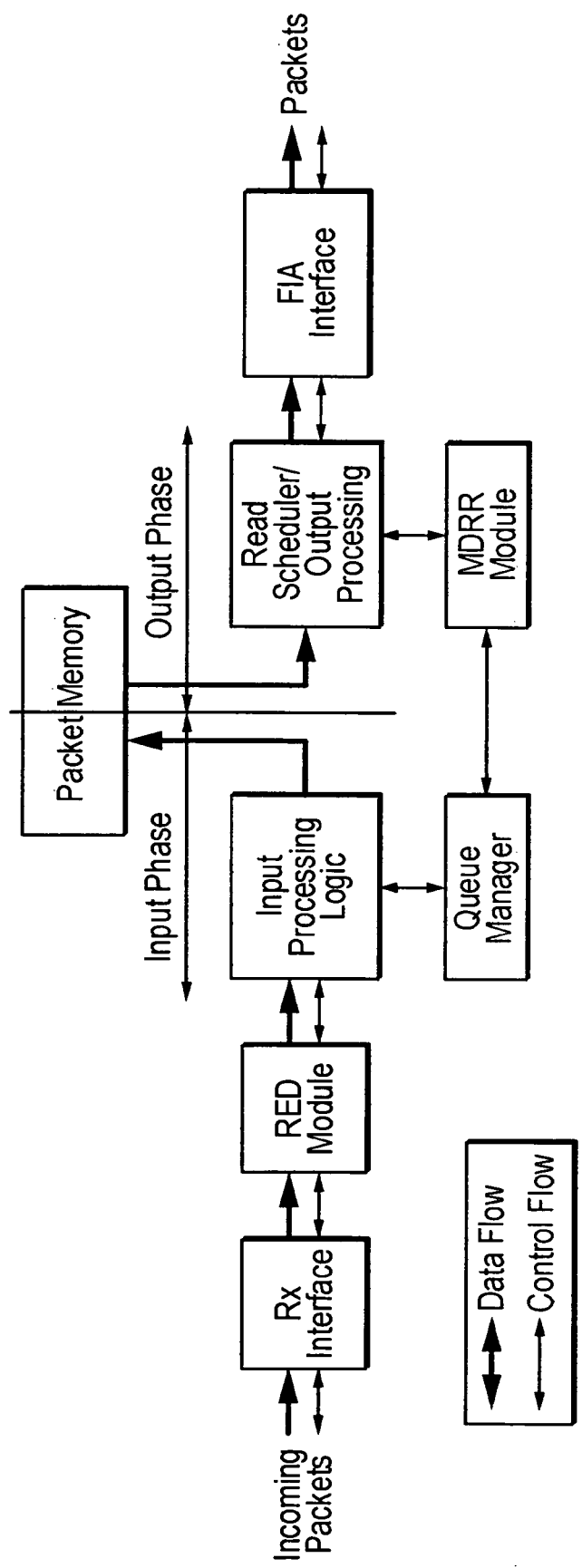
FIG. 14 is a flow diagram of the MCC's packet handling path.

Packet Flow through the MCC FIG. 14 shows a high level view of the MCC's packet handling path. (The TX packet handling path reuses this same basic logic with the exception of the RX and FIA Interfaces. The TX path is detailed in the TX section below).

The MCC makes accesses to SDRAM in two separate phases: an Input phase and a Output phase. The two phases are always alternately used regardless of whether there are packets to write or read. The input phase is used for writing incoming packets to the SDRAM and the output phase is for reading packets out of the SDRAM.

The MCC has 100 ns in each phase to complete the SDRAM operation. In one phase it can transfer up to 512 bytes (eight 64 byte cells) into or out from the SDRAM packet memory.

Figure 15:
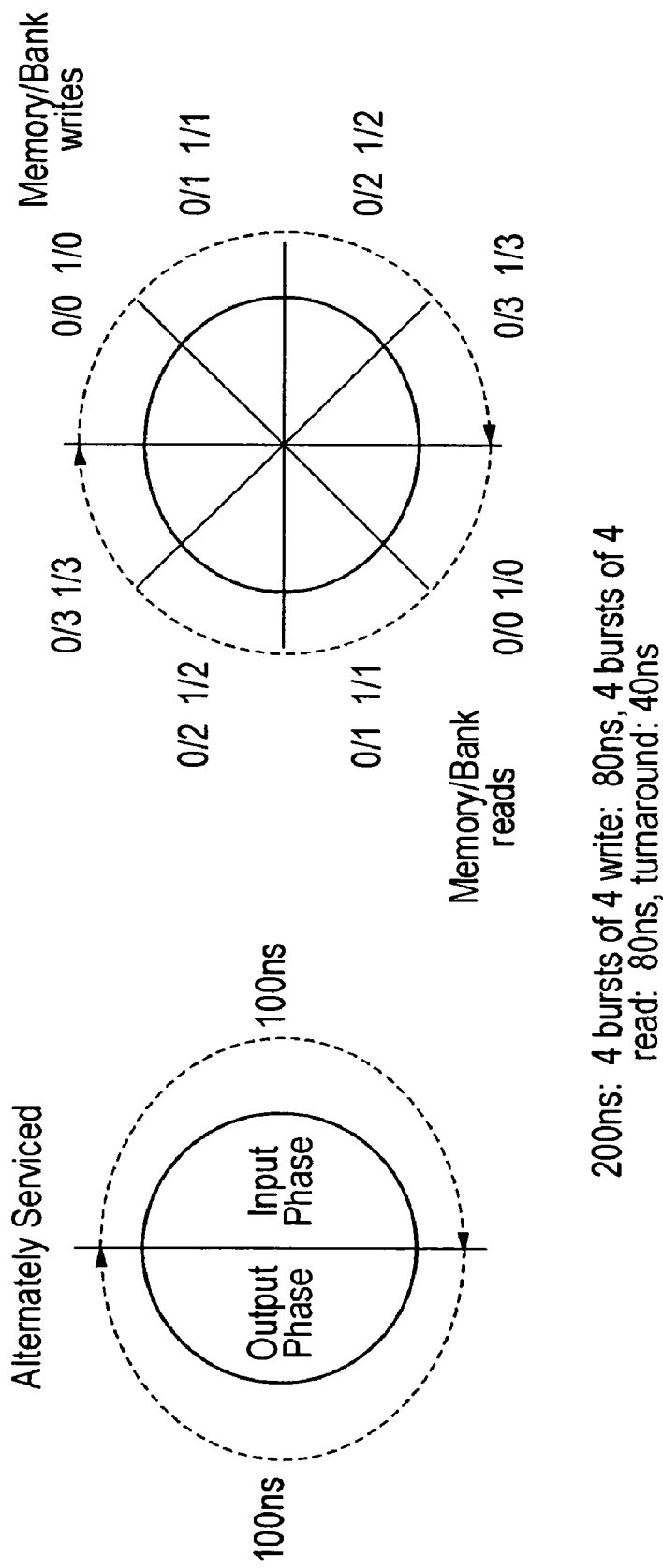
FIG. 15 is a high-level schematic view of the MCC timing relationships.

The two phase timing can be illustrated with a timing wheel with half of the wheel represents the Input phase and the other half represents the Output phase, as in FIG. 15.

RX Interface

The RX interface is used for transferring data sent by the RX to the MCC ASIC. The RX ASIC sends packet data to the MCC and receives the flow control status from the MCC via this interface.

When a packet has been received by the RX and the look up operation has been done by the LU for this packet, it is ready to be sent to the MCC for queuing. The first data of a packet being sent by the RX also contains the Buffer Header (BHDR) and then followed by the entire packet payload. The BHDR contains various control information that is processed locally by the MCC such as: output port and slot number, CoS # and RED CoS # for selecting RED parameters, etc. Other control information carried in the BHDR such as: Output queue number, Output and Input Info, AS #, etc. will be processed by the FIA192 and used as part of the CiscoCell Header or part of the Buffer Header that will be sent over the fabric.

Data from RX are sent on the two clocks that are both sourced by the RX ASIC. One clock is for sending even data and the other clock is for odd data. Every data status is indicated with a 2 bit command to identify if the data is invalid, start of a packet, middle of a packet or end of a packet. Even parity is used with one parity bit covering every 16 bits of data. Control signals are all together covered with one parity bit.

Random Early Detection (RED) Support

Every packet arriving at the MCC will be first passed to the RED module to determine the appropriate action to take for this packet. This boils down to either proceed with the enqueuing operation or drop the packet. The RED drop decision runs at 25 Mpps. If the packet fails the RED test it is discarded as it streams in from RX. There will be no action taken place at the Queue Manager for this packet and the whole packet is drained and dropped within the RED module. Each packet begins with a header which indicates the RED parameter set for the packet, the output queue and the packet length.

The RED implementation is identical in the MCC and the TX ASICs. Please refer to the TX ASIC description (below) for details of the RED functionality and features.

MCC Input Processing

Input Cell FIFO

Packets that pass the RED test are segmented into 64 byte cells and written into an Input Cell FIFO. This 32 Kbit buffer provides some smoothing between the input stream and the DRAM write operations which are not deterministic. If the Input Cell FIFO fills up because the write operations fall below line rate an Xoff signal is fed back to the RED block and RX chip to back pressure input. This situation only occurs when a long consecutive burst of packets that just barely span two cells is encountered in the input stream. The Xoff can occur any time during the packet transmit.

Cells are dequeued from the Input Cell FIFO and written into DRAM to the appropriate output queue. Output Queue Heads, Tails and Lengths in cells are maintained in an internal Queue State Memory. The Tail pointer is used only by output queue write operations and the Head pointer is only used in output queue read operations. At least one memory block is always in use for each output queue so that the Head and Tail pointers are always valid. The only field shared by queue read and write operations is the queue Length field.

Output Queue Layout In DRAM

Figure 16A:
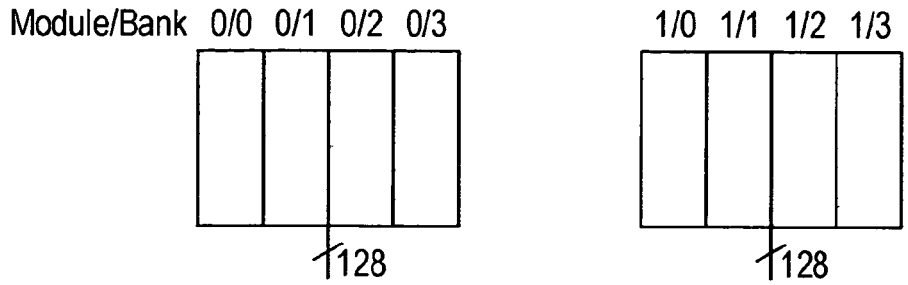
FIG. 16A depicts the output queue memory organization in the MCC in one embodiment of the present invention.

As shown in FIG. 16A, the memory layout of output queues is such that the cells in a packet successively span across all 8 memory banks. Each 64 byte cell is written as a burst of 4 to a single DRAM bank. When large packets are read or written to a queue there are no DRAM bank conflicts since successive banks are accessed in each burst.

Figure 16B:
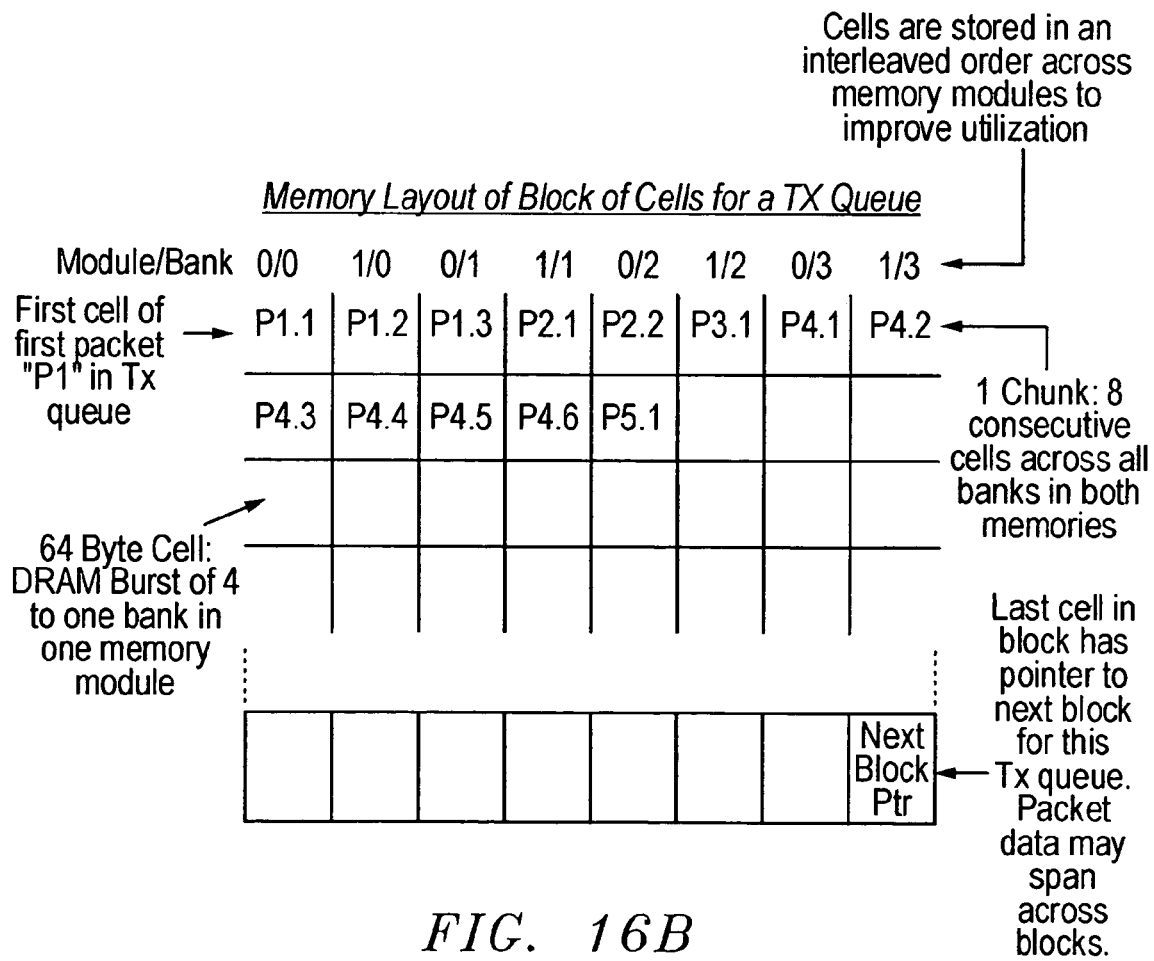
FIG. 16B depicts the packet format used in the MCC output queue, according to one embodiment of the present invention.

Packet data is stored in 64 byte cells. Each cell is a stored as a burst of 4 to a single memory bank in one memory module. Consecutive cells in a packet/TX queue are stored in memory banks interleaved between the two memory modules. Eight cells across all banks equals one 512 byte chunk. Consecutive chunks equals one block. TX output queues are made of linked lists of 16 KB blocks. The format of packet data in a TX queue is shown in FIG. 16B.

Cell Write FIFOs

The MCC maintains a Cell Write FIFO for each DRAM memory bank. The FIFOs contain cells destined for a particular DRAM bank. Every 200 ns the head cell in each Cell Write FIFO is dequeued and the cell is written to DRAM with a burst of 4 to each of the 4 banks in both DRAM modules.

When the first cell in a packet is dequeued from the Input Cell FIFO the Tail pointer for the packet's output queue is fetched from internal Queue State Memory. The Tail pointer address indicates the next DRAM address and DRAM bank in the output queue. The first cell from the packet is queued to this bank's Cell Write FIFO and subsequent packet cells are queued to Cell Write FIFOs corresponding to subsequent addresses/memory banks for the output queue. The output queue Tail pointer is updated as each cell is scheduled.

If a cell needs to be scheduled in a Cell Write FIFO that is full the logic stops scheduling until the next DRAM write phase occurs freeing up one cell per FIFO. The Input Cell FIFO will start to fill in this case. If this situation persists the Input Cell FIFO will fill up and an Xoff signal is fed back to the RED module and RX ASIC to temporarily halt input. This situation only happens for long bursts of odd sized small packets that just barely span two cells.

Note that subsequent packets from the Input Cell FIFO may be destined for a completely different output queue, and hence to different DRAM banks. These banks may conflict with banks being written for previous packets. If packets' cells were written to DRAM in the order they were received bank conflicts could cause delays due to back to back timing access to the same bank must satisfy the minimum DRAM cycle time, hence decreasing the DRAM I/O bandwidth.

The next DRAM bank to be written for each packet in a output queue depends entirely on how many cells have been put in a queue in the past. For successive packets from RX, going to different queues, the starting bank for each successive packet is expected to mimic random behavior. (Note that when output queues become empty the last Queue memory block is not freed so that the empty condition will continue from whatever is the current bank for the output queue).

The Cell Write FIFOs essentially reorder the writing of packet cells to the various DRAM banks to achieve maximum efficiency. The deeper these FIFOs the better the statistical chance all DRAM banks can be utilized during a write phase. A depth of 16 seems adequate based on simulation. DRAM I/O efficiency is also increased by packet sizes greater than two cells, or back to back packets to the same queue, because the cells are written across banks.

Queue Update FIFOs

The Cell Write FIFOs allow packet cells to be written out of order. This reordering presents a problem maintaining a consistent queue state for both output queue write and read phases. Simply put, the length of the queue cannot be updated for DRAM writes until all the cells in the packet are in DRAM. But because of reordering the last of a packet's cells written to DRAM may not in fact be the last cell in the packet.

To resolve this problem a separate set of Queue Update FIFOs is used to schedule queue length updates. Logically there are 16 of these FIFOs each of which may contain up to 8 entries. Each FIFO entry contains a queue number and a number of cells to be added to that queue's instantaneous length.

These 16 Queue Update FIFOs are processed round robin, one-per Write phase. During the 100 ns Write phase the entries from one FIFO will be sequentially drained and processed. This implies that up to 8 queues will have their length updated as specified by the FIFO entries. This will take 90 ns to update queue lengths for 8 queues using dual ported internal SRAM to store the queue lengths.

When the last cell in a given packet is successfully put into the Cell Write FIFOs an update entry containing the queue number and number of cells in the packet is put into the Queue Update FIFO that is furthest away in time from being processed. Since the number of Queue Update FIFOs (16) is equal to the depth of the Cell Write FIFOs (16) it is guaranteed that the queue updates placed in the last Queue Update FIFO will be processed no sooner than the cells in a packet that has been fully loaded into the Cell Write FIFOs.

The maximum number of entries per Queue Update FIFO, 8, limits the number of packets that can be put in the Cell Write FIFOs during any 200 ns DRAM I/O cycle. The greater this number the better however it is bounded by the number of updates that can be done during the DRAM write phase. FIFO sizes less than the number of banks can limit small packet performance. Based on simulation 8 appears to be sufficient for an 8 bank 10 Gb/s DRAM I/O BW on small packets.

MCC Output Processing (Dequeue) Overview

Output processing need to fulfill several requirements:
a) Execute Modified Deficit Round Robin Algorithm on 2064 output queues for the MCC or 136 queues for the TX
b) Maintain >=10 Gb/s output to FIA 192 regardless of packet or queue sizes
c) Maintain >wire rate output speed to each TX PLIM port
d) Interleave small quantums of output data for logically separate streams of packets referred to here as "channels": 34 channels to the FIA192 (2 priority levels of unicast traffic for 16 slots plus 2 priority levels of multicast traffic) and 2 channels for high and low priority CPU data. Or 16 channels in the TX for transmit side PLIM ports plus 1 channel for transmit side CPU data.
e) Respond to back pressure signals for those output channels
f) Support per queue back pressure
g) Support per queue rate limiting in the TX A few terms are used in several of the output processing sections and so are introduced here. A "Read Cycle" is 200 ns. The DRAM controller reads a group of eight 64 byte cells from DRAM every 200 ns Read Cycle. A "channel" is a logically distinct stream of output data. For instance, each stream of data sent out a transmit interface is considered a channel by the TX ASIC. Each stream of data sent to a specific priority and slot is treated as a separate channel by the MCC. Note that the MCC and TX ASICs must send data to multiple channels interleaved without respect to packet boundaries.

Packet lengths are stored in DRAM and can't be determined until after the header of a packet is read. It is, complex to achieve good performance in reading the first cell of a packet to determine how much more to read. Instead a globally configurable value called the "Read Limit" is used as a target amount of data to read from a queue. The value is in 64 byte cells. When a queue is actually read, Read Limit number of cells are first read (if the queue is that large) then reading continues up to a packet boundary. The Read Limit is programmable. 64 cells, 4 KB, gives acceptable performance in simulation. A larger value will improve DRAM read optimization but may increase latency.

Figure 17:
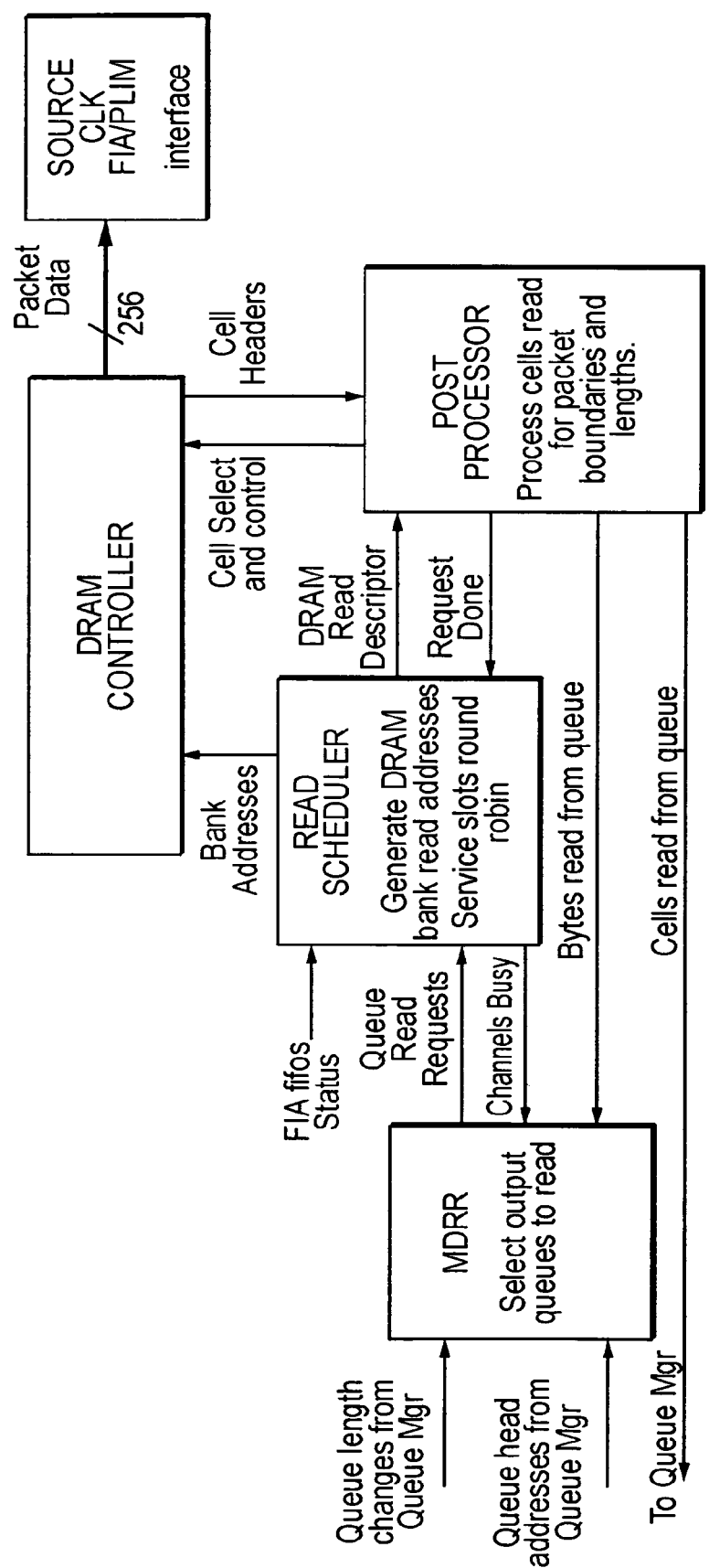
FIG. 17 is a high-level schematic view of MCC DRAM read operations.

A "Read Request" is a request to read a particular DRAM output queue generated by MDRR. Read Requests are categorized into three types for DRAM read optimization: "Small" Requests are reads of output queues that contain <8 cells. These can be read in a single DRAM Read Cycle. "Medium" Requests are reads of output queues that contain >=8 cells but <=the global Read Limit. These require multiple Read Cycles but since the entire queue is being read the exact read length is known in advance. "Large" Requests are reads of queues >the Read Limit. These require multiple DRAM Read Cycles and a search for a packet boundary to complete. A high level view of the MCC DRAM read operations is shown in FIG. 17.

The MDRR Scheduler decides which output queues should be read. It maintains empty, back pressure, and in progress state for each output queue and also monitors status signals from the Read Scheduler indicating which output channels are ready.

The MDRR module sends requests to read a particular queue to the DRAM Read Scheduler. This module schedules reads of DRAM banks based on available Read Requests, Request priorities and FIA/PLIM channel back pressure. Within a given priority each output slot is served roughly 512 bytes of data round robin in order to minimize the memory requirements of the FIA and PLIM. In other words the data streams for each output channel are interleaved without respect to any packet boundaries.

The Post Read Output Processor sends data read from DRAM out to the FIA or PLIM. It inspects the data cells to find packet boundaries and count bytes and cells read per queue. This information is fed back to the MDRR Scheduler, Read Scheduler and the Queue Manager after a Read Request is completed.

Modified Deficit Round Robin (MDRR) Support

The MDRR module decides which output queues to read when and how much packet data to read from each queue. It selects a queue to be read and sends a request to read that queue to the DRAM Read Scheduler described in the Read Scheduler section below.

Output queue configurations supported are:
  MCC: 2064 queues, including:
    Unicast: 16 slots×16 ports/slot×8 CoS/port=2048 queues
    Multicast: 1 port×8 CoS/port=8 queues
    Local CPU: 1 port×8 CoS/port=8 queues
  TX: 136 queues, including:
    Output queue: 16 ports×8 CoS/port=128 queues
    CPU queue: 1 port×8 CoS/port=8 queues Each output port has 8 COS queues: 1 high priority and 7 low priority. These 8 COS queues are selected for output by hardware which implements a Modified Deficit Round Robin (MDRR) algorithm. This is based on the original DRR algorithm but with the addition that one of the eight COS queues per port is given high priority. The DRR algorithm is described in Shreedhar and Varghese, "Efficient Fair Queuing Using Deficit Round Robin," Proceedings of ACM SIG-COMM '95, Computer Communications Review, Vol. 25, No. 4, October 1995, which is incorporated herein in its entirety by reference. This queue is serviced in one of two modes:

Low-Delay Mode: In this mode, the non-empty high-priority queues for all ports are selected in simple round-robin (a programmable quantity is read from each). Only once all the high-priority queues for all the ports have been selected will the other queues be considered. The remaining 7 low-priority COS queues per port are selected in the DRR fashion, with simple round-robin between the ports.

This mode has the advantage of guaranteeing the lowest possible latency for the high-priority traffic, but at the expense of possible starvation of the lower priority traffic if there is over-use of the high-priority queues.

Fair-Mode: In this mode, the high-priority queue is selected for reading, then one of the other 7 queues (chosen via the regular DRR algorithm), then back to the high-priority again. This guarantees that all queues get serviced, at the expense of the latency on the high-priority queue. All ports are serviced in round-robin, regardless of whether there is high-priority traffic available or not. Note that when in the fair-mode, as the hardware round-robins between each of the ports for a given channel, it may be sending low priority traffic for up to 15 other ports before coming back to a queue that has high priority for a port. In low-delay mode, high priority traffic is very strictly sent first.

For each queue there is a programmable value called the 'quantum' and a variable called the 'deficit' maintained:
  QUANTUM (11 bits): This is the number of bytes which is credited to this queue's deficit every time a round of DRR is completed. It is not necessary for this value to be accurate down to the exact byte, so it is only stored as a multiple of 512 bytes, thus saving external SRAM resources. This value is written by the CPU at configuration time and read by the MDRR module.
  DEFICIT (21 bits): This is the exact byte count for the current 'deficit' for this queue. Note that this value is signed (stored as 2's complement). The MDRR module stores these parameters in an internal SRAM.

An initial constraint on MDRR is that exact packet sizes are not known until after the queue data is read from DRAM. The MDRR Scheduler does not have direct access to individual packet sizes in an output queue because packet lengths are stored in DRAM along with packet data. This makes it impossible to accurately calculate MDRR deficits in advance of reading the packet. Instead the MDRR logic uses queue lengths which are stored in a copy of the Queue Length Copy Memory. If the total queue length is <=Read Limit value the entire queue is read, otherwise the Read Limit is specified in the request. In the latter case the output queue will be read up to the first end of packet >=Read Limit. The MDRR deficit is updated after the read.

Figure 18:
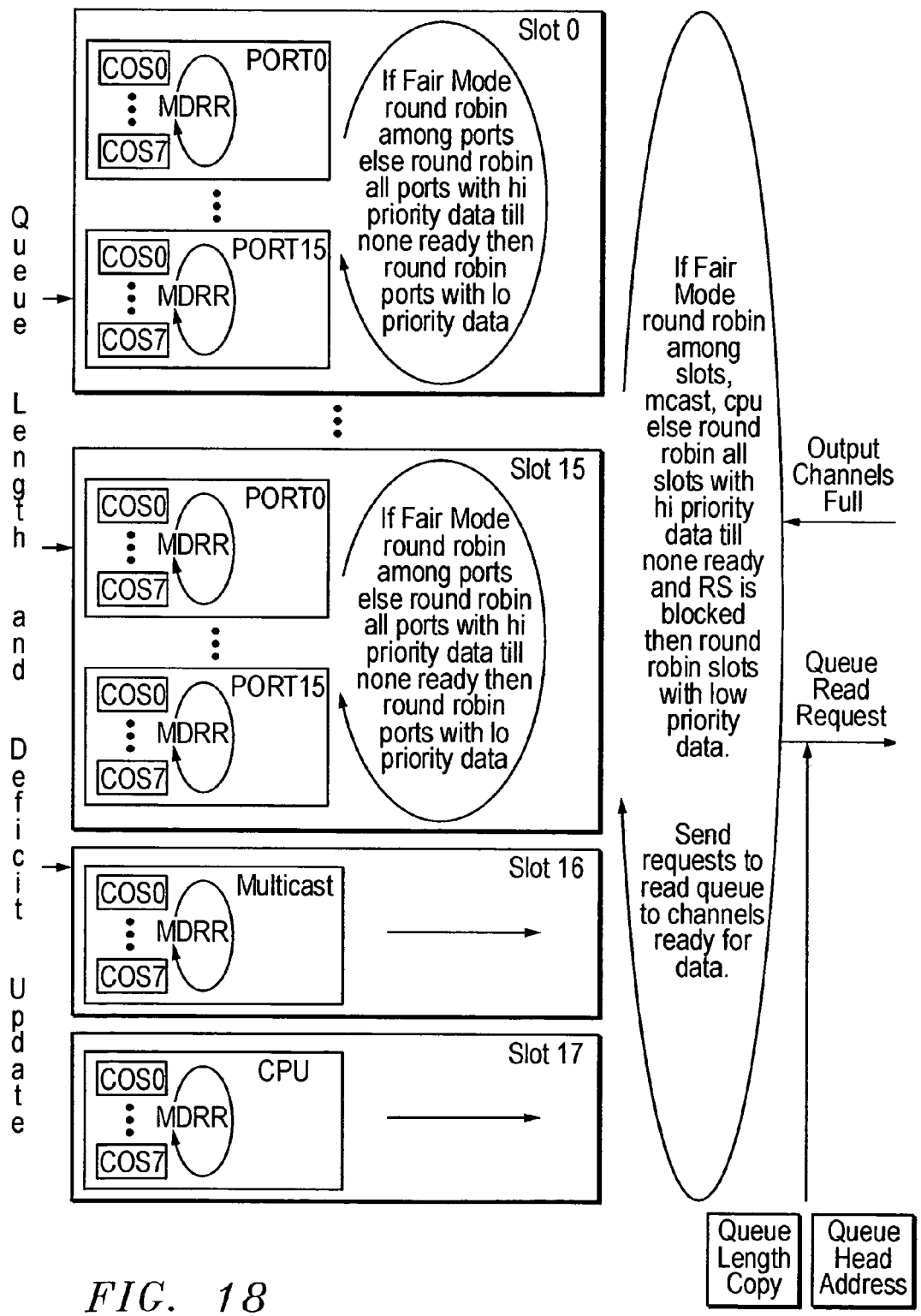
FIG. 18 shows a high-level view of the process by which the MDRR algorithm selects output queues.

FIG. 18 shows a high level view of the ordering by which the MDRR algorithm selects output queues on the MCC.

MDRR Per Port Algorithm

For each set of 8 COS queues the hardware performs the following algorithm. This algorithm makes the assumption that at least one of the 8 queues are non-empty when it is invoked which in the MCC implementation will be guaranteed.

A status bit for each queue indicates whether a particular queue is in or out of a DRR round. When a queue's deficit goes <=0 the queue drops out of round processing. When all queues have dropped out a new round is started.

In the following code snippet, q# 7 is considered the high priority queue, 0..6 are the low-priority queues; 'i' records the current low-priority queue selected by DRR.

```
in_this_drr_round(q0-q7) = TRUE;
do forever {
    if (low-delay-mode && queue(7)_not_empty) {
        q#=7
    } else if (fair-mode && (q#!= 7) && queue(7)_not_empty) {
        // in fair-mode, only choose queue#7 if we didn't last time
        q#=7
    } else if (any queue in [0 . . . 6] is non-empty) {
        // Choose next queue number in [0 . . . 6] to send from
        i=next non empty queue from [0 . . . 6], starting from i+1
```

-continued

```
        q#=i
    } else {
        //assumption was at least one queue non-empty, must be q#7
        q#=7
    }
    if (in_this_drr_round(q#) &&
        queue(q#)_not_empty &&
        queue(q#)_not_backpressured) {
            // Send packets up to programmable global Read Limit
            bytes_sent = 0
            while (bytes_sent < read_limit &&
                queue(q#)_not_empty) {
                    send packet from queue (q#)
                    bytes_sent = bytes_sent + sizeof(packet)
            }
            // update deficit, if <= 0 drop out of round
            deficit(q#) = deficit(q#) - bytes_sent
            if (deficit(q#) <= 0 || queue(q#)_empty) {
                in_this_drr_round(q#) = FALSE
                deficit(q#) = deficit(q#) + quantum(q#)
            }
    }
    // if all eligible queues have dropped out of the drr
round
    // then start new round
    drr_round_over = TRUE
    foreach q (0-7) {
        if (in_this_drr_round(q) && queue(q)_not_empty &&
            queue(q)_not_backpressured) {
                drr_round_over = FALSE
        }
    }
    if (drr_round_over)
        in_this_drr_round(q0-q7) = TRUE;
    }
    if (low-delay-mode) {
        in_this_drr_round(q7) = TRUE;
    }
}
```

Note that the quantum needs to be at least as large as the packet MTU for this algorithm to work properly. As an implementation optimization, the quantum is stored as a multiple of 512 bytes (no MTU will ever be that low).

The difference between this algorithm and a more typical one can best be illustrated with an example. Take 4 COS queues with quantums of 9 KB, 18 KB, 27 KB, 36 KB representing 10%, 20%, 30% and 40% of the output bandwidth. Instead of sending this data from a given port:

COS1:9 KB+then COS2:18 KB+then COS3:27 KB+then COS4:36 KB+the algorithm will attempt to send (assuming a 4 KB Read Limit):

to reduce large latencies that may result from sending full quantums before processing a new COS queue.

MDRR Per Slot and Channel Processing

Every clock cycle the logic for each port selects a potential queue to read. Logic for each slot chooses a potential queue to read from among all the ports within a slot. This selection is done round robin if in Fair Mode. In Low Delay mode ports with high priority queues ready are chosen round robin over any ports with low priority queues ready. Ports with only low priority queues are selected only when no high priority queues are ready.

When multiple slots have queues ready to be read the slot is chosen in the same way that ports within a slot are selected, basically round robin in Fair Mode and prioritized round robin in Low Delay Mode.

An additional arbitration is done at the slot level. A queue's slot and priority determine its output channel. Each output channel may be a separate stream of data. On the MCC there is a separate output channel for each slot's high and low priority data. The MDRR module receives Channel Full backpressure signals from the Read Scheduler. If a slot's queue is for a backpressured channel that slot is skipped in the selection of the next queue to read.

The priority of queues may be forced high or low on a per slot basis. This effectively forces both priorities into the same output channel.

The MCC supports 18 high priority channels (16 for destination line card slots, 1 for multicast data, 1 for CPU traffic); 18 low priority channels (16 for destination line card slots, 1 for multicast data, 1 for CPU traffic). The TX supports 17 channels: 16 for output ports, 1 for CPU traffic.

There are no priority channels in the TX ASIC since each output interface supports only a single stream of data. Also output to the PLIM is real time and must not be preempted by any CPU data.

Note that in the TX ASIC each port is assigned to a separate slot. In other words the transmit side memory controller is configured with 16 slots each with only one port. This allows the PLIM to determine the output port number from the same signals the FIA uses to determine output slot and to apply back pressure per port.

MDRR Output

Once a queue has been selected for reading a Read Request is generated and sent to the Read Scheduler. The Read Request contains the queue number, priority, a target number of DRAM cells to read, starting read address and some status bits. The starting address is read from the Queue Head

| COS1:4KB | then | COS2:4KB | then | COS3:4KB | then | COS4:4KB | then |
|---|---|---|---|---|---|---|---|
| COS1:4KB | then | COS2:4KB | then | COS3:4KB | then | COS4:4KB | then |
| COS1:4KB | then | COS2:4KB | then | COS3:4KB | then | COS4:4KB | then |
|  |  | COS2:4KB | then | COS3:4KB | then | COS4:4KB | then |
|  |  | COS2:4KB | then | COS3:4KB | then | COS4:4KB | then |
|  |  |  |  | COS3:4KB | then | COS4:4KB | then |
|  |  |  |  | COS3:4KB | then | COS4:4KB | then |
|  |  |  |  |  |  | COS4:4KB | then |
|  |  |  |  |  |  | COS4:4KB |  | where 4 KB+means 4 KB plus data up to the end of the next packet. As each CoS's deficit goes negative the queue drops out of the round until all drop out, at which time a new DRR round starts.

The purpose of this approach is to generate multiple Read Requests per port to improve DRAM bank optimization and memory. The target cells to read and status bits are taken from a Queue Length Copy Memory. Both are indexed with the queue number.

The Queue Length Copy Memory contains a copy of the lower 9 bits of the Queue Length (up to 512 cells), a "Large" bit that indicates the total queue length >=the programmed Read Limit (guaranteed to be <=512 cells, and a "Small" bit that indicates if the total queue length is <8 cells. Whenever a Queue's length is updated this Copy Memory is also updated. The length copy is needed for SRAM access bandwidth. Essentially if the length of the queue is >=the Read Limit the Large bit will be set telling the Read Scheduler to read the Read Limit number of cells then up to a packet boundary. Otherwise the exact number of cells, i.e., the entire queue, will be read.

A low Read Limit value will improve latency but may not meet the output bandwidth requirements for certain small packet/single queue cases. This is because at least one Read Cycle gap will occur between the time a queue read is finished and the time MDRR re-requests the same queue. A 2 KB Read Limit may be sufficient for a normal Internet mix of packet sizes. A 4 KB Read Limit should handle queues with most packet sizes at wire rate.

Once a Read Request is generated for a queue, the queue is marked as "In Progress" till the DRAM read completes. If per port MDRR comes back to an in progress queue it waits for the read to complete. MDRR deficits are updated after the read completes.

MDRR Scheduler Implementation

MDRR maintains state for each queue, port and slot:

Per Queue
    4 Status Flops
        Non-Empty—queue has data
        Credit—queue in current MDRR round
        In Progress—queue Read Request is outstanding
        Back Pressure—queue is back pressured
    Queue Deficit and Quantum SRAM Memory Per Port
    3 bit counter—next low priority COS queues
    1 bit flag—next priority (high or low) for fair mode Per Slot
    4 bit counter—next high priority port in round robin
    4 bit counter—next low priority port in round robin
    (only one counter used in Fair mode).

Global
    5 bit counter—next high priority output channel
    5 bit counter—next low priority output channel
    1 bit flag—Fair mode Read Scheduler Read Scheduling Overview Potential DRAM read inefficiencies are addressed in two ways. First, queues are read in relatively large quantums when possible rather than a single packet at a time. Each time MDRR requests a queue read it tries to read at least the Read Limit number of bytes from the queue.

Second, the DRAM Read Scheduler attempts to reorder MDRR Read Requests to optimize reading of DRAM banks. Unlike DRAM write operations reordering on the read side is done among queue Read Requests and not on individual cells read. For any single output queue the data is read in order.

DRAM read operations can be broken down into roughly 4 stages:

MDRR output queue Read Requests are stored in a Channel Queue.
    Selected Read Requests are read out of the Channel Queues and up to 8 bank addresses are sent to the DRAM Controller for reading cells from DRAM. The Read Request state is updated.
    The read operation is launched by the DRAM controller.
    Post Read Output Processing Logic sends cell data to the FIA or PLIM and counts bytes and cells read for each request.

Each stage operates in roughly one Read Cycle. However the timing is such that in the case where only one queue has data only one empty Read Cycle takes place between requests. (See Timing Diagrams below.)

Figure 19:
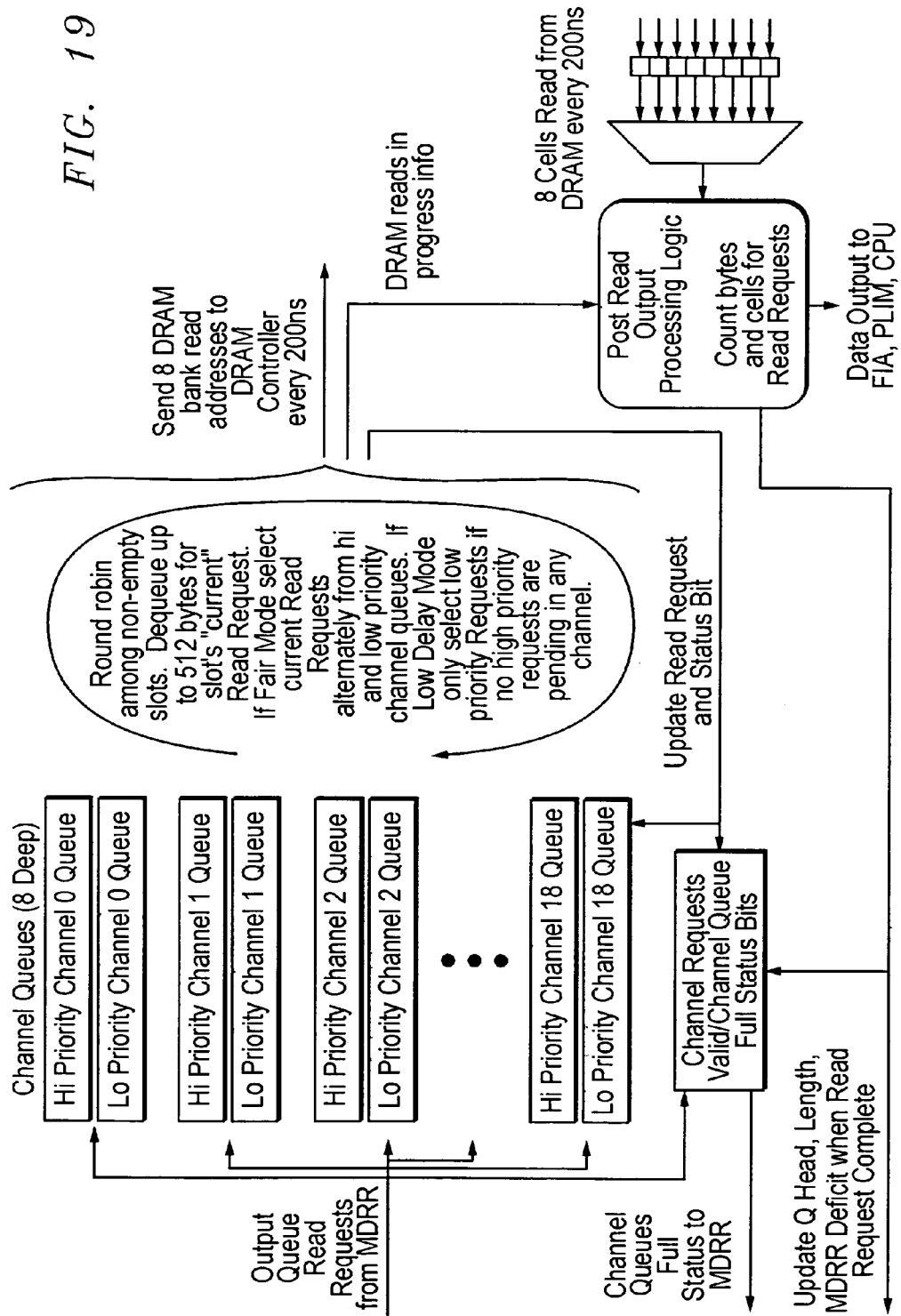
FIG. 19 is a high-level schematic view of Read Scheduler operation.
Figure 20:
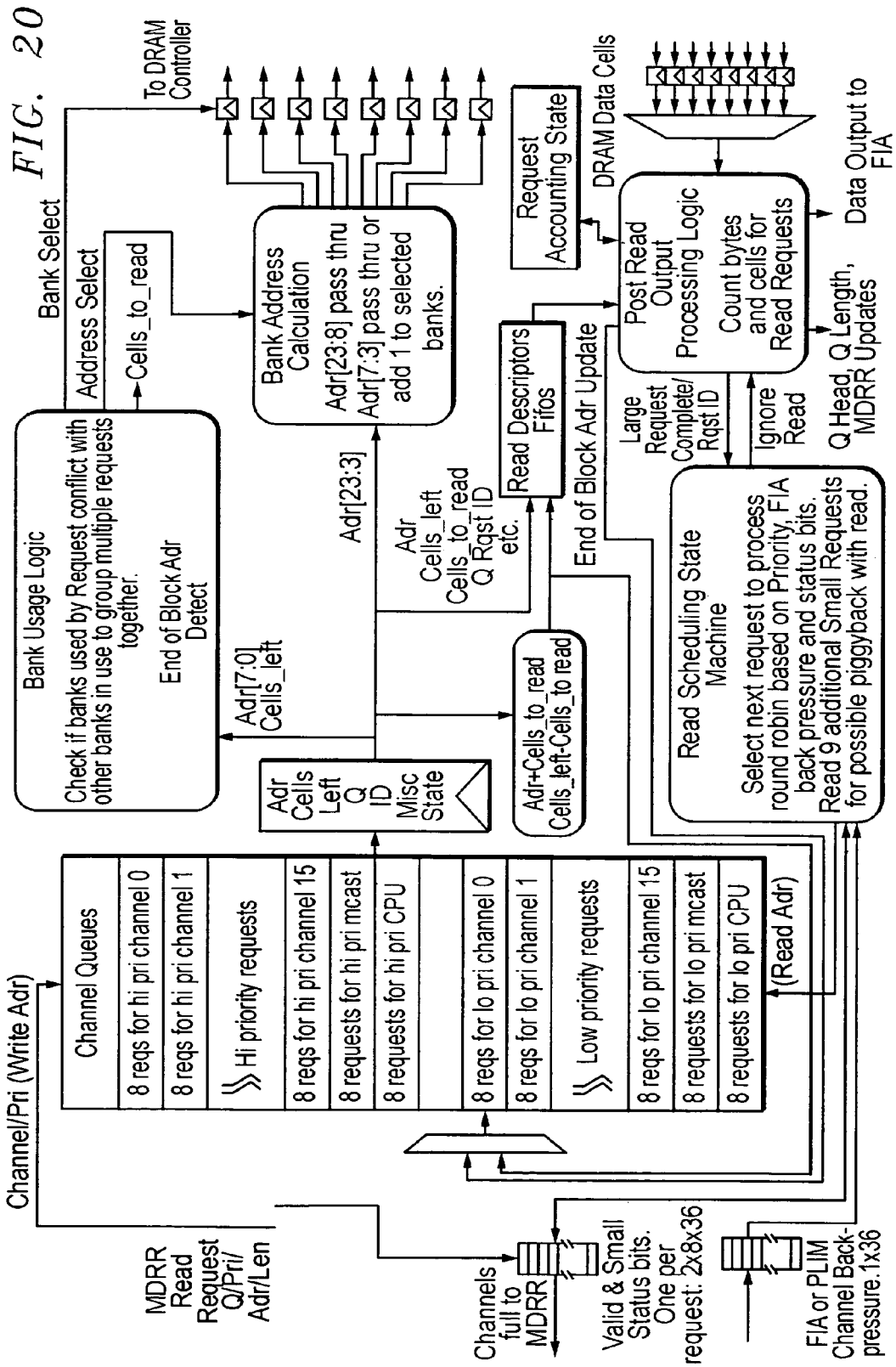
FIG. 20 is a functional block diagram of Read Scheduler logic.

A high level functional overview and a logic diagram of the Read Scheduler are shown in FIGS. 19 and 20.

Request Input Stage

MDRR requests to read a queue are stored in the Channel Queues according to output channel. For optimization purposes each channel is allowed to have up to 8 pending Read Requests. This allows a maximum of 8 requests*36 channels or 288 outstanding requests. A 3 bit Free Request pointer for each channel and the queue's channel number are used to address the request write into memory.

Note that the Channel Queues are not serviced First-In, First-Out. Requests may be dequeued out of order to improve DRAM bank read utilization. There is a Valid status flop for each of the 8 slots in each Channel Queue to indicate it holds a valid Read Request. A NAND of all 8 valid bits for each channel is sent back to the MDRR module to indicate that a channel is ready to accept more requests.

A "Small" status flop for each request indicates that the request is to read <8 cells.

Address Setup and Request Reordering

Figure 21:
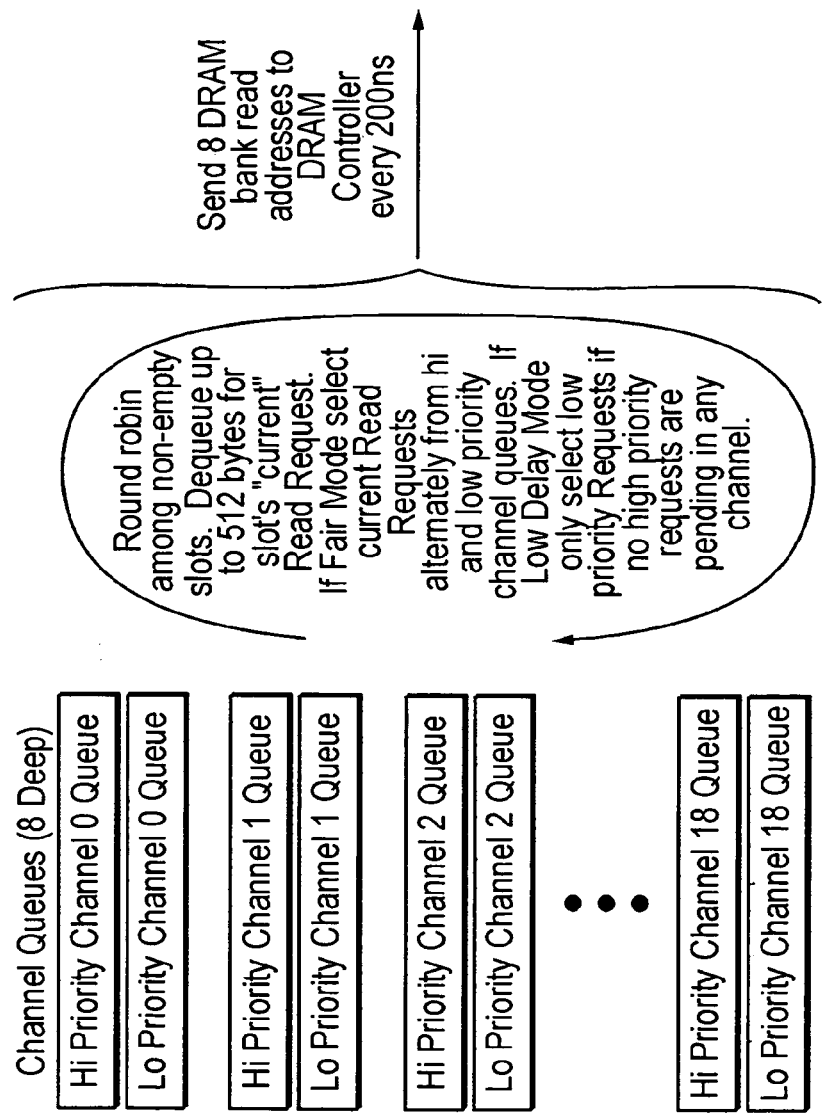
FIG. 21 is a high-level schematic view of Channel Queue selection.

This logic (FIG. 21) is responsible for processing the Channel Queues and sending 8 DRAM bank read addresses to the DRAM controller every 200 ns Read Cycle. Each Read Cycle the a new non-empty Channel Queue may be selected for processing based on round robin and priority.

If every request in the Channel Queues were for reading a queue with a large number of cells, the requests could simple be processed one at a time in order. When the requests are to read queues under 8 cells DRAM read bandwidth can be degraded if a full 200 ns Read Cycle is used to process just that request as noted in the above Bandwidth Issues section. Light traffic of small packets to the Hi Priority Channels can easily cause this situation to occur.

The algorithm used by the Read Scheduler to process the Channel Queues and optimize DRAM read bank usage for high priority Channels in Low Delay mode is:

```
For each slot without a current Request {
        if (Fair Mode) {
                Select current Request from alternate Channel Queues.
        } else {
                if (Channel's high priority queue not empty) {
                        Select slot's current Request from high priority queue.
                } else if (all Channels' high priority queues are empty)
                        Select slot's current Request from low priority queue.
                } else {
                        Leave slot without a current Request.
                }
        }
}
Every 200ns select round robin the next slot with a non-backpressured current Read Request.
        If that Request has >= 8 cells left to read or it is a Large Request {
                Setup addresses for all 8 cells.
                Add 8 cells the Read Request address, subtract 8 cells from Cells Left.
        } else {
                Setup addresses for all cells needed by Read Request.
                Clear the Request's Valid flop.
                Check up to 9 additional Small Request in the Channel Queues. For each Request {
```

```
                -continued

If banks used by Request do not conflict those in
use {
                Setup addresses for all cells needed by Read
Request.
                Clear the Request's Valid flop.
         }
      }
   }
   Send all setup Addresses to DRAM Controller.
```

In the case where a Channel's current request has <8 cells to read the Read Scheduler is basically trying to group together multiple Small Requests in order to improve bank utilization. The Scheduler must be selective about which Small requests are grouped together to avoid sending data to a channel that is already in the middle of a Medium or Large Request. The rules are:

- Any Small Requests from the slot that is currently being processed in the round robin are eligible.
- Small Requests from any slot that is not in the middle of processing a Medium or Large Request may also be read out.

It is important to optimize data across slots when possible. Otherwise the scenario described above in which a lot of data is sent to a few channels and light traffic is spread out evenly among the other channels will cause problems.

In Low Delay mode low priority Channel Queues are serviced whenever all the high priority Channel Queues are empty. Note however that once a slot selects a low priority Request as it's current Request, that low priority Request is allowed to complete. This is necessary to support legacy line cards that do not support multiple fabric priority or for output to a TX interface. In Fair Mode Requests are selected alternately from a slot's high and low priority Channel Queues.

| | |
|---|---|
| Low Delay Mode | For each slot Read Requests from the high priority Channel Queue take priority but do not preempt a low priority Read Request already in progress |
| Fair Mode | For each slot high and low priority Requests processed alternately for each Channel Queue |

While another mode could be added for output specifically to OC192 line cards to support preempting a low priority Request in progress with a high priority Request, it does not seem worth the added complexity.

Note that low priority Small Requests may be grouped with high priority Requests when all other high priority Small Requests use conflicting banks.

Each Channel Queue may be backpressured by the FIA, PLIM, or CPU. If a slot's current Request is for a backpressured channel that slot is skipped in round robin processing.

Figure 22:
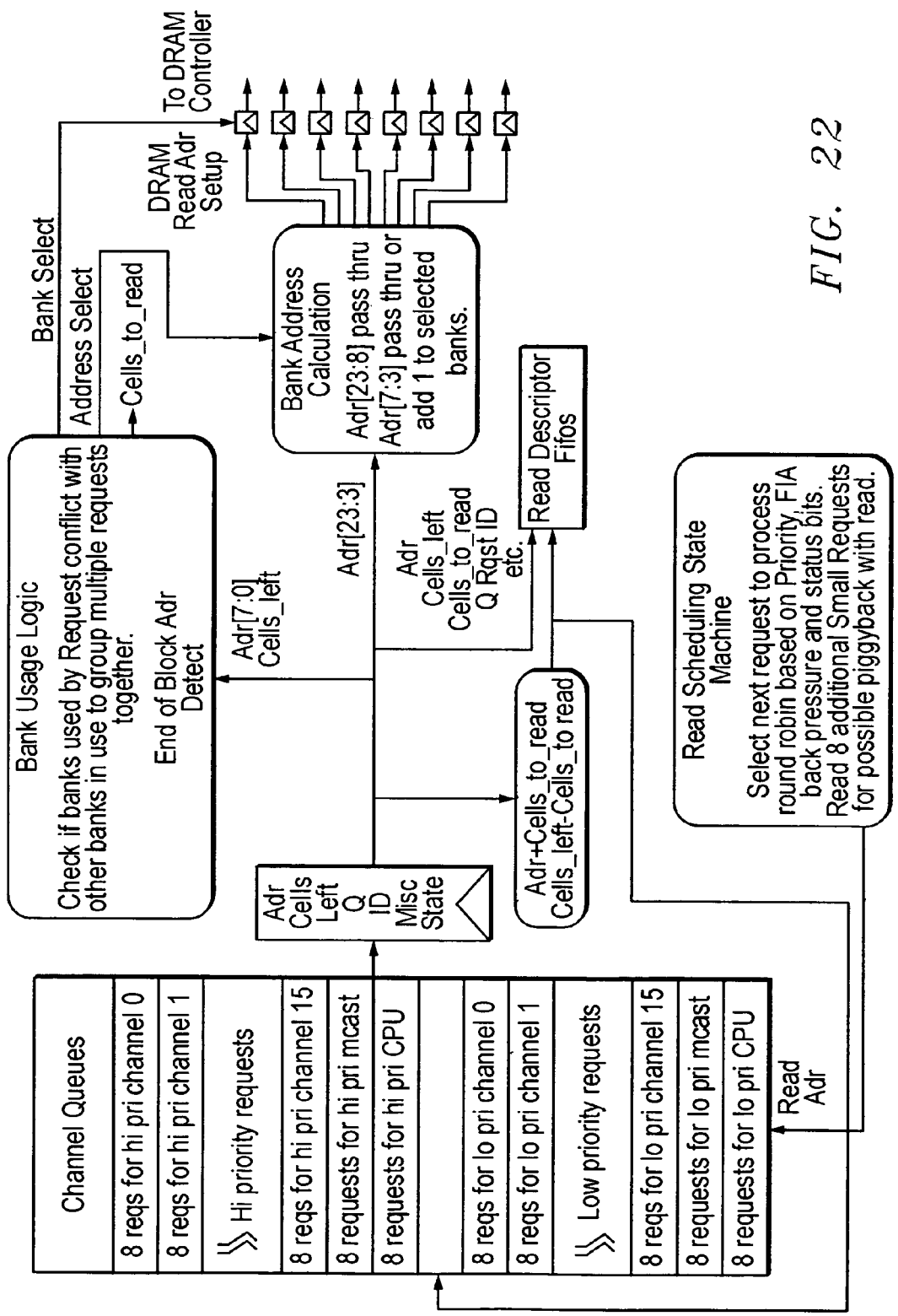
FIG. 22 is a high-level schematic view of Channel Queue address setup and request reordering.

The logic for doing address setup and request reordering is shown in FIG. 22.

A Read Scheduling State Machine controls selecting requests for output and address setup. It processes the Channel Queues in internal SRAM using the algorithms described above.

When multiple slots have pending requests a different one is serviced in every Read Cycle. When a slot's turn comes up it is allowed to read up to 8 cells from DRAM. The Read Scheduler maintains a 3 bit pointer to the current 1 of 8 requests being processed for each channel. This pointer round robins between available requests in the channel.

Address setup for a request with more than 8 cells is straight forward. At the start of the Read Cycle the selected request is read out of the Channel Queues memory. The combinational Bank Usage Logic sees that Cells Left is >=8 and determines which banks should be read from the low 3 bits of the Address Field.

The DRAM Read Address Setup registers are loaded with 8 sequential addresses starting from the request's Address Field value. Address bits 2:0 will always be constant for each Bank Address Setup register. Request address bits 23:8 can be loaded directly into each Bank Address Setup register since the high bits delineate 16 KB memory block boundaries. The Bank Usage Logic will prevent the request from reading past the end of block. The bits that may differ in the 8 sequential read addresses are 7:3. They will only differ by +1. The Bank Usage Logic selects whether each register should load Adr[7:3] or Adr[7:3]+1, or nothing at all.

The request Address Field is incremented by 8 and the Cells Left field decremented by 8 and the results are written back to the Channel Queue. The results along with the original state are also stored into Read Descriptor FIFOs for use by Post Read Output Processing Logic. That logic will count bytes and cells for the Request.

At the end of the 200 ns Read Cycle the Bank Address Setup registers are clocked into the DRAM Controller's Read Address registers and the actual DRAM read is launched.

Large Requests have their Cells Left field initialized to the Read Limit value (a multiple of 8 cells). Eight cells are read until the Cells Left goes to 0. For Large Requests, 8 cell reads continue after that (although Cells Left is not decremented) until Post Read Output Processing Logic feeds back a signal indicating the request is complete.

Medium Requests have an initial Cells Left value that is >=8 cells but <=the Read Limit. The precise number of cells to read is known in advance. Eight cells are read each time the Request is processed until Cells Left falls below 8. Then the Medium Request is processed the same as Small requests.

Small Requests have <8 cells to read. The precise number of cells to read is known. Multiple Small Requests which do not require reading of the same DRAM banks are grouped together and read in a single DRAM Read Cycle. Small requests may also be grouped together with the last read for a Medium Request. Large Requests are not grouped with any Small requests.

During each Read Cycle, after the slot's current Request is read out and processed the state machine begins to read out only Small requests. If the banks used by an additional Small Request do not conflict with those already in use the additional Request is processed in the same way as the initial request: The Bank Usage Logic will setup the appropriate Bank Address Setup registers and an entry will be written into the Read Descriptor FIFOs. The Channel Queue is not updated since the Small request is finished. Its valid bit is cleared instead.

The more Small requests that can be read out and compared for grouping during a single Read Cycle the better the optimization of bank utilization. The address setup timing allows for up to 10 requests per Read Cycle to be compared.

Figure 23:
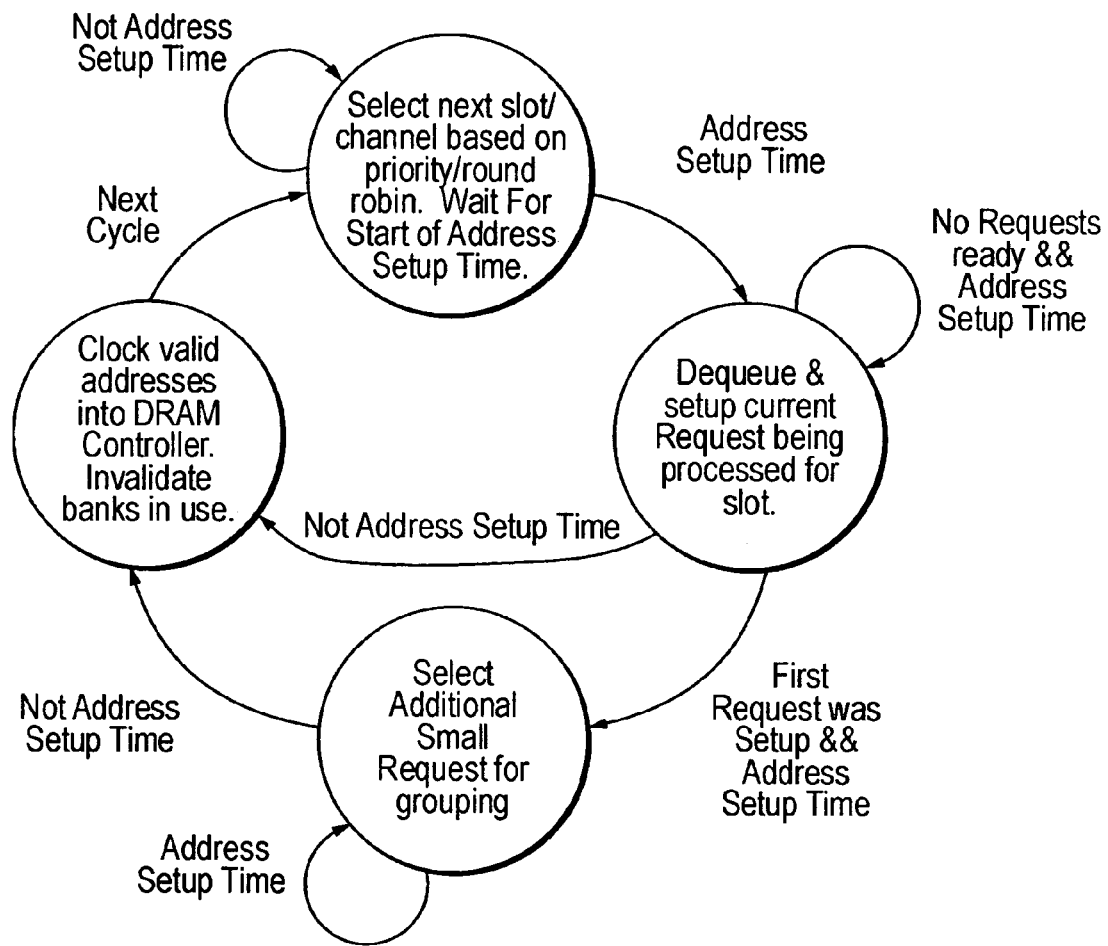
FIG. 23 is a state diagram for the Read Scheduler state machine.

FIG. 23 is a state diagram for the Read Scheduler State Machine. Scheduling is done during a fixed 10 clock cycle window during the 200 ns Read Cycle. This window is labeled Address Setup Time.

Post Read Output Processing

This logic counts the total number of bytes and cells read for each Request. When a Request is completed the counts are sent back to the Queue Manager and MDRR for updating queue lengths and deficits. The logic also puts the DRAM cells in the correct order for output and assigns the correct priority and channel number to each cell.

The Read Descriptor FIFOs contain entries from the Read Scheduler which describe which cells were read for each Request processed during a single Read Cycle. Up to 8 different Descriptors can be generated during each Read Cycle since up to 8 different queues may be read. These Descriptors are read by the Output Processing logic to figure out how to process the cells returned from the DRAM read operation. Because address setup occurs one Read Cycle prior to output data being processed two Read Descriptor FIFOS each with room for 8 entries are used. Each Read Cycle the Read Scheduler writes to one FIFO and the Output Processing reads from the other. The two FIFOs are swapped at the start of the next Read Cycle.

Output processing must handle the fact that Small, Medium and Large Requests from multiple channels are interleaved rather than read sequentially to completion. An arbitrary example of the order in which data cells might need to process DRAM cells is shown in FIG. 24.

In Read Cycle 0 a Request to read queue 14 from Channel 0 is started. Note that the packet at the current head of this queue starts in a data cell that is in DRAM bank 6. In Read Cycle 1 Channel 1 is processed. The current Read Request for that channel is to read queue 131 which has only one small packet in it. The Read Scheduler groups with this 2 other Small-Requests that do not use conflicting DRAM banks, queue 307 from Channel 2 with 4 cells to read and queue 692 from Channel 5 with 2 cells to read. Note that only 7 of the 8 banks are actually utilized. In Read Cycle 2 the Read Scheduler returns to Channel 0, queue 14. 4 more cells are read which completes the request. It was a Medium Request—only 12 cells read total. The Read Scheduler piggybacks another Request from low priority channel 20, queue 1301 on to the end of this Read Cycle.

Note that while the DRAM banks are read in order 0-7, the output processing order may be different. To avoid any race conditions the Output Processing waits for all 8 DRAM banks to be read before beginning processing.

For each Request in the Channel Queues there is a corresponding set of byte and cell counters in the Request Accounting Memory. Whenever a Request isn't completed in one Read Cycle its counts are stored there until the next time the request is processed. The Init bit in the Read Request and Read Descriptor is set the first time a Request is processed. This forces the output logic to begin counting at 0 instead using the Request Accounting Memory values.

In order to count Request bytes and cells output processing tracks the starts of packets for each request read. A count of how many cells are left to the start of the next packet is also stored in the Request Accounting Memory.

Output Processing logic consists of a pipeline of several stages. Data flows from one stage to the next in one clock cycle:

When the DRAM read completes an entry is read from the Read Descriptor FIFO into the pipe.
Cells for the Request are muxed into the pipe.
Counts for the Request are fetched and any packet header sizes are inspected.
Cells are counted, the lengths from any start of packet cells are added to totals.
Totals are sent the Queue Manage and MDRR when a Request completes, else stored back to the Request Accounting Memory. Cell data is sent to the FIA, PLIM or CPU.

A Large Request is considered complete when its Cells Left field is 0 and an end of packet is encountered in the pipe. Any additional cells that may have been read in that Read Cycle are processed in the pipe but not counted or output. Feed back is also sent to the Read Scheduler State Machine whenever a Large Request completes so it may free up the Channel Queue entry.

One potential race condition can occur if a Large Request ends and the Read Scheduler has just set that same Request up for another DRAM read. This is detected by the Read Scheduler and a signal is send to the Output Processor to ignore all cells in the next Read Cycle.

When End of Block is set for a cell its data is used as the address of the next memory block. The original address is sent back to the queue manager so the block may be freed. The Request is sent back to the Channel Queue to update the request's Address field.

Local CPU Interface

One port with 8 COS queues running MDRR is dedicated to local CPU output. For the purposes of Read Scheduling in the MCC this port's requests are fed into one high and one low priority channel dedicated for the CPU output. On the TX side however there is only one channel (one priority) dedicated for the CPU output port to avoid interfering with real time output to the PLIM.

Data cells bound for the CPU are demuxed from the FIA or PLIM output path into either a high or low priority CPU output FIFO/buffer. Each FIFO is 9K+1536 bytes and back pressure is asserted to the corresponding CPU output channel whenever a buffer exceeds 9K bytes.

Packets in these FIFOs may be mapped into CPU address space and accessed via the Salsa ASIC interface. The CPU may update a packet and send it back to the MCC as input or it may copy the packet into its own DRAM and flush it from the FIFO.

For locally generated CPU packets the CPU requests a free buffer from the MCC. One 9K buffer is dedicated for this in MCC internal SRAM. This buffer may also be mapped into CPU address space, accessed via the Salsa ASIC interface, and sent back to the MCC as input. The MCC processes packets coming back from the CPU the same as those coming from the RX interface.

Packet writes from the CPU to MCC SDRAM compete with input data from the RX for DRAM write bandwidth. For average size packets this should not be an issue.

TX Output Queue Rate Pacing

Output rate pacing is easily implemented with the per queue back pressure mechanism in place for the MCC. Two values are maintained in internal SRAM for each TX output queue: Output Byte Accumulator and Output Rate Bytes Each time data is read from a queue the total number of bytes is added to the Output Byte Accumulator. If a queue's accumulator exceeds some global threshold back pressure is asserted for that queue.

Periodically each queue's Output Rate Bytes is subtracted from its Output Byte Accumulator. If the result is less than the global threshold back pressure is deasserted for the queue. The result is set to 0 when Output Rate Bytes>Output Byte Accumulator.

The Output Rate Bytes governs the rate at which queue data can be sent. The period of accumulator updates and the global threshold determine the granularity of control over burstiness.

A dual ported SRAM for the Accumulator and Rate would provide enough access to do 8 accumulator updates from the DRAM read operations and 8 accumulator updates for rate pacing in each 200 ns Read Cycle. 144 queues could be updated every 3.6 us.

The Output Rate Bytes need not be larger than 3.6 us*10 Gb/s=4500 bytes or 13 bits. The Global Rate Threshold should probably be >=MTU+Read Limit.

The Output Bytes Accumulator should hold at least MTU+Read Limit+global threshold bytes. With a 4 KB Read Limit and 9 KB MTU, that equals 36 KB. A 16 bit counter should suffice.

This is used to retrieve the queue's head address and a copy of the queue length. The Read Queue Length copy only contains the lower 9 bits (up to 512 cells) of the total queue length and two status bits: a Small status bit indicates that the queue length is <8 cells and a Large bit indicates if the queue length is >the global Read Limit. Whenever a queue's instantaneous length is updated this Read Queue Length copy and its status bits are also updated.

FIA192 and PLIM Output Interface

Data is sent to the FIA or PLIM in 128 bit words on a 128 pin, 200 MHz sourced clock interface. This provides 25.6 Gb/s of output bandwidth and allows the MCC to output data cells directly from DRAM without per channel output buffering. A 5 bit channel number, 1 bit priority and 2 bit word descriptor (Start of Packet, Data, Idle) is sent along with each data word. New packets are begun on 256 bit boundaries.

The FIA or PLIM can assert back pressure for each output channel. Channel back pressure is ignored once the Read Scheduler begins Address Setup. Three 200 ns Read Cycles (worst case) can be launched for a particular channel after back pressure is asserted—from the Read Scheduler's perspective. Given each Read Cycle may read up to 512 bytes the FIA or PLIM should be able to buffer at least 1536 bytes after it asserts back pressure. Note that latency between the time the FIA or PLIM's queue reaches a threshold and the back pressure signal reaches the Read Scheduler could increase this worst case buffering requirement.

Likewise there is latency between the time the MCC or TX will start to send data after channel back pressure is deasserted. The absolute best case is 350 ns. When the Read Scheduler has data for only one channel the average latency will be 3 Read Cycles or 600 ns.

In the worst case when the Read Scheduler has data for all output channels the average latency will be the greater of 600 ns or ½ the number of channels*200 ns. The worst case latency is number of channels*200 ns. (This does not take into consideration output priority.) For a 4 port TX the worst case is 1000 ns. For FIA high priority queues the worst case latency is 3600 ns.

TX ASIC

Figure 25:
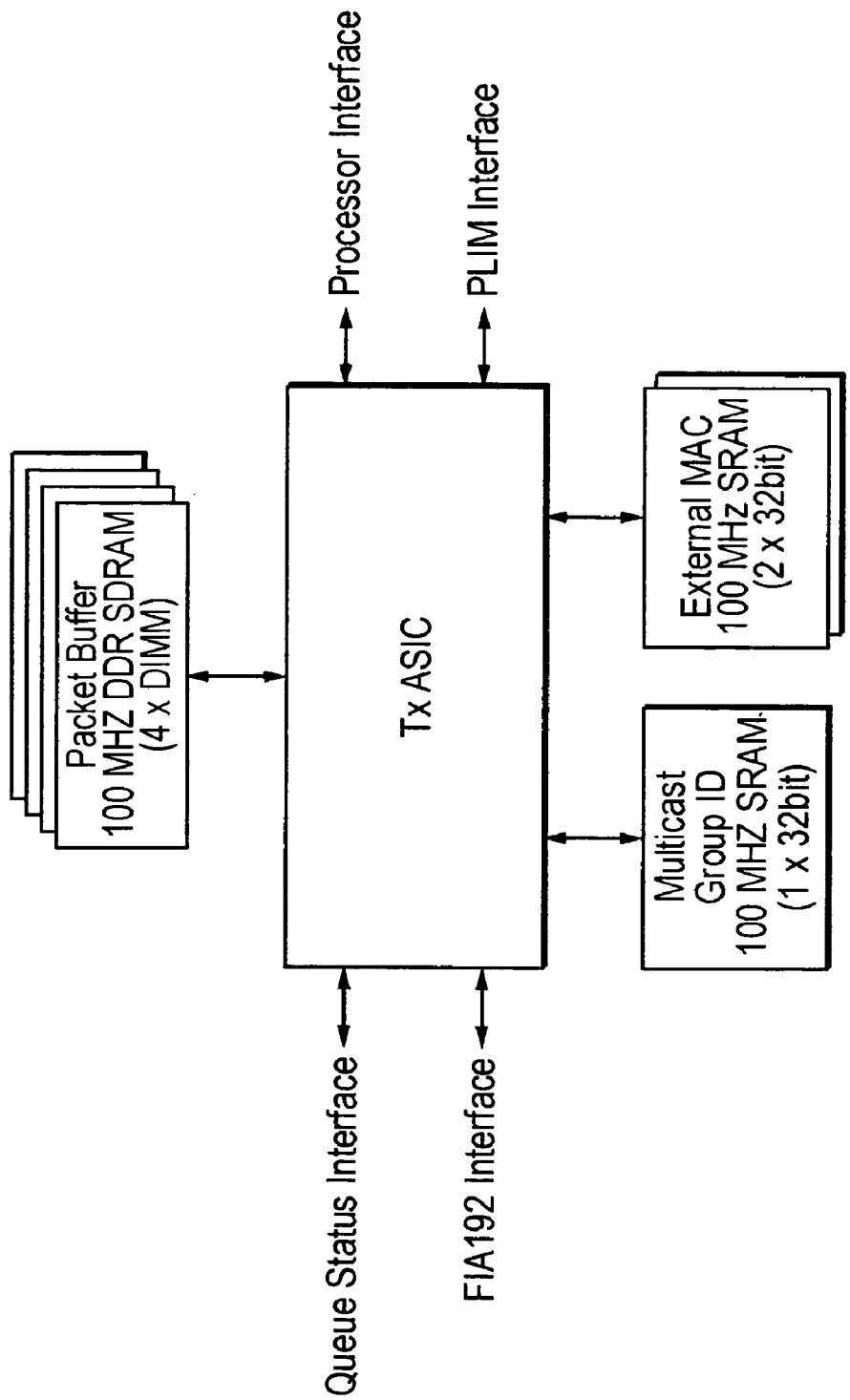
FIG. 25 is a high-level interface schematic of the TX ASIC.

The TX ASIC receives packets from the FIA, performs Multicast Duplication, MAC Rewrite, Output CAR (traffic policing) and a packet buffer which is leveraged from the MCC ASIC. The packet buffer is drained and packets are then sent to the PLIM based on various output schemes which include DRR and output rate shaping. In addition to this the TX ASIC provides a method of receiving configuration packets from the RP which are sent to the processor on the linecard. See FIG. 25.

TX ASIC/FIA192 Interface

The FIA interface is an 8 byte wide 100 MHz DDR source clocked packet based interface. This interface supports multicast and unicast "channels" each of which is controlled with a separate XOFF signal. When an XOFF signal is asserted not more than 128 bytes will be sent to the back pressured channel (i.e. stop with in 80 ns).

It should be noted that traffic being sent to the multicast raw queue is assumed to only arrive as multicast traffic from the FIA192. i.e. traffic destined for the multicast raw queue should not arrive as unicast traffic from the FIA192.

Functionality

Figure 26:
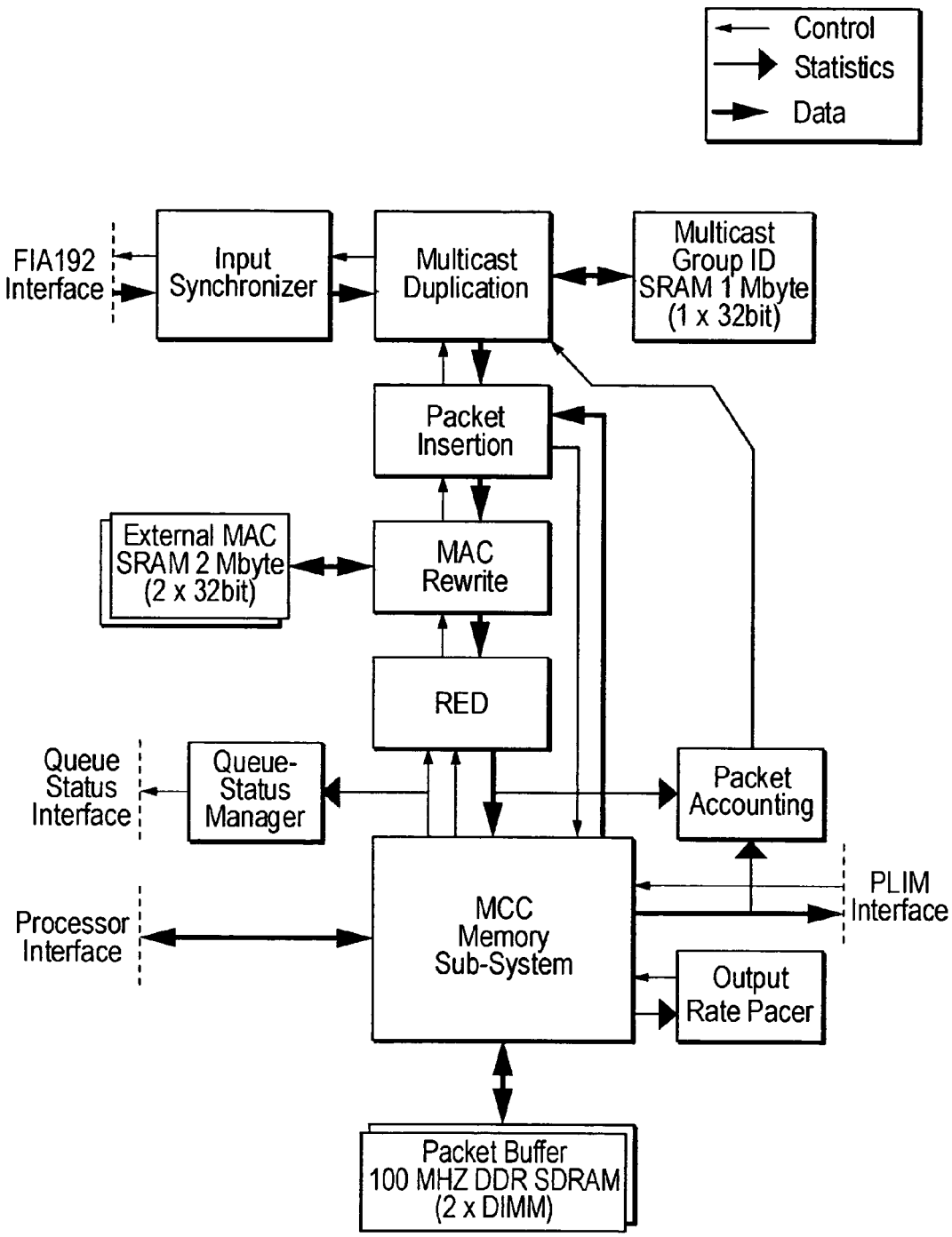
FIG. 26 is a high-level block diagram of the TX ASIC.

The TX ASIC block diagram is shown in FIG. 26. In order to maximize code reuse, the TX is designed to leverage architectural modules from other ASICs in the OC192 chip set. These modules are shaded in the block diagram. This section describes each of the top level modules and then describes how a packet would flow through the system.

Input Synchroniser Module

The Input Synchroniser module (ISM) is a standard module used on all the OC192 ASICs and is described in detail earlier in this document.

Input Synchroniser/Multicast Duplication Module Interface

This interface is a simple 128 bit wide data path with some control information and 2 separate back-pressure signals. The format of packet data in this interface is the same as packet data on the FIA192/TX ASIC interface and is described in the TX ASIC/FIA192 Interface section above.

Multicast Duplication Module

The Multicast Duplication module (MDM) performs some input buffering and multicast duplication at 25 Mpps and 10 Gbps.

Figure 27:
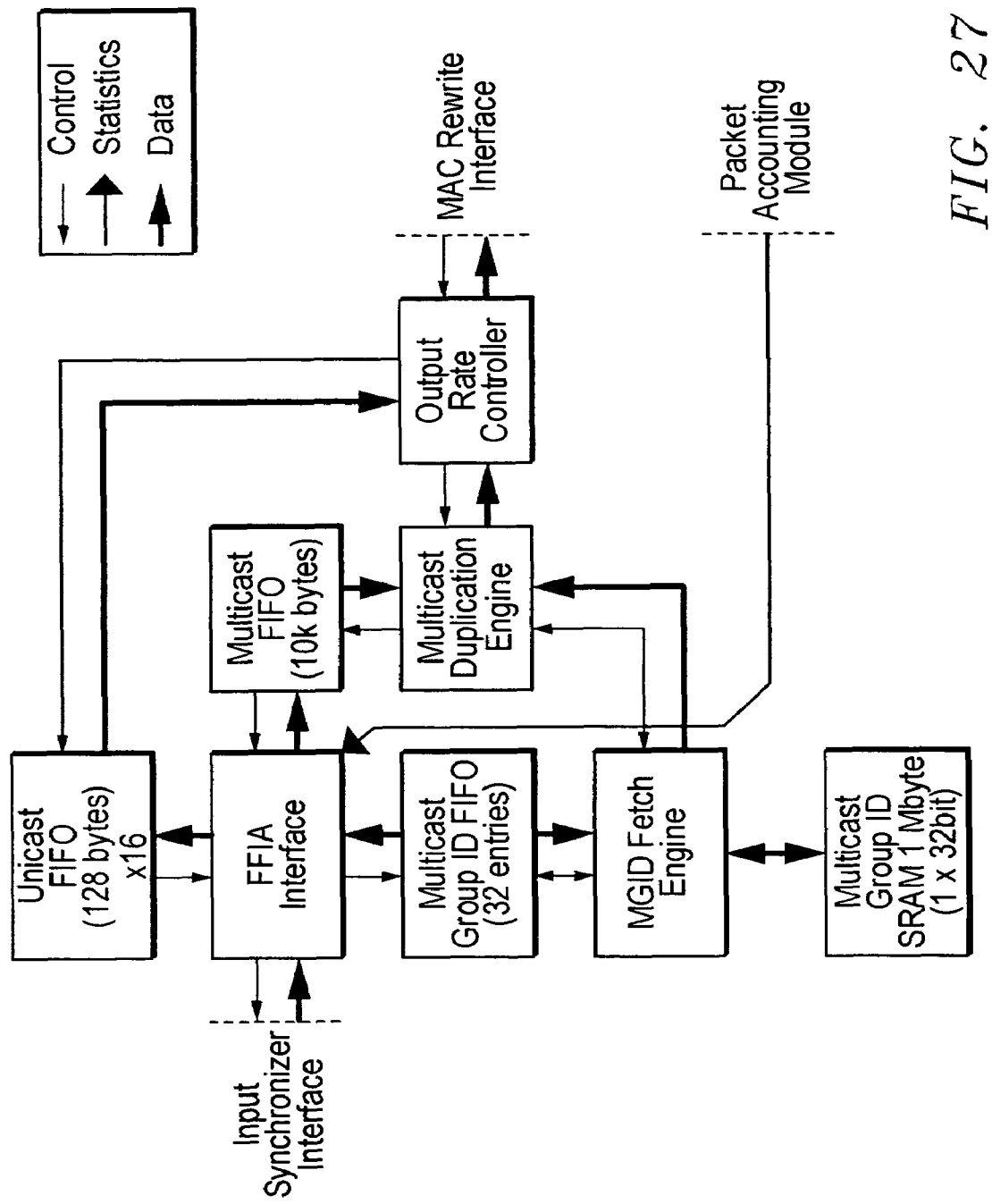
FIG. 27 is a high-level block diagram of the Multicast Duplication Module (MDM).

Input buffering is done separately for unicast and multicast packets. Multicast traffic is drained by duplicating the packets as required and is rate limited to some programmable maximum bandwidth value. Unicast traffic is drained at the available output bandwidth rate, i.e. unicast traffic uses all the bandwidth not consumed by multicast duplication. A block diagram of the MDM is show in FIG. 27.

Multicast Duplication is done by using the Multicast Group ID (MGID) in the Output Info field to access an MGID data structure stored in external SRAM. The MGID is extracted as packets enter the Multicast FIFO and are placed in the MGID FIFO.

FIFO Manager (MDM_FM)

The FIFO Manager (controls the destination of incoming data. The MGID address from the output info field of incoming multicast packets is extracted and written to the MGID FIFO while Unicast and Multicast packets are written to the respective FIFOs. This module also generates backpressure (XOFF) to the up stream module. The XOFF signal is generated when the data FIFOs are 8 words (128 bytes) from full, or when the MGID address FIFO is 2 addresses from full.

The MDM_FM also responds to a stop multicast command from the Packet Accounting Module. When mm_stop_mc is asserted, this module either asserts multicast back pressure to stop multicast traffic or it deasserts multicast back pressure if it was asserted and simply drops all incoming multicast packets until mm_stop_mc is deasserted. The response to mm_stop_mc is programmable.

Unicast, Multicast and MGID FIFOs

These are simple FIFOs with the Unicast FIFO being 256 bytes deep and the multicast FIFO 10 KBytes (~MTU+128 bytes). Each location in these memories is 131 bytes wide (128 data bits+~3 command bits). The MGID address FIFO can hold 16 MGID addresses of 18 bits each.

MGID Fetch Engine (MDM_MFE)

The MGID table is fetched from the external SRAM by this module. (An MGID data structure is a linked list of arbitrary size in memory.) To account for external SRAM latency there are 3 state machines which fetch and interpret the MGID data structure enabling the MGID for 3 packets to be processed simultaneously. The address of the MGID data structure is determined by multiplying the Multicast GID by 5 and adding a programmable offset. In order to minimize external part counts, only 1 MByte of MGID data structure storage is provided with the option to upgrade to 2 MBytes when the SRAM technology becomes available. This allows 51k minimum size MGID entries (4 or less duplications) or 12k maximum size MGID entries (16 duplications). The default action is to read the first 3 words of the MGID data structure at this address from external SRAM. Once the first part of the data structure has been received, a decision is made to fetch the rest of the data structure based on how many copies of the packet need to be made. The default action of fetching the first 3 words allows 2 copies to be made while the rest of the data structure is fetched if required.

The data fetch is handled by three state machines as mentioned earlier which work in parallel and are scheduled using a rotating priority. Initially, as a packet comes in all machines are idle. The first machine is assigned the highest priority, and the packet is assigned to it. The machine maintains the same highest priority until the duplication of the packet to all the ports is complete. While this packet is being duplicated, if the next packet arrives, it is assigned to the next machine and assigned the next lowest priority for data fetch. The second packet will never be scheduled for transmission before the duplication of the first packet is completed. Once the duplication of the first packet is complete, the second packet—now ready for transmission, because the MGID has already been fetched-assumes highest priority.

The data fetch from the external SRAM is arbitrated by simple priority arbitration. Each of the data fetch machines has a 3 word deep MGID stack. When the second to last MGID in the stack is scheduled for transmission, the next fetch is started. This ensures that there is no delay between duplicated packets for 100% MC traffic.

The number of state machines was chosen to minimize the packet to packet latency in case of 100% 60 byte multicast packets, generating only one copy of each. The number of multicast packets that can be queued up in the MDM is limited by the multicast FIFO depth. Once a packet is queued up, it takes 7 clocks for the packet to be transmitted to the next module. Assuming minimum sized packets, with duplication to one port, three state machines can handle almost 100% multicast bandwidth with zero delay between packets.

Multicast Duplication Engine (MDM_MDE)

The MDE operates by simply inserting the output info fields into the copy of the current packet and sending it out, It repeats this operation until the required number of copies has been made. The port RED COS # and TOS come from the original Output Info field and are used to build the output queue number for each new packet.

It should be noted that the MDE cannot generate packets destined for the local CPU.

Output Rate Controller (MDM_ORC)

The Output Rate Controller manages the traffic from unicast and multicast traffic. Multicast traffic from the MDE is rate limited using a single token bucket scheme. The token bucket has tokens added every 4 clock cycles until some maximum value determined by the burst parameter is reached. When the token count less than or equal to zero, the MDE is masked off in the round robin, thus preventing multicast packets from being processed. When a multicast packet is selected, it is drained from the MDE and the count reduced by the size of the packet. If the count goes negative, no further multicast packets are allowed through until enough tokens are added to make the token count positive. If there is no multicast traffic, tokens are added to the bucket until some maximum value determined by the burst parameter is reached. A simple round robin is used to select between multicast traffic (when it is within it's rate limit) and unicast traffic. This implies that while there is heavy unicast traffic, multicast traffic will have an upper limit of approximately 50% of the available interface bandwidth or 6 Gbps.

Multicast packets leaving the MDM are essentially indistinguishable from a unicast packet and are processed as such by downstream modules.

Multicast Duplication/MAC Rewrite Module Interface

This interface is similar to the Input Synchroniser/Multicast Duplication Module Interface described earlier, the principal difference being that there is only a single back-pressure signal and only unicast packets are transferred on this interface.

The format of packet data on this interface is the same as packet data on the FIA192/TX ASIC interface. For packets duplicated by the MDM all the fields in the header come from the original multicast packet with the exception of the Output Queue # and Output Info field which is generated as describe above.

MAC Rewrite Module

Figure 28:
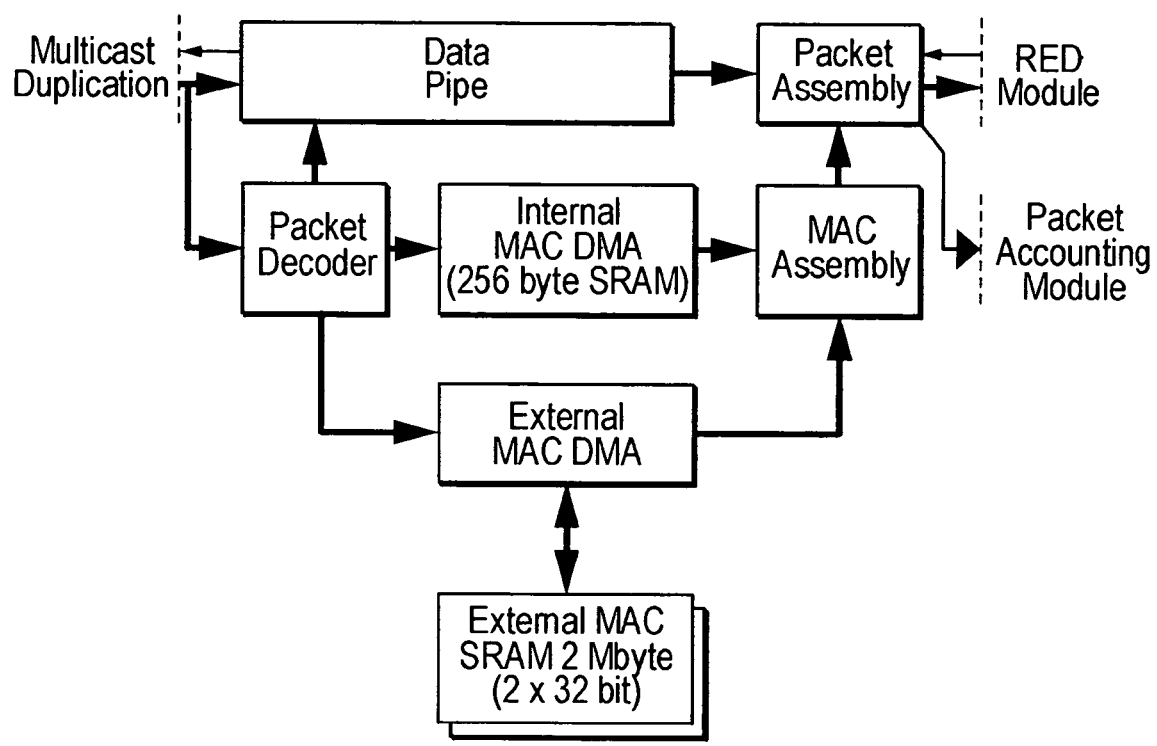
FIG. 28 is a high-level block diagram of the MAC Rewrite Module (MRM).

The MAC Rewrite Module (MRM) performs MAC rewrite or TAG insertion at 25 Mpps and 10 Gbps (see FIG. 28). It should be noted that packets destined for the processor raw queues are left unchanged by the MRM.

MAC rewrite is done by using the rewrite index from the Output Info field in the buffer header to select a MAC which is added to the start of the packet. The Output Info field is found by examining the Source offset in the incoming packet header and results in 2 possible actions.

Source Offset=0x14. This is the compressed buffer header format which implies that some default MAC be applied. This is extended from the existing linecards to include a default MAC per port. This is done by selecting a default Output Info field from a table which is indexed with the Port # field of the Output Queue #.

Source Offset>0x14. This is a half or fill buffer header and as such the Output Info field is included in the packet header.

Once the Output Info field is found, it is interpreted in order to select and apply a MAC and an optional TAG to the packet. There are 4 modes or formats for this field which are described below. The modes are provided to make efficient use of the limited internal and external MAC memory available and to maximize performance for interfaces with MACs larger than 8 bytes.

Mode 0—All External MAC

This allows the greatest flexibility and provides for MACs up to 127 bytes long to be appended to the start of the packet. These MACs are all stored in external SRAM and as a result line rate can only be maintained if the MAC is less than or equal to 8 bytes long in this mode. For every 8 bytes of MAC length after the first 8 bytes there is a 1 clock cycle penalty (10 ns). The MAC fetched from external SRAM is appended to the front of the packet and a new packet header is generated.

Mode 1: Part Internal MAC

This allows the application of two part MAC to the packet, one part from external SRAM followed by part from an internal SRAM. The total MAC length can be up to 31 bytes long with the internal part of the MAC up to 16 bytes long. This mode actually has 3 sub-modes. Each of these sub modes has a separate programmable byte alignment and offset into the internal SRAM. The byte alignment for the internal MAC is selectable between 4 and 16 bytes. This allows the 4 bit Internal MAC index to select all 256 bytes of the internal MAC SRAM.

Line rate can be maintained for most combinations of internal and external MACs with line rate being guaranteed for up to 8 byte external MAC part followed by any size internal MAC part. If the internal MAC part is 8 bytes or less then line rate can be guaranteed for external MAC part sizes up to 16 bytes long, for external MAC parts greater than 6 bytes there is a 1 clock cycle penalty (10 ns). If the internal MAC part is greater than 8 bytes long, line rate can be maintained for all possible sizes of the external MAC part. However if either MAC part is less than 16 bytes in length and crosses a 16 byte boundary there is a 1 clock cycle penalty (10 ns).

Part of the MAC stored in external SRAM or defined in the Output Info field is appended to the MAC stored in internal SRAM building the actual MAC which is appended to the front of the packet and a new packet header is generated.

Typical applications for these modes is POS, Ethernet and ATM respectively. For POS the MAC is 4 bytes and the same per port so the small internal SRAM can be used to store all the MACs. With Ethernet, there is typically a 6 byte source part of the MAC which is fixed per port which could be stored in the small internal SRAM and a 6 byte destination part of the MAC with a large variation which could be stored in the external SRAM. ATM typically has a VC identification which could be passed in as part of the Output Info field and a few bytes of MAC which is fixed per port which could be stored in the small internal SRAM. This is provided to make efficient use of the internal and external MAC SRAMs and is not intended to imply any special logic in the LU or RX ASICs to generate these, they can come directly out of the adjacency.

Mode 2: TAG

The TAG format Output Info includes the new TAG label (20 bits) as well as an address/length pointer into the external MAC SRAM. The encap that comes from the SRAM is sent to the interface first, then the Start Offset is backed up 4 bytes in order to point to the TAG that is being replaced, the new 20 bit TAG is then concatenated with the remaining 12 bits of the previous TAG entry (COS, TTL) and sent to the interface, followed immediately with the rest of the packet. Note that this TTL value is assumed to have already been updated by the receiving (to fabric) linecard before the packet was sent to here.

Mode 3: Part Internal MAC with automatic length calculation and insertion

This works by calculating a length value by adding one of two constants to the L3 length and inserting the resulting 16 bit value into bytes 13 and 14 of the MAC. The two selectable constants are 4 bit programmable values. Default values for these constants are Const0=3 for SAP IEEE 802.3 encapsulation and Const1=8 for IEEE 802.3 with IEEE 802.2 and SNAP encapsulation. The internal SRAM address for this mode is 16 byte aligned. In order to minimize the component count, only 2 MBytes of external SRAM for MAC storage is provided with the option to upgrade to 4 MBytes when the SRAM technology becomes available.

Once the MAC has been selected it is appended to the front of the packet. Any alignment needed to match the MAC to the packet is also done at this time. The new packet length and Free Queue # are generated and inserted into the new packet header sent out on a separate bus along with the packet to the next module.

MAC Rewrite Module Functional Blocks

Packet Decoder (MRM_PD): This block decodes the packet header to determine the Mode, MAC length, MAC Address etc.

External MAC DMA (MRM_ED): Fetch the variable part of MAC from external memory. The external bus width is 8 bytes wide. This has the capability to address up to 4 MB of external SRAM.

Internal MAC DMA (MRM_ID): Fetch the specified number of internal MAC bytes from on chip 256 byte SRAM. The internal bus width is 16 bytes wide. The byte alignment for the internal MAC can be 4 or 16 bytes. If the MAC is less than 16 bytes and crosses a 16 byte boundary, there is a 1 clock cycle penalty.

Data Pipe (MRM_DP): The Data Pipe simply holds the data for long enough to assemble the MAC which is to be prepended to the packet. In addition to this it contains a barrel shifter to align the packet with the end of the MAC which is being built ready for assembly by the Packet Assembly Module. Each stage of the pipeline also carries the command field, which indicates the start, idle, valid or last bus cycle of the packet. A tag switching packet goes through a MUX which overwrites the 20 bit TAG label with a new one from the output info field.

MAC Assembly (MRM MA): The MAC Assembly module consists of a barrel shifter to align the internal MAC part with the end of the external MAC part. The two are concatenated together with internal MAC part following the external MAC part. It should be noted that either or both of the MAC parts can be zero length.

Packet Assembly (MRM_PA): The Packet Assembly module consists of a barrel shifter to align the MAC and combine it with the newly generated packet header. The newly assembled header with the MAC is then prepended to the incoming packet and sent out. This submodule also broadcasts the total packet length in bytes and the multicast flag from the Output CAR field to the Packet Accounting Module.

MAC Rewrite/RED Module Interface

This interface is a packet interface with some out of band packet information which is passed to the RED module.

RED/MCC Block interface

This interface is used by the MCC to send instantaneous queue length information to the RED module so that average queue length information can be calculated.

Random Early Detection (RED) Module

Figure 29:
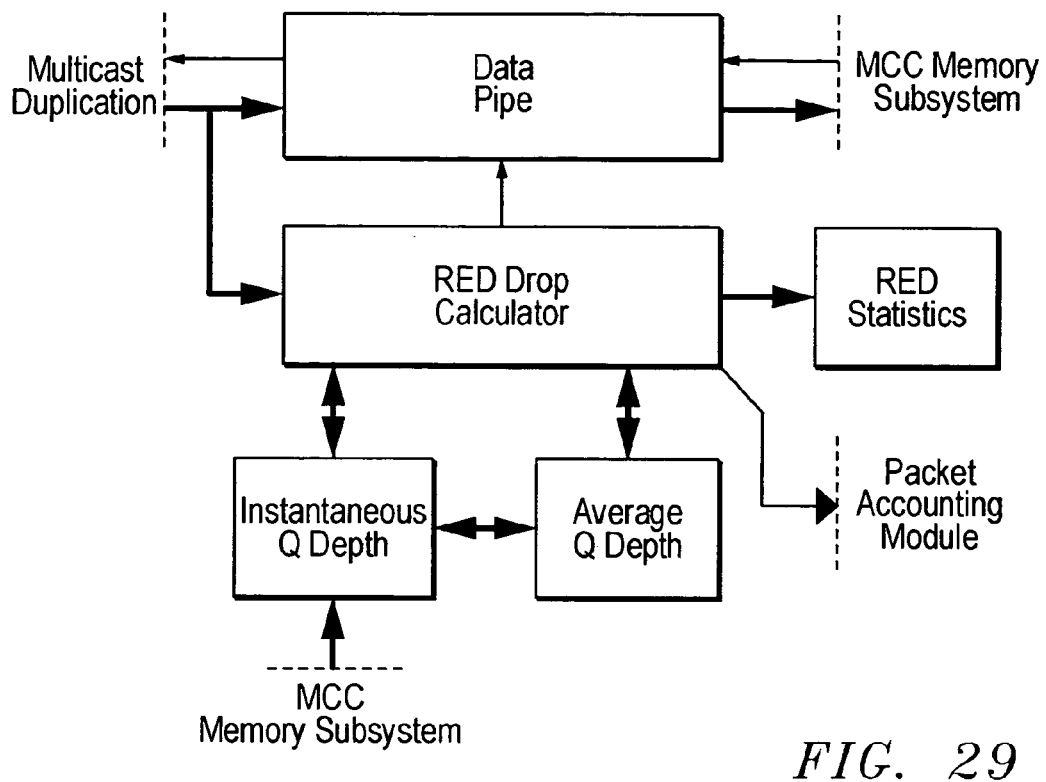
FIG. 29 is a high-level block diagram of the RED module.

The RED module (FIG. 29) is common to the MCC and TX ASICs. It features and functionality are identical in both instances, except for the number of queues supported. In the TX ASIC, RED is intended to control queue depth when the back pressure manager cannot assert per queue back pressure to the source line cards.

Key features of the RED algorithm implemented are:

Average queue depth is calculated periodically (approximately every 40 us to 60 us depending on the final implementation).

Both instantaneous and average queue depth are calculated based on 64 byte cells.

A max instantaneous queue depth parameter forces drops when the queue depth exceeds the max value and the feature is enabled (i.e. max instantaneous queue depth parameter is a non zero value).

Weighted RED (WRED) enables the RED parameter set to be selected independently of the output queue per packet. This is done in the MCC by concatenating the slot number or multicast bit and RED COS field to form a RED parameter set selector. In the TX the port number and RED COS field are concatenated to form the RED parameter set selector. Ordinary RED is also supported as it is a subset of WRED functionality.

The number of RED parameters is limited to 8 sets per Port for the TX giving a total of 128 parameter sets. In the MCC the number of RED parameters is limited to 8 sets per slot plus an additional 8 sets for multicast giving a total of 136 parameter sets.

The slope S of the RED drop probability curve is approximated to fractional powers of 2, implying that a slope of 1 is the steepest line possible. The slope is a 5 bit value which defines the number of right shifts to make in order to avoid a multiply operation.

RED can be bypassed on a per packet basis by defining a RED COS parameter set to be zero and having the packet select the zero parameter set. Using this feature reduces the number of RED COS parameter sets available from 8 to 7 per Slot/Port. There is also a global RED bypass flag which is asserted by default.

RED shift parameter W is a 4 bit value per queue

Instantaneous Queue Depth Module (RED_IQD): This module simply maintains a local copy of the instantaneous queue depth. The instantaneous queue depth is stored as a 24 bit value in chip SRAM.

Average Queue Depth Module (RED_AQD): The Average Queue Depth module calculates the average queue depth by periodically examining the instantaneous queue depth and recalculating the new average. The new average for each queue is calculated using the following equation:

$$D_{new\ ave} = D_{ave} + ((D_{inst} - D_{ave}) >> W)$$

where $D_{ave}$ is the average queue depth in cells (18 bit int, 5 bit fraction).

$D_{inst}$ is the instantaneous queue depth in cells (24 bit int).

W is the RED shift value for this queue (4 bit int).

It should be noted that the RED shift factor W is used literally as a shift value. It is a 4 bit value which specifies a shift right of W+4 with the value 0 being a special case. When W has a value of 0, no shift is applied, when it is 1, the shift is 5 bits (i.e. divide 32), When it is 15, the shift is 19 bits (i.e. divide 512k). In addition to calculating the average queue depth, this module returns the average queue depth for any queue when it is queried.

RED Drop Calculator (RED_DC): As each packet arrives at the RED module, the RED Drop Calculator requests the average queue depth and instantaneous queue depth for the output queue to which the packet is destined. It then looks up the RED parameters for this packet which is determined from fields in the Queue Number. For the MCC, the parameter set is selected by concatenating the slot # and the RED COS number for unicast traffic with a separate set for multicast traffic. The TX concatenates the port number and the RED COS number to generate a selector.

The parameters are:

Min threshold per RED parameter set (18 bits).
Max threshold per RED parameter set (18 bits).
Slope per RED parameter set (5 bits).
RED shift W per queue (4 bits).
Max instantaneous queue length per queue in increments of 16k cells (10 bits).

The RED drop probability is calculated to determine whether to drop the packet or not. A random number is generated and if it is less than Pdrop the packet is dropped as a random drop. If the average queue depth is greater than the max threshold the packet is dropped as a forced drop. Otherwise if the instantaneous queue depth is greater than the max instantaneous queue length the packet is dropped as an overflow drop.

The max instantaneous queue length limit can be disabled on a per queue basis by setting the value of the max instantaneous queue length parameter to zero or globally with a global disable flag. By default the global disable flag is asserted.

If a packet is dropped, the Data Pipe is instructed to drop the packet and the RED Statistics Module is informed that a packet was dropped, why it was dropped, its queue number and length. This submodule also broadcasts the total packet length in bytes and the multicast flag from the Output CAR field to the Packet Accounting Module.

For the MCC instance of this submodule, the RED parameter SRAM is 129×(18+18+5)=5.2 kbits. The per queue parameters (instantaneous queue length and red shift value) consume 2k×(5+10)=30k bits. For the TX instance of this submodule the RED parameter SRAM is 128×(18+18+5)= 5.1 kbits. The per queue parameters (instantaneous queue length and red shift value) consume 128×(5+10)=1.9 k bits.

Data Pipe (RED_DP): The Data Pipe is simply a short pipe which holds the data while the determination to drop the packet or not is made. If the packet is to be dropped, the packet is simply not sent to the next module, otherwise it is passed on.

Output CAR Module

Figure 30:
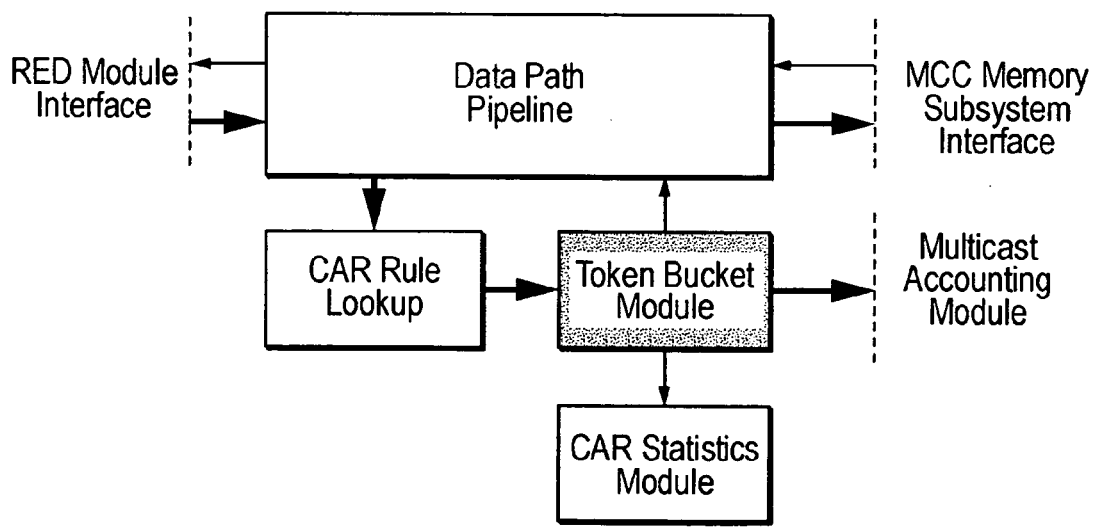
FIG. 30 is a high-level block diagram of the output CAR module, according to one embodiment of the present invention.

The Output CAR module (OCAR) performs a limited form of Committed Access Rate control on traffic arriving from the fabric. See FIG. 30. There are a total of 128 CAR rules. The rules are applied to traffic in a per port manner with support for up to 16 ports. The Output CAR module also maps the TX Output Queue number format into the local queue format used by the MCC.

CAR match rule format is:

<match>, <rate limit>, <burst rate>exceed <action>

Rules can match on any or all of the following fields: Output Port Number (4 bits); IP or TAG TOS (5 or 3 bits); Source AS label (7 bits); Destination AS label (7 bits)

Figure 31:
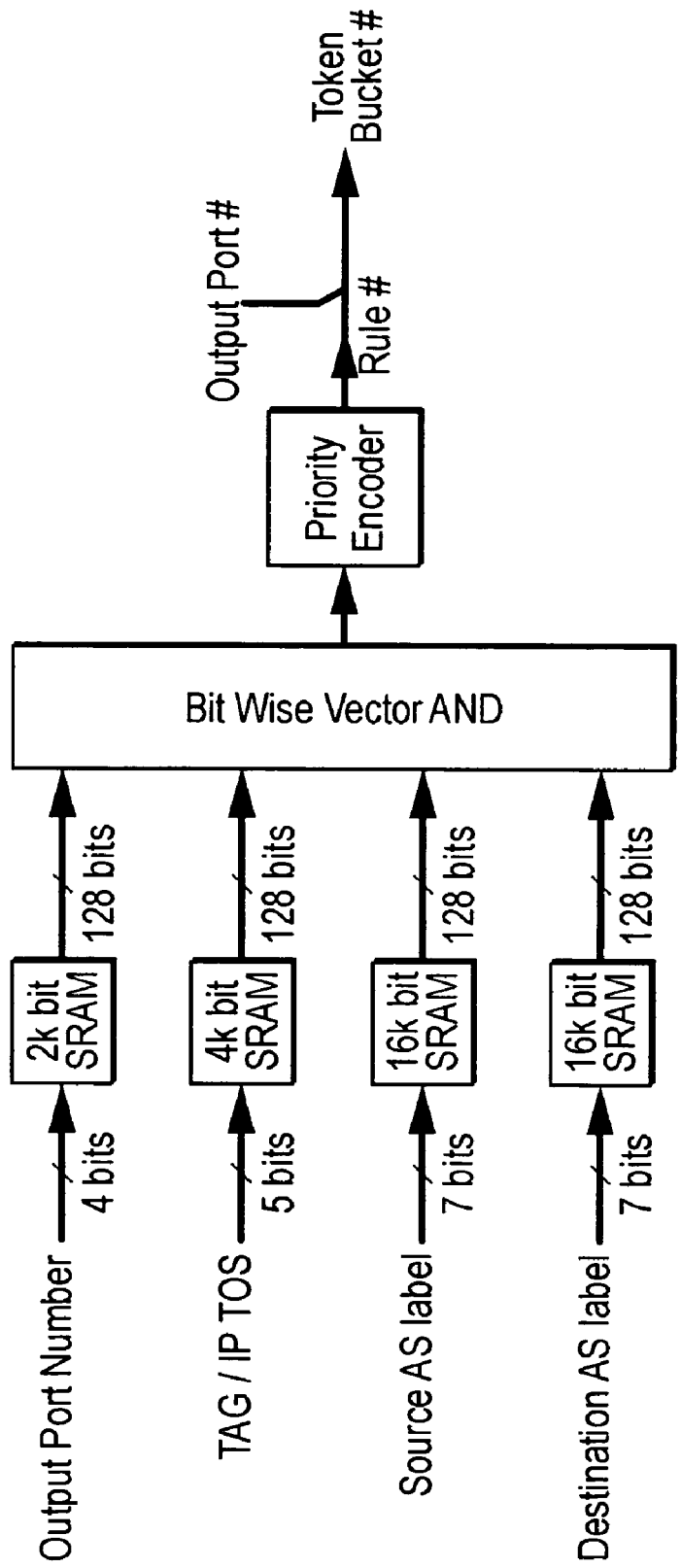
FIG. 31 is a high-level schematic of the process by which the CAR rule matching is performed, according to one embodiment of the present invention.

Valid CAR Actions are Transmit and Drop. It should be noted that the action "set precedence" is not supported. CAR rule match is done using a vector intersection scheme. Each of the match fields is extracted from the packet header and used as an address into an on chip SRAM. The SRAM returns a 128 bit vector which is ANDed together with the vector returned from the lookup for each of the other fields to give a list of rules which match. This is illustrated in FIG. 31. The first matching rule is found and is concatenated with the port number and is passed to the Token Bucket and Statistics module as a token bucket selector.

Token Bucket (OCAR_TB): In order to maintain 128 rules for 16 ports, the TX ASIC needs to maintain 2048 token buckets. The bulk of the functionality is leveraged from the RX ASIC. This submodule also broadcasts the total packet length in bytes and multicast flag from the Output CAR field to the Packet Accounting Module.

CAR Statistics Module (OCAR_SM): The CAR Statistics Module keeps a count of all packets and bytes passed and dropped per token bucket. The packet counters are 32 bits and byte counters 40 bits. The drop counters will be approximately 4 bits smaller as we should not be dropping at full line rate for very long so packet drop counters are 28 bits and byte drop counters are 36 bits. All of these counters should saturate (i.e. not roll over) and clear when read by the CPU.

Data Path Pipeline (OCAR_DP): The Data Path Pipeline is a series of approximately 8 pipeline stages used to hold the packet while CAR is executed. The exact number of stages will be determined by the final implementation of the design and is essentially the number of clock cycles needed to make the decision (transmit/drop).

PLIM Interface

The PLIM interface is functionally similar to the ToFab FIA interface implemented by the MCC. This similarity is due to leveraging the MCC memory subsystem which will drive the PLIM interface with minimum change. The principal difference is the packet header sent to the PLIM which is described in detail earlier in this document.

Central Processing Unit (Control Circuits 190)

The SALSA ASIC is the interface chip to the local CPU. The TX, MCC and RX ASICs in the linecard will have an interface module to the SALSA packet bus. The other ASICs in the linecard also interface to the SALSA I/O bus. The primary tasks of the CPU are:

Packet Processing: Any packet needing CPU intervention is transferred to the CPU through the CPU interface module.

Statistics Collection The CPU also does the statistics collection from the ASICs.

Table updates: The FIB tables in the LU ASIC are updated by the CPU.

DCC and the maintenance functions of the physical layer interface devices are handled by the CPU.

Packet Flow

Figure 32:
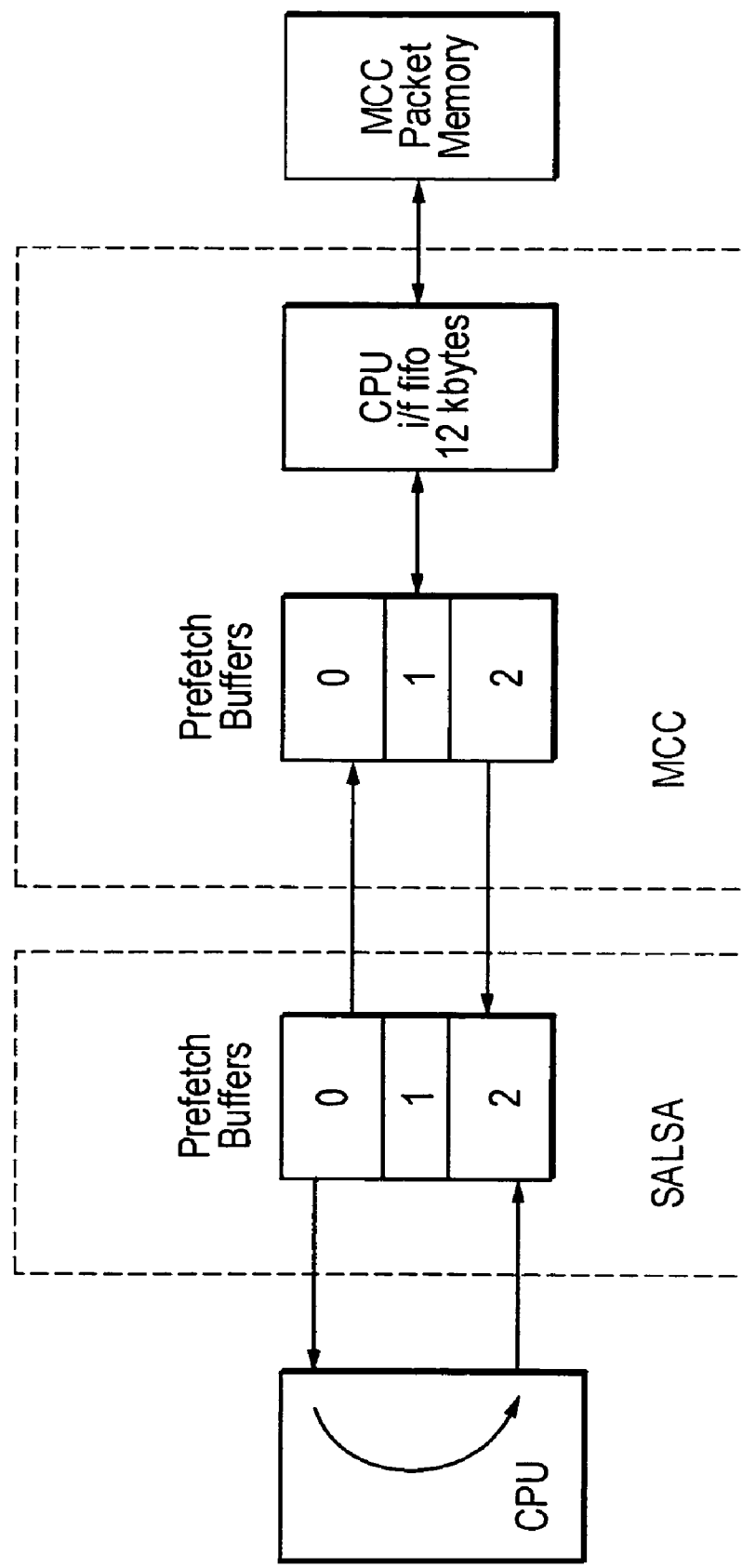
FIG. 32 is a high-level schematic view of packet flow between the MCC and the CPU.

The packet flow is shown in FIG. 32.

CONCLUSION

While particular embodiments of the present invention have been shown and described, it will be apparent to those skilled in the art that changes and modifications may be made without departing from this invention in its broader aspects and, therefore, the appended claims are to encompass within their scope all such changes and modifications as fall within the true spirit and scope of this invention.

We claim:

1. An apparatus comprising:
    a network interface element configured to receive an inbound packet at a line rate; and
    a control element, wherein
        said control element is coupled to said network interface element,
        said control element is configured to determine a packet priority associated with said inbound packet substantially at said line rate,
        said control element comprises
            a first buffer configured to store said inbound packet, and
            an inbound queue manager configured to store at least a portion of said inbound packet using a second buffer, and
            said second buffer is substantially larger than said first buffer.

2. The apparatus of claim 1, wherein said control element comprises:
    a control element configured to perform rate limiting on a plurality of packets including said inbound packet substantially at said line rate.

3. The apparatus of claim 1, wherein said inbound queue manager comprises a buffer usage manager.

4. The apparatus of claim 1, wherein said control element comprises:
    a control element configured to determine a class of service associated with said inbound packet.

5. The apparatus of claim 4, wherein
    said inbound packet comprises a header and a tail; and
    said control element further comprises:
        an inbound receiver comprising said first buffer;
        a lookup circuit coupled to said inbound receiver and configured to compare said header to a data structure and to determine routing information; and
        a first packet modifier circuit configured to modify said header according to at least said routing information to form a modified packet.

6. The apparatus of claim 5, wherein said inbound queue manager comprises:
    an inbound queue manager coupled to said first packet modifier circuit and configured to store said modified packet using said second buffer.

7. The apparatus of claim 5, wherein said data structure comprises an M-way branching tree structure.

8. The apparatus of claim 1, wherein said control element further comprises:
    an outbound receiver comprising a third buffer configured to store an outbound packet substantially at said line rate;
    a second packet modifier circuit configured to modify said outbound packet substantially at said line rate; and
    an outbound queue manager coupled to said second packet modifier circuit and configured to store said outbound packet using a fourth buffer, wherein said fourth buffer is substantially larger than said third buffer.

9. A method comprising:
    storing an inbound packet using a network interface, wherein
        said storing comprises storing an inbound packet using a first buffer of said network interface;
    determining a packet priority associated with said inbound packet substantially at a line rate of said network interface; and
    storing at least a portion of said inbound packet using a second buffer of said network interface in response to said determining, wherein
        said second buffer is substantially larger than said first buffer.

10. The method of claim 9, further comprising:
    performing rate limiting on a plurality of packets including said inbound packet substantially at said line rate of said network interface.

11. The method of claim 9, wherein said determining comprises:
    determining a class of service associated with said inbound packet.

12. The method of claim 11, wherein
    said inbound packet comprises a header and a tail; and
    said method further comprises:
        comparing said header to a data structure substantially at said line rate of said network interface;
        determining routing information substantially at said line rate of said network interface; and
        modifying said header according to at least said routing information to form a modified packet substantially at said line rate of said network interface.

13. The method of claim 12, wherein said comparing comprises:
    comparing said header to an M-way branching tree structure.

14. The method of claim 12, wherein said storing at least a portion of said inbound packet using a second buffer of said network interface in response to said determining comprises:
    storing said modified packet using said second buffer.

15. The method of claim 14, wherein said storing said modified packet using said second buffer comprises:
    managing buffer usage.

16. The method of claim 9, further comprising:
    storing an outbound packet using a third buffer of said network interface;

modifying said outbound packet substantially at said line rate of said network interface; and storing said outbound packet using a fourth buffer of said network interface in response to said modifying, wherein said fourth buffer is substantially larger than said third buffer.

17. A computer-readable storage medium having a plurality of instructions executable by a computer embodied therein, wherein said plurality of instructions when executed cause said computer to perform a method comprising:

storing an inbound packet using a network interface, wherein said storing comprises storing an inbound packet using a first buffer of said network interface;

determining a packet priority associated with said inbound packet substantially at a line rate of said network interface; and storing at least a portion of said inbound packet using a second buffer of said network interface in response to said determining, wherein said second buffer is substantially larger than said first buffer.

18. The computer-readable storage medium of claim 17, said method further comprising:

performing rate limiting on a plurality of packets including said inbound packet substantially at said line rate of said network interface.

19. The computer-readable storage medium of claim 17, wherein said determining comprises:

determining a class of service associated with said inbound packet.

20. The computer-readable storage medium of claim 19, wherein said inbound packet comprises a header and a tail; and
said method further comprises:

comparing said header to a data structure substantially at said line rate of said network interface;

determining routing information substantially at said line rate of said network interface; and modifying said header according to at least said routing information to form a modified packet substantially at said line rate of said network interface.

21. The computer-readable storage medium of claim 17, said method further comprising:

storing an outbound packet using a third buffer of said network interface;

modifying said outbound packet substantially at said line rate of said network interface; and storing said outbound packet using a fourth buffer of said network interface in response to said modifying, wherein said fourth buffer is substantially larger than said third buffer.

22. An apparatus comprising:

means for storing an inbound packet using a network interface, wherein said means for storing comprises means for storing an inbound packet using a first buffer of said network interface;

means for determining a packet priority associated with said inbound packet substantially at a line rate of said network interface; and means for storing at least a portion of said inbound packet using a second buffer of said network interface, wherein said second buffer is substantially larger than said first buffer.

23. The apparatus of claim 22, further comprising:

means for performing rate limiting on a plurality of packets including said inbound packet substantially at said line rate of said network interface.

24. The apparatus of claim 22, wherein said means for determining comprises:

means for determining a class of service associated with said inbound packet.

25. The apparatus of claim 24, wherein said inbound packet comprises a header and a tail; and
said apparatus further comprises:

means for comparing said header to a data structure substantially at said line rate of said network interface;

means for determining routing information substantially at said line rate of said network interface; and means for modifying said header according to at least said routing information to form a modified packet substantially at said line rate of said network interface.

26. The apparatus of claim 22, further comprising:

means for storing an outbound packet using a third buffer of said network interface;

means for modifying said outbound packet substantially at said line rate of said network interface; and means for storing said outbound packet using a fourth buffer of said network interface in response to said modifying, wherein said fourth buffer is substantially larger than said third buffer.

* * * * *